United States Patent
Agiwal et al.

(10) Patent No.: US 11,109,212 B2
(45) Date of Patent: Aug. 31, 2021

(54) APPARATUS AND METHOD OF SYSTEM INFORMATION TRANSMISSION AND RECEPTION ON A CARRIER SUPPORTING MULTIPLE BANDWIDTH PARTS

(71) Applicant: Samsung Electronics Co., Ltd., Suwon-si (KR)

(72) Inventors: Anil Agiwal, Suwon-si (KR); Peng Xue, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/100,871

(22) Filed: Aug. 10, 2018

(65) Prior Publication Data
US 2019/0053029 A1 Feb. 14, 2019

Related U.S. Application Data

(60) Provisional application No. 62/543,581, filed on Aug. 10, 2017, provisional application No. 62/629,964, filed on Feb. 13, 2018.

(51) Int. Cl.
*H04M 11/04* (2006.01)
*H04W 4/90* (2018.01)
(Continued)

(52) U.S. Cl.
CPC ............ *H04W 4/90* (2018.02); *H04W 48/12* (2013.01); *H04W 68/02* (2013.01);
(Continued)

(58) Field of Classification Search
USPC ....... 455/404.1, 414.1, 450, 451, 452.1, 466
See application file for complete search history.

(56) References Cited

U.S. PATENT DOCUMENTS

| | | | |
|---|---|---|---|
| 2011/0243090 A1 | 10/2011 | Grovlen et al. | |
| 2013/0281090 A1* | 10/2013 | Maeda | H04W 48/02 455/434 |

(Continued)

FOREIGN PATENT DOCUMENTS

WO 2016/126142 A1 8/2016

OTHER PUBLICATIONS

LG Electronics, 'Discussion on CSS configuration for wideband operation', R1-1707627, May 6, 2017, 3GPP TSG WG1 Meeting #89, Hangzhou, China.

(Continued)

*Primary Examiner* — Matthew W Genack
(74) *Attorney, Agent, or Firm* — Jefferson IP Law, LLP

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The method for transmitting system information by a base station in a wireless communication system, the method comprising identifying whether an active downlink (DL) bandwidth part (BWP) of a user equipment (UE) is configured with common search space, and transmitting, to the UE, an updated system information in a dedicated signaling when the active DL BWP of the UE is not configured with the common search space.

12 Claims, 53 Drawing Sheets

(51) Int. Cl.
  *H04W 48/12* (2009.01)
  *H04W 76/28* (2018.01)
  *H04W 76/27* (2018.01)
  *H04W 68/02* (2009.01)
  *H04W 72/04* (2009.01)

(52) U.S. Cl.
  CPC ......... *H04W 72/042* (2013.01); *H04W 76/27* (2018.02); *H04W 76/28* (2018.02)

(56) References Cited

U.S. PATENT DOCUMENTS

| | | | |
|---|---|---|---|
| 2014/0112308 A1* | 4/2014 | Kwon | H04W 56/0005 370/331 |
| 2014/0179255 A1* | 6/2014 | Drapkin | H04L 51/00 455/404.1 |
| 2015/0131605 A1* | 5/2015 | Nogami | H04L 5/0053 370/330 |
| 2015/0264665 A1* | 9/2015 | Vos | H04L 5/00 370/329 |
| 2017/0086172 A1* | 3/2017 | Dinan | H04W 72/042 |
| 2017/0251500 A1 | 8/2017 | Agiwal et al. | |
| 2018/0027483 A1 | 1/2018 | You et al. | |
| 2019/0045549 A1* | 2/2019 | Wu | H04W 74/0833 |
| 2019/0215815 A1* | 7/2019 | Blankenship | H04W 72/005 |

OTHER PUBLICATIONS

Ericsson et al., 'Way Forward on bandwidth part for efficient wideband operation in NR', R1-1709802, May 19, 2017, 3GPPTSG-RAN WG1 #89, Hangzhou, China.
Intel Corporation, 'Bandwidth parts configuration and operations', May 7, 2017, R1-1707420, 3GPP TSG RAN WG1 Meeting #89, Hangzhou, China.
International Search Report dated Nov. 16, 2018, issued in International Patent Application No. PCT/KR2018/009170.
Huawei et al: "SI Reception for Connected UE in BWP", 3GPP Draft; R2-1801194 SI Reception for Connected UE in BWP, 3rd Generation Partnership Project (3GPP), Mobile Competence Centre; 650, Route Des Lucioles; F-06921 Sophia-Antipolis Cedex; France vol. RAN WG2, No. Vancouver, Canada; Jan. 22, 2018-Jan. 26, 2018 Jan. 12, 2018 (Jan. 12, 2018), XP051386639.
MCC Support: "Draft Report of 3GPP TSG RAN WG1 #AH_NR2 v0.1.0", 3GPP Draft; DRAFT_MINUTES_REPORT_RAN1#AH_NR2_V010, 3rd Generation Partnership Project (3GPP), Mobile Competence Centre; 650, Route Des Lucioles ; F-06921 Sophia-Antipolis Cedex ; France vol. RAN WG1, No. Prague, Czech; Aug. 21, 2017-Aug. 25, 2017 Jul. 3, 2017 (Jul. 3, 2017), XP051306254.
Mediatek Huawei Hisilicon: "Way Forward on Further Details for Bandwidth Part", 3GPP Draft; R1-1711802 WFON Further Details for Bandwidth Part, 3rd Generation Partnership Project (3GPP), Mobile Competence Centre; 650, Route Des Lucioles; F-06921 Sophia-Antipolis Cedex; France vol. RAN WG1, No. Qingdao, China; Jun. 27, 2017-Jun. 30, 2017 Jun. 28, 2017 (Jun. 28, 2017), XP051305980.
Extended European Search Report dated Aug. 4, 2020 issued in European Application No. 18844061.4.

* cited by examiner

APPARATUS AND METHOD OF SYSTEM INFORMATION TRANSMISSION AND RECEPTION ON A CARRIER SUPPORTING MULTIPLE BANDWIDTH PARTS

CROSS-REFERENCE TO RELATED APPLICATION(S)

This application is based on and claims priority under 35 U.S.C. § 119 of a U.S. Provisional application Ser. No. 62/543,581, filed on Aug. 10, 2017, in the U.S. Patent and Trademark Office, and of a U.S. Provisional application Ser. No. 62/629,964, filed on Feb. 13, 2018, in the U.S. Patent and Trademark Office, the disclosure of each of which is incorporated by reference herein in its entirety.

BACKGROUND

1. Field

The disclosure relates to a wireless communication system. More particularly, the disclosure relates to an apparatus and method for transmitting and receiving system information on a carrier supporting multiple bandwidth parts.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post long term evolution (LTE) System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, Hybrid frequency shift keying (FSK) and quadrature amplitude modulation (QAM) modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described Big Data processing technology may also be considered to be as an example of convergence between the 5G technology and the IoT technology.

In the recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. So, fifth generation wireless communication system is being developed to meet the growing demand for high speed data services, support ultra-reliability and low latency applications.

The fifth generation wireless communication system will be implemented not only in lower frequency bands but also in higher frequency (mmWave) bands, e.g., 10 GHz to 100 GHz bands, so as to accomplish higher data rates. To mitigate propagation loss of the radio waves and increase the transmission distance, the beamforming, massive multiple-input multiple-output (MIMO), Full dimensional MIMO (FD-MIMO), array antenna, an analog beam forming, large scale antenna techniques are being considered in the design of fifth generation wireless communication system. In addition, the fifth generation wireless communication system is expected to address different use cases having quite different requirements in terms of data rate, latency, reliability, mobility etc. However, it is expected that the design of the air-interface of the fifth generation wireless communication system would be flexible enough to serve the user equipment (UEs) having quite different capabilities depending on the use case and market segment the UE cater service to the end customer. For example, use case(s) in the fifth generation wireless communication system wireless system is/are expected to address is enhanced Mobile Broadband (eMBB), massive machine type communication (m-MTC), ultra-reliable low latency communication (URLL) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the internet of things (IoT)/internet of everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enablers for autonomous cars.

In the fourth generation wireless communication system, enhanced node B (eNB) or base station in cell broadcast system information. System information is structured into master information block (MIB) and a set of system information blocks (SIBs). MIB consists of system frame number (SFN), Downlink System bandwidth and physical hybrid automatic repeat request (ARQ) feedback indicator channel (PHICH) configuration. MIB is transmitted every 40 ms. It is repeated every 10 ms wherein the first transmission occurs in subframe #0 when SFM mod 4 equals zero. MIB is transmitted on physical broadcast channel. System Information Block Type 1 carries cell indemnity, tracking area code, cell barring information, value tag (common for all scheduling units), and scheduling information of other SIBs. SIB 1 is transmitted every 80 ms in subframe #5 when SFN mod 8 equals zero. SIB 1 is repeated in subframe #5 when SFN mod 2 equals zero. SIB 1 is transmitted on Physical downlink shared channel. Other SIBs (SIB 2 to SIB 19) are transmitted in system information (SI) message wherein scheduling info of these SIBs are indicated in SIB 1.

UE acquires the system information at cell selection, cell reselection, after handover completion, after entering E-UTRA from another RAT, upon re-entering service area, upon receiving a notification (paging), and upon exceeding the maximum validity duration (3 hr). In radio resource control (RRC) idle and inactive state, UE needs to acquire MIB, SIB 1, SIB 2 to SIB 5, SIB 6 to SIB 8 (depending on RAT supported), SIB 17 (if LTE-WLAN IWK is supported), and SIB 18 to SIB 19 (if D2D is supported). In RRC connected state, UE needs to acquire MIB, SIB 1, SIB 2, SIB 8 (depending on RAT supported), SIB 17 (if LTE-WLAN IWK is supported), and SIB 18 to SIB 19 (if D2D is supported). System information acquired and stored is considered invalid if value tag in received SIB 1 is different from the one in stored SI. System information can be changed and is notified as follows, Change is notified through paging message (in RRC IDLE, RRC_INACTIVE or RRC_CONNECTED) with cause systemInfoModification to let UE know that some SI is changing in the next modification period. Modification period boundaries are in terms of SFN such that SFN mod modificationPeriod=0. Change of SI only occurs at specific radio frames. Notification of changes in modification period N will be reflected in N+1. SIB1 also carries value tag to indicate change in SI. UE finds the change in SI by looking at value tag in SIB1 at the end modificationPeriod (if missed checking page) or receiving paging with systeminfoModification.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for transmitting and receiving system information on a carrier supporting multiple bandwidth parts.

In the fifth generation wireless communication system, carrier bandwidth can be partitioned into multiple bandwidth parts (BWPs) in frequency domain. In downlink (DL), user equipment (UE) can be configured via RRC signaling to monitor and receive DL transmissions from gNB in one or more DL bandwidth paths (BWPs). DL BWPs in which UE receive in DL is referred as active DL BWP. Similarly, in uplink (UL), UE can be configured to transmit to gNB in one or more UL BWPs. UL BWP in which UE transmits in UL is referred as active UL BWP. UE can be configured with BWP in terms of physical resource blocks (PRBs).

On a given carrier, at least one of the configured DL BWPs includes one control resource set (CORESET) with common search space. Each configured DL BWPs includes at least one CORESET with UE specific search space for the case of single active BWP at a given time. This means that the active DL BWP of a UE may or may not have CORESET with common search space. Physical downlink common control channel (PDCCH) for broadcast signals such as paging and system information is transmitted by gNB in common search space and UE monitors the common search space for receiving the PDCCH for paging and system information (SI). For a UE in connected state, if the active DL BWP of a UE is not configured with common search space then UE cannot receive SI update indication and updated system information. In a given cell, system information can be updated and UE will fail to receive the updated system information. So, a system and method of delivering updated system information is needed for the scenario where active DL BWP does not have CORESET with common search space or in other words active DL BWP is not configured with common search space.

Additional aspects will be set forth in part in the description which follows and, in part, will be apparent from the description, or may be learned by practice of the presented embodiments.

In accordance with an aspect of the disclosure, a method for transmitting system information by a base station in a wireless communication system is provided. The method includes identifying whether an active downlink (DL) bandwidth part (BWP) of a user equipment (UE) is configured with a common search space, and transmitting, to the UE, updated system information in a dedicated signaling when the active DL BWP of the UE is not configured with the common search space.

In accordance with another aspect of the disclosure, a user equipment (UE) and a base station are capable of signaling system information efficiently in wireless communication system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For a user equipment (UE) in connected state, if the active downlink (DL) bandwidth part (BWP) of a UE does not have CORESET with common search space then UE cannot receive SI update indication and updated system information. In a given cell, system information can be updated and UE will fail to receive the updated system information. Various methods of delivering updated system information in the disclosure are as follows.

Method 1: Dedicated Radio Resource Control (RRC) Message Carrying Updated System Information Blocks (SIBs) Transmitted in Active DL BWP

Embodiment 1

Figure 1:
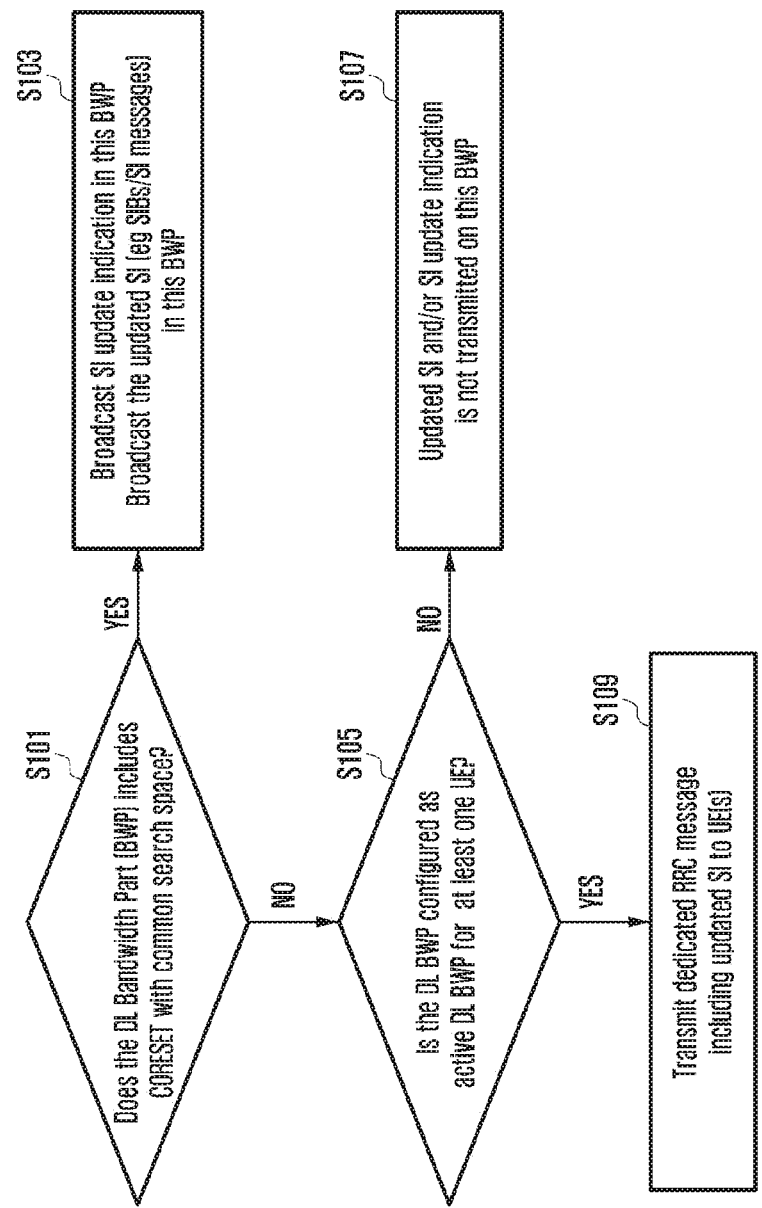
FIG. 1 illustrates the base station (gNB) operation for updating system information (SI) in a system wherein multiple downlink (DL) bandwidth parts (BWPs) are configured on a carrier according to an embodiment of the disclosure.

FIG. 1 illustrates the base station (gNB) operation for updating SI in a system wherein multiple DL BWPs are configured on a carrier or a serving cell according to an embodiment of the disclosure. The gNB performs this operation for each configured DL BWP. See operations S101 through S109 shown in FIG. 1.

Figure 2:
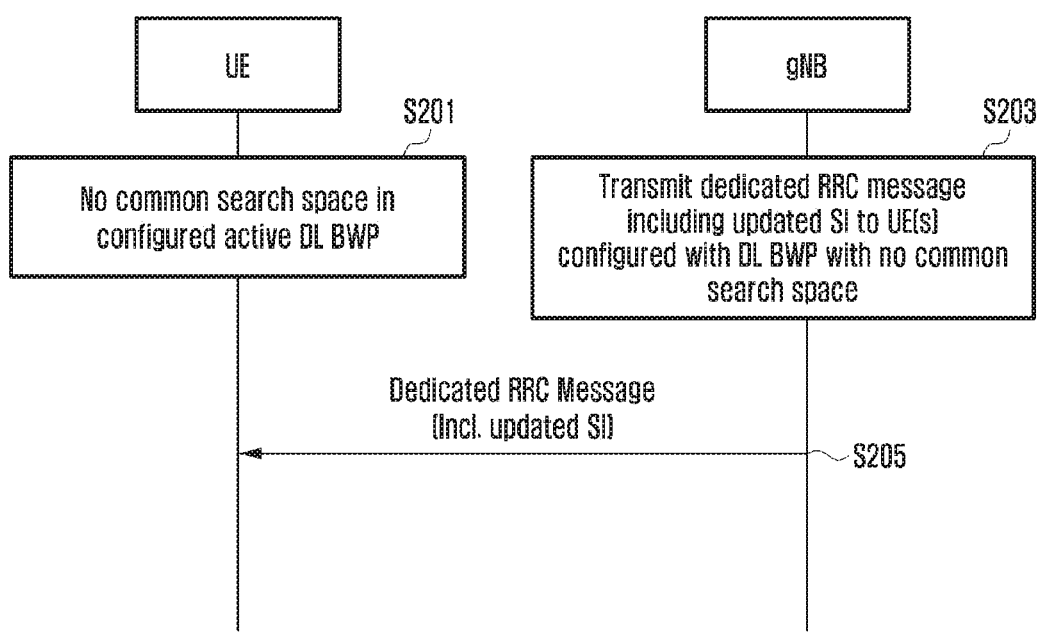
FIG. 2 illustrates an example of the signaling flow between user equipment (UE) and gNB according to an embodiment of the disclosure.
Figure 3:
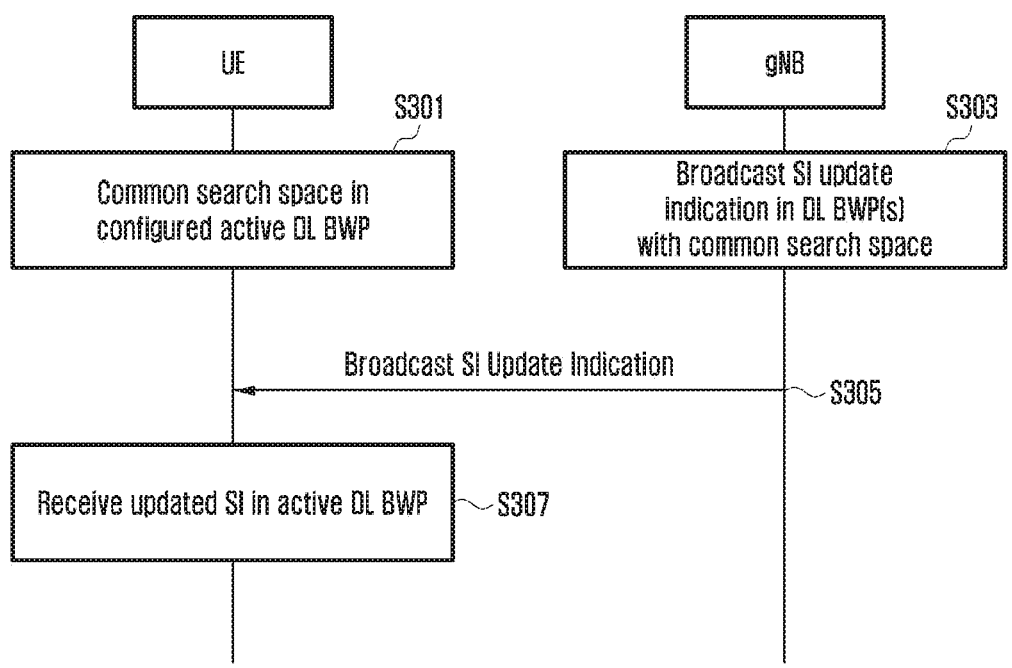
FIG. 3 illustrates another example of the signaling flow between UE and gNB according to an embodiment of the disclosure.

FIGS. 2 and 3 illustrate the signaling flow between UE and gNB in the proposed method according to various embodiments of the disclosure. In this method we propose that for one or more UE(s) in RRC Connected state which are configured with active DL BWP without common search space, gNB provides the SI (i.e. SIBs or SI messages) in dedicated RRC signaling message (e.g. RRCReconfiguration message). The dedicated RRC signaling message is transmitted by gNB in UE's active DL BWP. We propose to define a RRC signaling message to include SIB(s) or SI message(s) for delivering SI in a dedicated manner. See operations S201 through S205 shown in FIG. 2.

In an embodiment, if the DL BWP is configured with common search space (s) for paging and SI, gNB broadcasts SI update indication in this BWP and also broadcast the updated SI in this BWP.

In another embodiment, if the DL BWP is configured as active DL BWP for at least one UE and it is configured with common search space(s) for paging and SI, gNB broadcasts SI update indication in this BWP and also broadcasts the updated SI in this BWP. If the DL BWP is configured as active BWP for at least one UE and it is not configured with common search space, gNB provides the updated SI in dedicated RRC signaling message. See operations S301 through S307 illustrated in FIG. 3.

In this method, UE in RRC Connected state is configured with one active DL BWP. If UE's active DL BWP is not configured with common search space for SI, UE receives the SI (e.g. one or more SIBs or SI messages) in dedicated RRC signaling message in active DL BWP. If active DL BWP is not configured with common search space for monitoring paging, UE does not monitor for SI update indication in paging occasion(s) of DRX cycle. Otherwise if active DL BWP is configured with common search space for monitoring paging, UE shall monitor for SI update indication in any paging occasion of DRX cycle. UE receives the updated SI indication broadcasted (e.g. in paging message or paging DCI) by gNB in active DL BWP. UE then receives the updated SI(s) broadcasted by gNB in the active DL BWP.

Embodiment 1A

In an embodiment of the disclosure, we propose that for one or more UE(s) in RRC Connected state which are configured with active DL BWP wherein the active DL BWP is not initial DL BWP, gNB provides the updated SI (e.g. SIBs or SI messages) in dedicated RRC signaling message. In the initial DL BWP, gNB broadcasts the SI update notification and updated SI. Initial DL BWP is the BWP where the UE/gNB receives/transmits the remaining minimum system information i.e. RMSI. The initial DL BWP is defined as frequency location and bandwidth of RMSI CORESET and numerology of RMSI. The physical DL shared channel (PDSCH) delivering RMSI are confined within the initial DL BWP.

Figure 4:
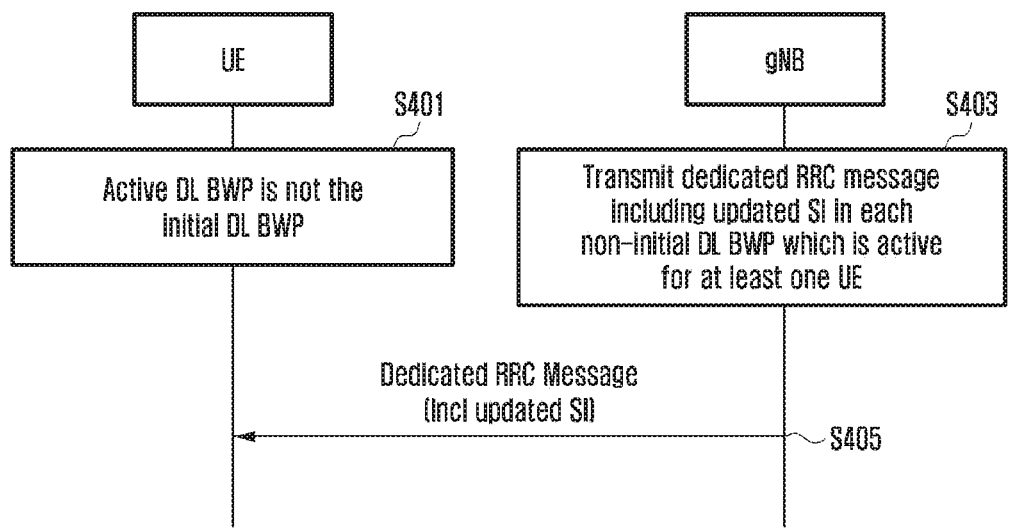
FIG. 4 illustrates an example of the signaling flow between UE and gNB according to an embodiment of the disclosure.

FIG. 4 illustrates an example of the signaling flow between UE and gNB according to an embodiment of the disclosure. In operation S401, the UE recognizes that the active DL BWP is not the initial BWP. In operation S403, the gNB transmits dedicated RRC messages including updated SI in each non-initial BWP which is active for at least one UE. In operation S405, the gNB sends a dedicated RRC message including the updated SI message(s).

Figure 5:
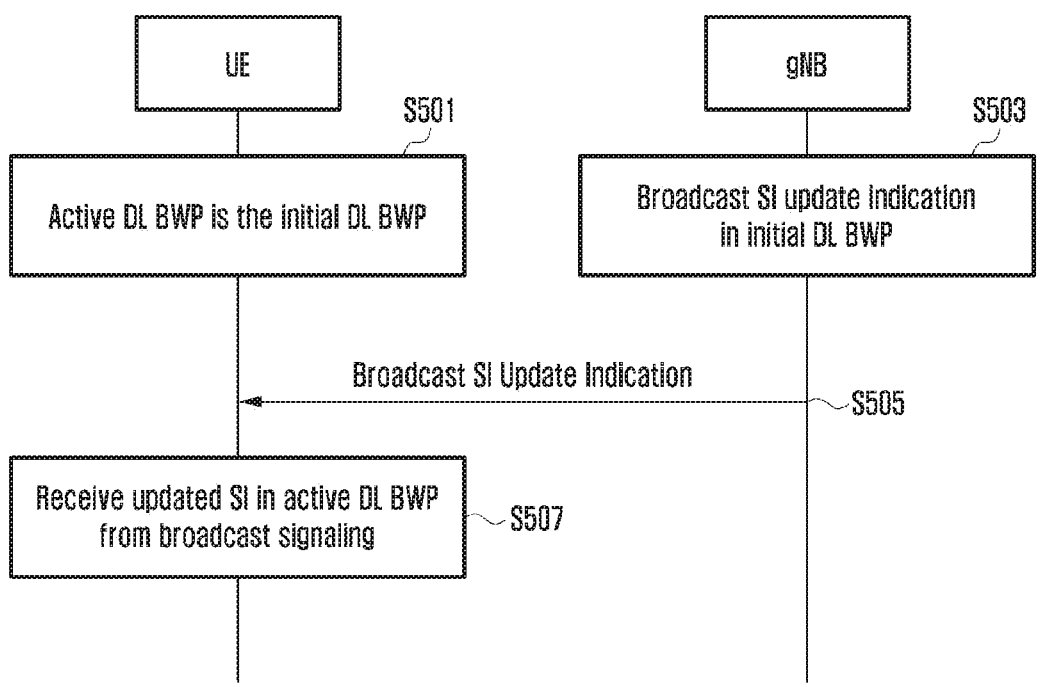
FIG. 5 illustrates another example of the signaling flow between UE and gNB according to an embodiment of the disclosure.

FIG. 5 illustrates another example of the signaling flow between UE and gNB according to an embodiment of the disclosure.

UE can obtain the information about the initial DL BWP by reading master information block (MIB) or in dedicated RRC signaling. UE(s) which are configured with active DL BWP wherein the active DL BWP is not the initial DL BWP, UE does not need to monitor paging occasion(s) of DRX cycle for SI update indication/notification. UE receives the updated SI in in dedicated RRC signaling message as shown in FIG. 4. UE(s) which are configured with active DL BWP wherein the active DL BWP is the initial DL BWP, UE monitor paging occasion(s) of DRX cycle for receiving SI update indication/notification in initial DL BWP. After receiving the SI update indication/notification, UE receives the updated SI from broadcast signaling in initial DL BWP as shown in FIG. 5. See operations S501 through S507 shown in FIG. 5.

Embodiment 2

Figure 6:
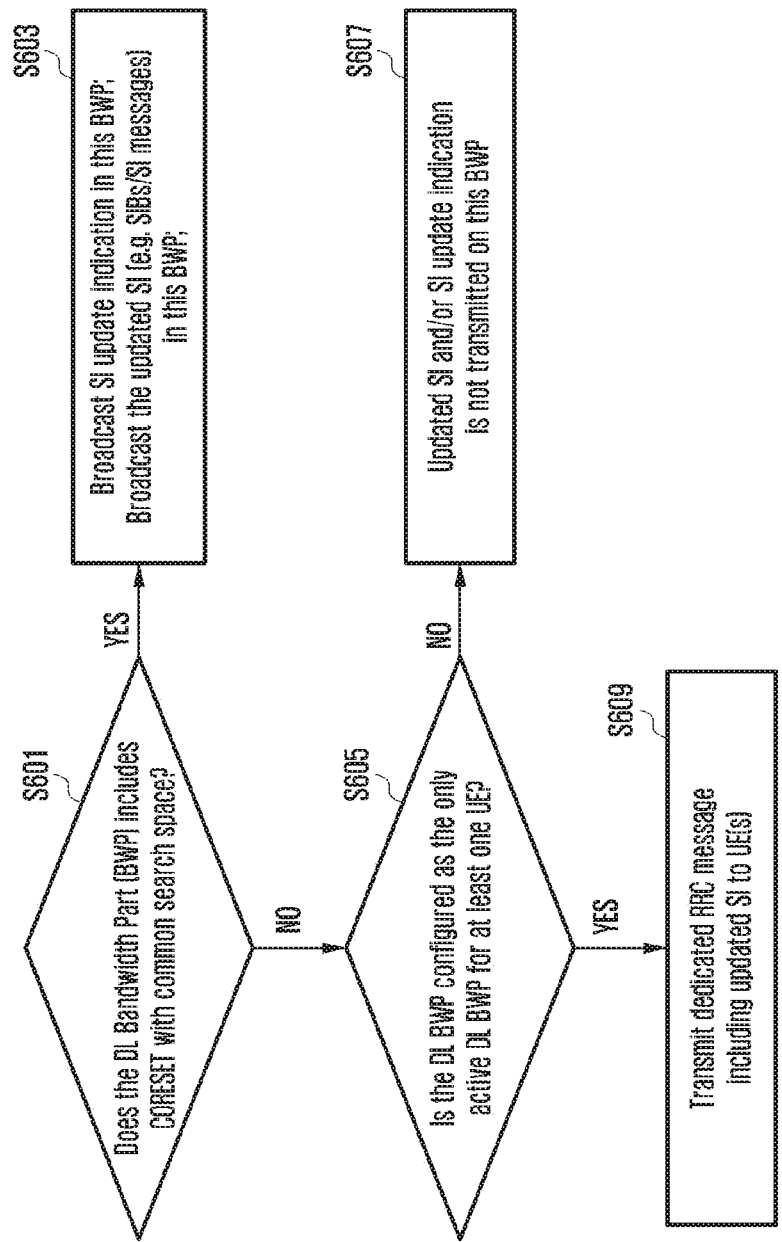
FIG. 6 illustrates the gNB operation for updating SI in a system wherein multiple DL BWPs are configured on a carrier according to an embodiment of the disclosure.

FIG. 6 illustrates the gNB operation for updating SI in a system wherein multiple DL BWPs are configured on a carrier according to an embodiment of the disclosure. The gNB performs this operation for each configured DL BWP. See operations S601 through S609 shown in FIG. 6.

Figure 7:
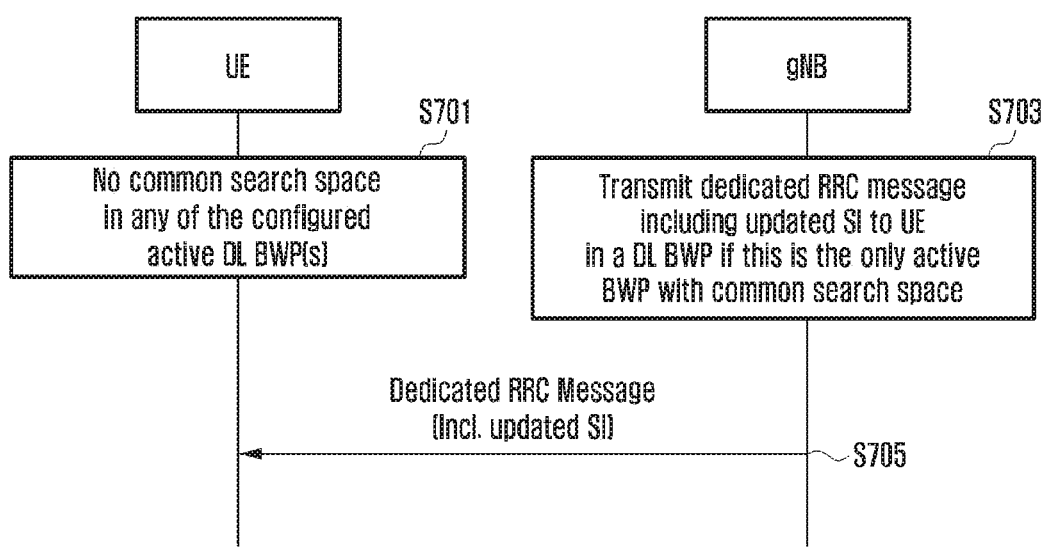
FIG. 7 illustrates an example of the signaling flow between UE and gNB according to an embodiment of the disclosure.
Figure 8:
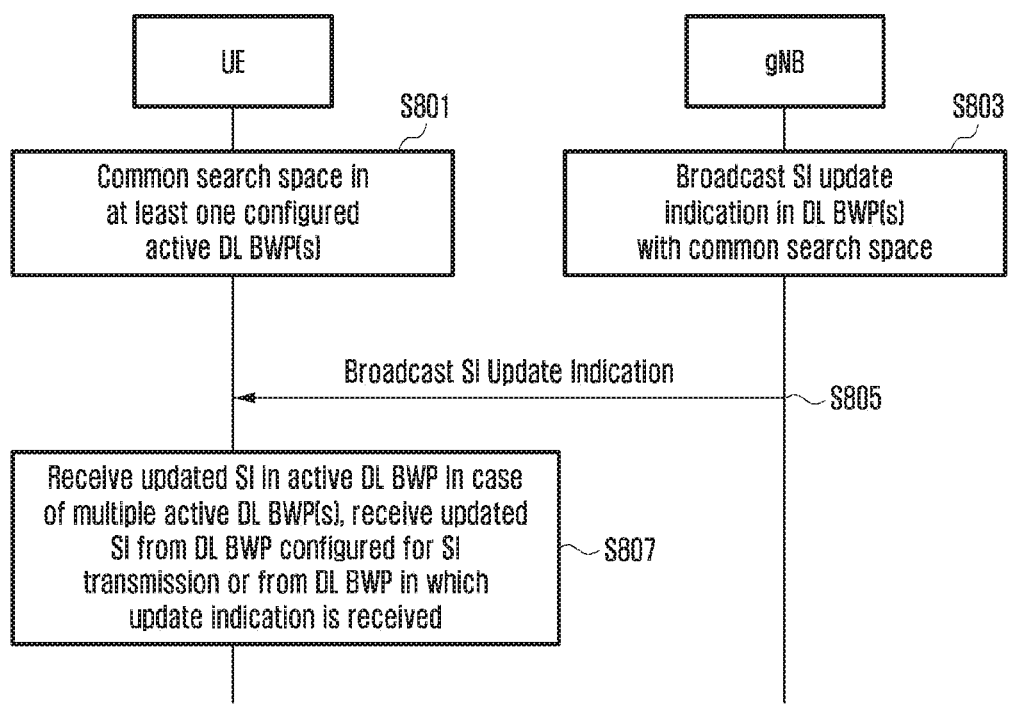
FIG. 8 illustrates another example of the signaling flow between UE and gNB according to an embodiment of the disclosure.

FIGS. 7 and 8 illustrate the signaling flow between UE and gNB in the proposed method according to various embodiments of the disclosure. In this method we propose that for one or more UE(s) in RRC Connected state which are configured with one or more active DL BWPs and each of the active DL BWPs are configured without common search space, gNB provides the updated SI in dedicated RRC signaling message. The dedicated RRC signaling message is transmitted by gNB in UE's active DL BWP. We propose to define an RRC signaling message to include SIB(s) for delivering SI in a dedicated manner. See operations S701, S703 and S705 shown in FIG. 7.

In an embodiment, if the DL BWP is configured with common search space (s) for SI and paging, gNB broadcast SI update indication in this BWP and also broadcast the updated SI in this BWP.

In another embodiment, if the DL BWP is configured as the only active BWP for at least one UE and it is configured with common search space(s) for paging and SI, gNB broadcast SI update indication in this BWP and also broadcast the updated SI in this BWP. If the DL BWP is configured as the only active BWP for at least one UE and it is not configured with common search space, gNB provides the updated SI in dedicated RRC signaling message.

UE is configured with one or more active DL BWPs. If none of the active DL BWPs is configured with common search space, UE receives the updated SI in dedicated RRC signaling in active DL BWP. If at least one of the active DL BWPs is configured with common search space, UE receives the SI update indication in broadcast signaling (i.e. paging message or paging DCI) in active DL BWP and updated SIs in the active DL BWP. If at least one of the active DL BWPs is configured with common search space for monitoring paging, UE shall monitor for SI update indication in any paging occasion of DRX cycle. In case of multiple active DL BWP(s) with common search space, UE can receive updated SI from DL BWP indicated (e.g. in update indication) by network for SI transmission or UE can receive updated SI from DL BWP in which it has received update indication. See operations S801 through S807 shown in FIG. 8.

Embodiment 2A

In an embodiment of the disclosure, we propose that for one or more UE(s) in RRC Connected state which are configured with active DL BWP(s) wherein the none of the active DL BWP is the initial DL BWP, gNB provides the updated SI (e.g. SIBs or SI messages) in dedicated RRC signaling message. In the initial DL BWP, gNB broadcasts the SI update notification and updated SI. Initial DL BWP is the BWP where the UE/gNB receives/transmits the remaining minimum system information i.e. RMSI. The initial DL BWP is defined as frequency location and bandwidth of RMSI CORESET and numerology of RMSI. The PDSCH delivering RMSI are confined within the initial DL BWP. UE can obtain the information about the initial DL BWP by reading MIB or in dedicated RRC signaling. UE(s) which are configured with active DL BWP(s) wherein the none of the active DL BWP is the initial DL BWP, UE does not need to monitor paging occasion(s) in DRX cycle for SI update indication/notification. UE receives the updated SI in in dedicated RRC signaling message. UE(s) which are configured with active DL BWP(s) wherein at least one active DL BWP is the initial DL BWP, UE monitor paging occasion(s) in DRX cycle for SI update indication/notification in initial DL BWP. After receiving the SI update notification/indication, UE receives the updated SI from broadcast signaling in initial DL BWP.

Embodiment 3

Figure 9:
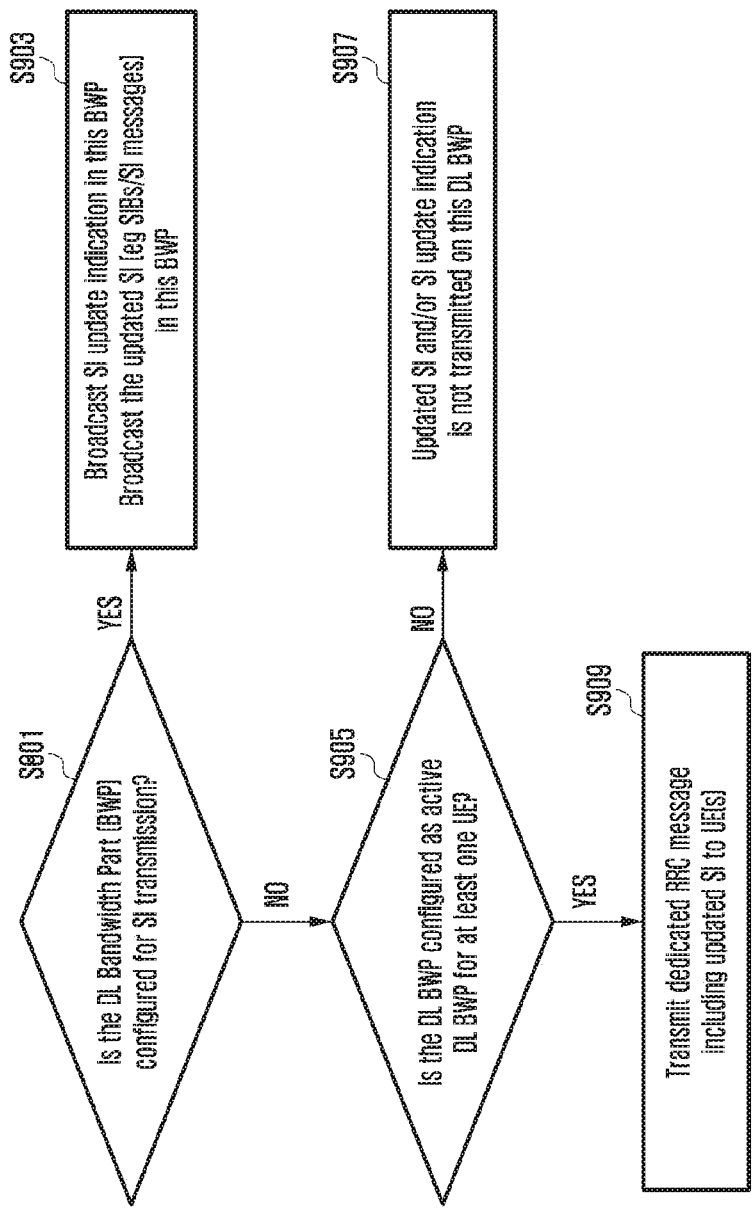
FIG. 9 illustrates the gNB operation for updating SI in a system wherein multiple DL BWPs are configured on a carrier according to an embodiment of the disclosure.
Figure 10:
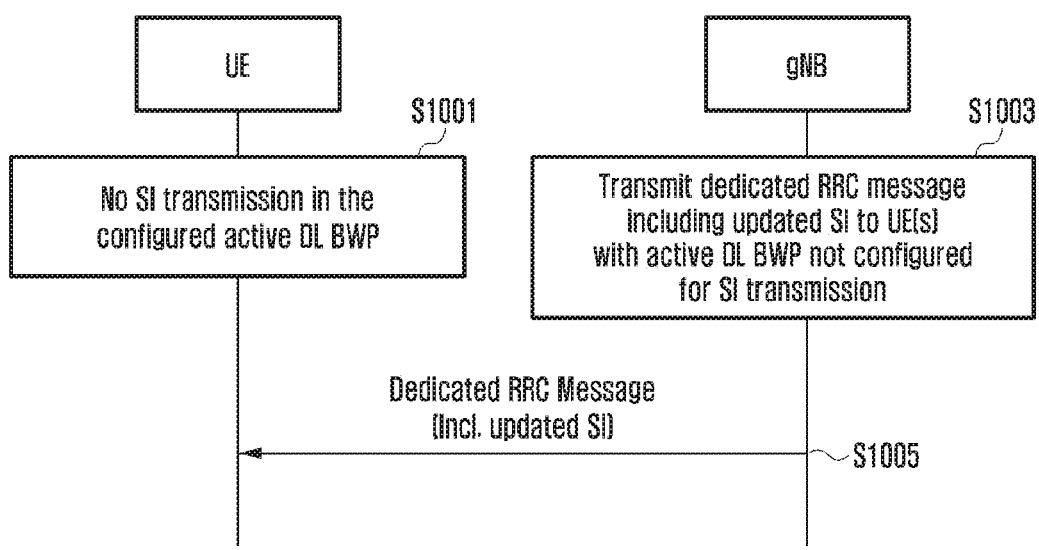
FIG. 10 illustrates an example of the signaling flow between UE and gNB according to an embodiment of the disclosure.
Figure 11:
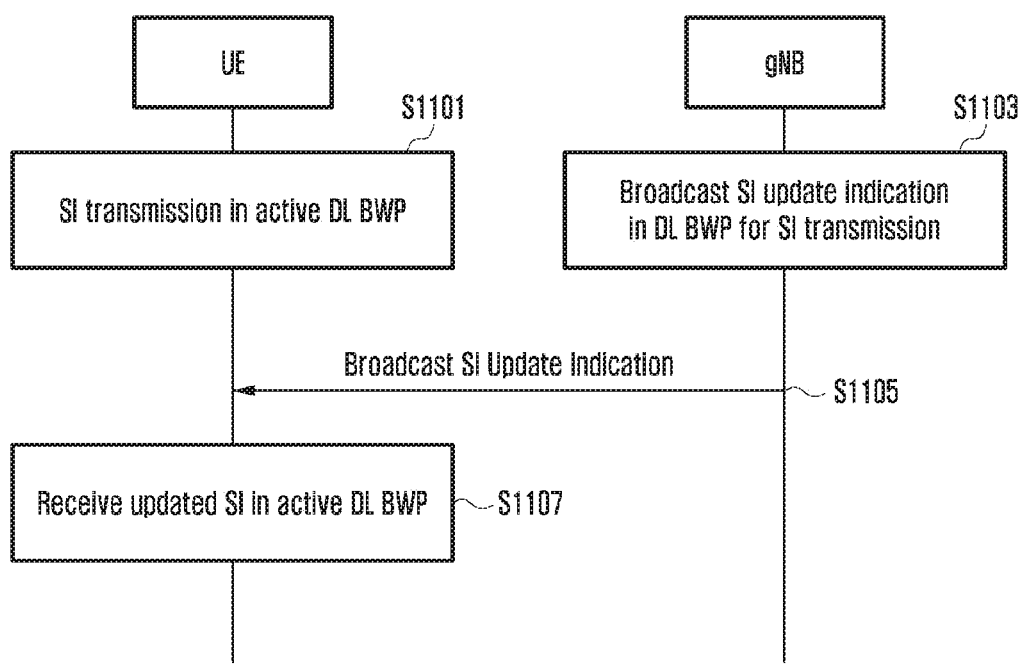
FIG. 11 illustrates another example of the signaling flow between UE and gNB according to an embodiment of the disclosure.

FIG. 9 illustrates the gNB operation for updating SI in a system wherein multiple DL BWPs are configured on a carrier or serving cell according to an embodiment of the disclosure. The gNB performs this operation for each configured DL BWP. See operations S901 through S909 shown in FIG. 9. FIGS. 10 and 11 illustrates the signaling flow between UE and gNB in the proposed method according to various embodiments of the disclosure. In this method we propose that for one or more UE(s) in RRC Connected state which are configured with active DL BWP in which SI is not transmitted, gNB provides the SI in dedicated RRC signaling message (e.g. RRC Reconfiguration message). The dedicated RRC signaling message is transmitted by gNB in UE's active DL BWP. We propose to define an RRC signaling message to include SIB(s) or SI messages for delivering SI in a dedicated manner. See operations S1001, S1003 and S1005 shown in FIG. 10.

In this method, UE is configured with one active DL BWP. If active DL BWP is not configured for SI transmission (i.e. it is not the initial DL BWP), UE receives the updated SI (e.g. one or more SIBs or SI messages) in dedicated RRC signaling in active DL BWP. If active DL BWP is not configured for SI transmission (i.e. it is not the initial DL BWP), UE does not monitor for SI update indication in paging occasion(s) of DRX cycle. Otherwise if active DL BWP is configured for SI transmission (i.e. it is the initial DL BWP), UE shall monitor for SI update indication in any paging occasion of DRX cycle. If active DL BWP is configured for SI transmission, UE receives the updated SI indication broadcasted (e.g. in paging message or paging DCI) by gNB in active DL BWP. UE then receives the updated SIs broadcasted by gNB in the active DL BWP. See operations S1101, S1103 and S1105 shown in FIG. 11.

In another embodiment, UE is configured with one active DL BWP. If active DL BWP is not configured for SI transmission (i.e. gNB explicitly indicates that SI and/or paging is not transmitted in this BWP), UE receives the updated SI (e.g. one or more SIBs or SI messages) in dedicated RRC signaling in active DL BWP. gNB can indicate that SI and/or paging is transmitted in a BWP or not in the BWP configuration signaled to UE using RRC signaling. If active DL BWP is not configured for SI transmission, UE does not monitor for SI update indication in paging occasion(s) of DRX cycle. Otherwise if active DL BWP is configured for SI transmission (network explicitly indicates that SI and/or paging is transmitted in this BWP), UE shall monitor for SI update indication in any paging occasion of DRX cycle. If active DL BWP is configured for SI transmission, UE receives the updated SI indication broadcasted (e.g. in paging message or paging DCI) by gNB in active DL BWP. UE then receives the updated SIs broadcasted by gNB in the active DL BWP.

Embodiment 4

Figure 12:
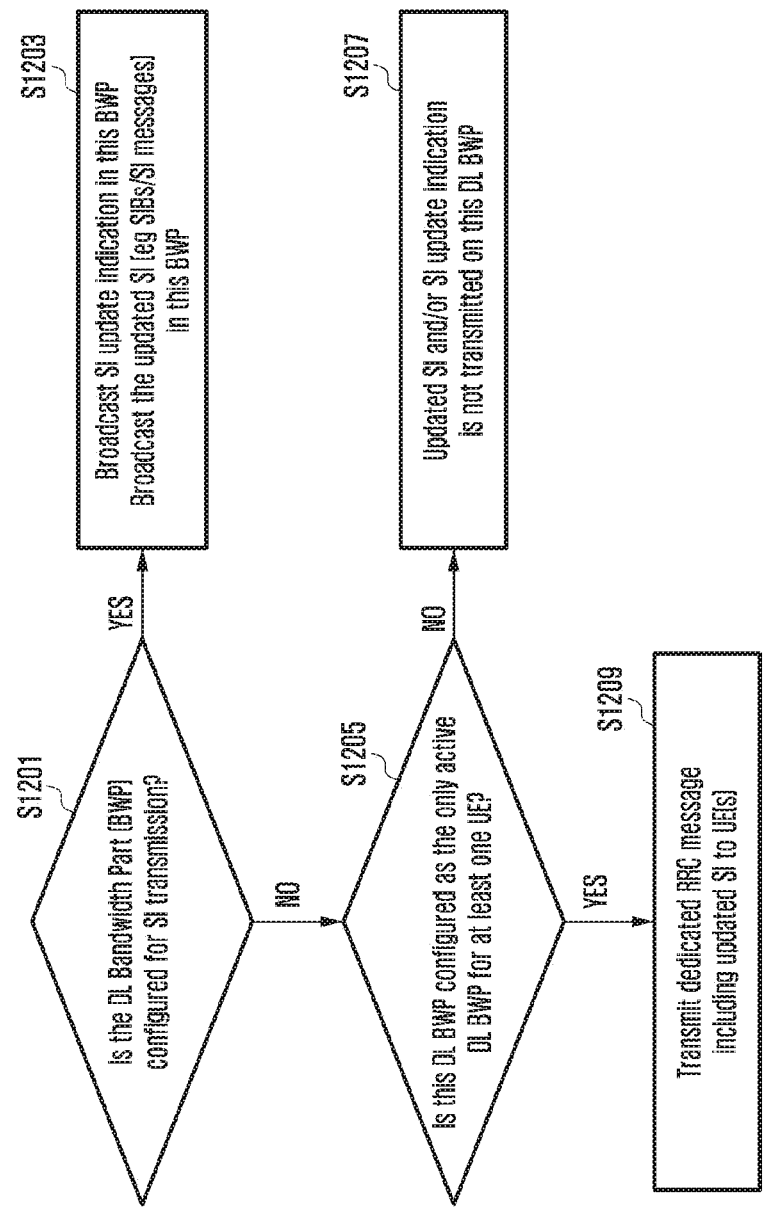
FIG. 12 illustrates the gNB operation for updating SI in a system wherein multiple DL BWPs are configured on a carrier according to an embodiment of the disclosure.

FIG. 12 illustrates the gNB operation for updating SI in a system wherein multiple DL BWPs are configured on a carrier or serving cell according to an embodiment of the disclosure. The gNB performs this operation for each configured DL BWP. See operations S1201 through S1209 shown in FIG. 12.

Figure 13:
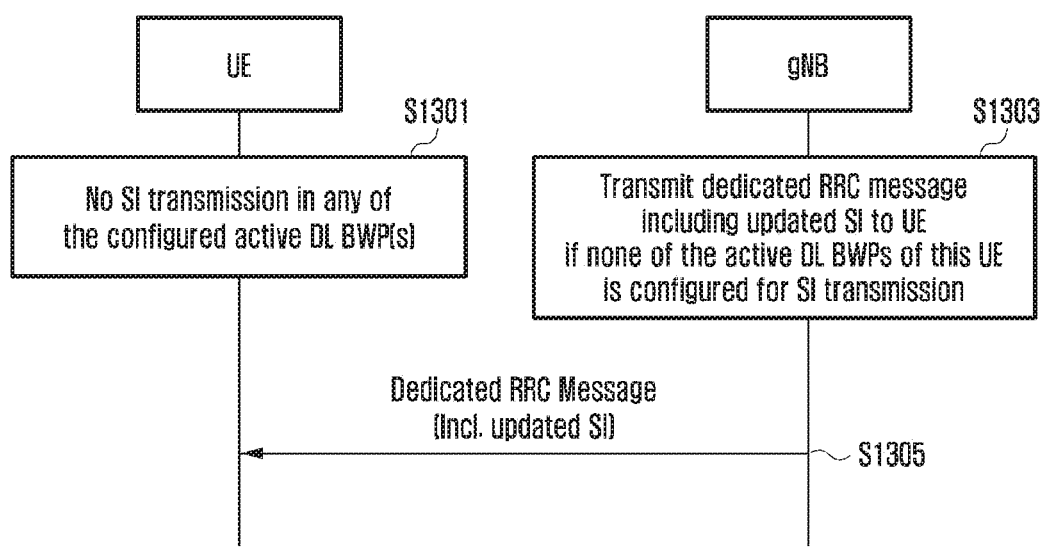
FIG. 13 illustrates an example of the signaling flow between UE and gNB according to an embodiment of the disclosure.
Figure 14:
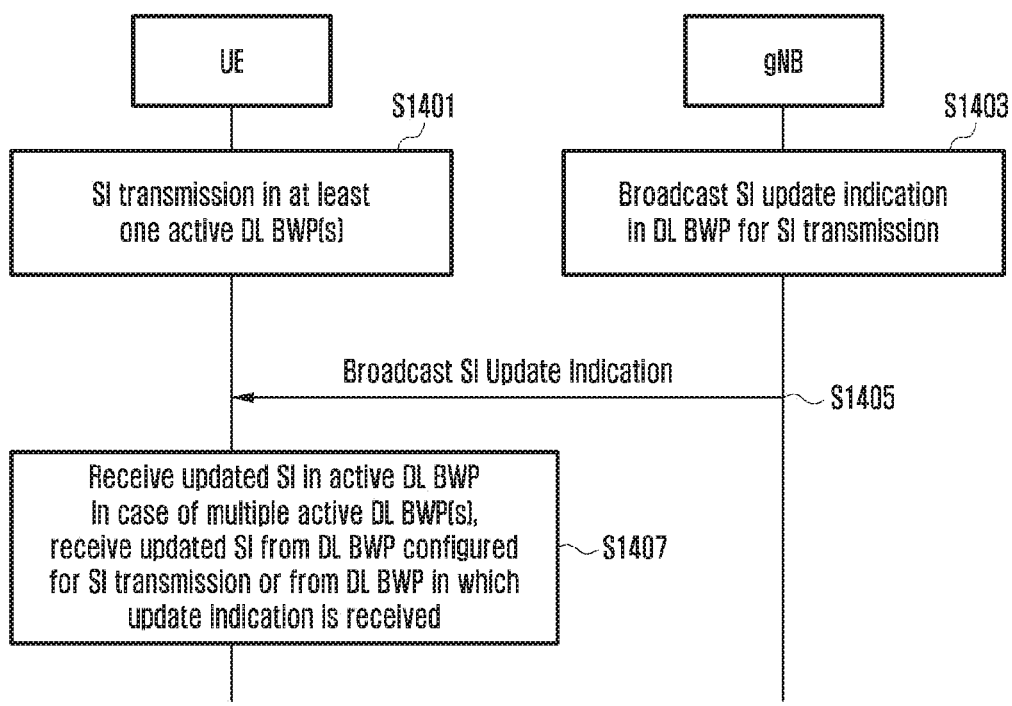
FIG. 14 illustrates another example of the signaling flow between UE and gNB according to an embodiment of the disclosure.

FIGS. 13 and 14 illustrate the signaling flow between UE and gNB in the proposed method according to various embodiments of the disclosure. In this method we propose that for one or more UE(s) in RRC Connected state which are configured with one or more active DL BWPs and each of the active DL BWPs are not configured for SI transmission (e.g. they are not the initial DL BWP or i.e. network explicitly indicates that SI and/or paging is not transmitted in this BWP)), gNB provides the updated SI in dedicated RRC signaling message (e.g. RRC Reconfiguration message). The dedicated RRC signaling message is transmitted by gNB in UE's active DL BWP. We propose to define an RRC signaling message to include SIB(s) or SI messages for delivering SI in a dedicated manner. See operations S1301, S1303 and S1305 shown in FIG. 13.

UE is configured with one or more active DL BWPs. If none of the active DL BWPs is configured for SI transmission (e.g. none of the active DL BWPs are the initial DL BWP), UE receives the updated SI in dedicated RRC signaling in active DL BWP. Otherwise, if at least one of the active DL BWPs is configured for SI transmission (e.g. active DL BWP is the initial DL BWP), UE shall monitor for SI update indication in any paging occasion of DRX cycle. If at least one of the active DL BWPs is configured for SI transmission (e.g. active DL BWP is the initial DL BWP), UE receives the SI update indication in broadcast signaling (i.e. in paging message or paging DCI) in active DL BWP and updated SIs in the active DL BWP configured for SI transmission. In case of multiple active DL BWP(s) configured for SI transmission, UE can receive updated SI from DL BWP indicated (e.g. in update indication) by network for SI transmission or UE can receive updated SI from DL BWP in which it has received update indication. See operations S1401 through S1407 shown in FIG. 14.

In another embodiment, UE is configured with one or more active DL BWPs. If none of the active DL BWPs is configured for SI transmission (i.e. gNB explicitly indicates that SI and/or paging is not transmitted in this BWP). gNB can indicate that SI and/or paging is transmitted in a BWP or not in the BWP configuration signaled to UE using RRC signaling. UE receives the updated SI in dedicated RRC signaling in active DL BWP. Otherwise, if at least one of the active DL BWPs is configured for SI transmission (i.e. network explicitly indicates that SI and/or paging is transmitted in this BWP), UE shall monitor for SI update indication in any paging occasion of DRX cycle. If at least one of the active DL BWPs is configured for SI transmission (i.e. network explicitly indicates that SI and/or paging is transmitted in this BWP), UE receives the SI update indication in broadcast signaling (i.e. in paging message or paging DCI) in active DL BWP and updated SIs in the active DL BWP configured for SI transmission. In case of multiple active DL BWP(s) configured for SI transmission, UE can receive updated SI from DL BWP indicated (e.g. in update indication) by network for SI transmission or UE can receive updated SI from DL BWP in which it has received update indication.

Method 2: SI Update Indication Followed by SI Request/Response to Acquire Updated SI Embodiment 5

Figure 15:
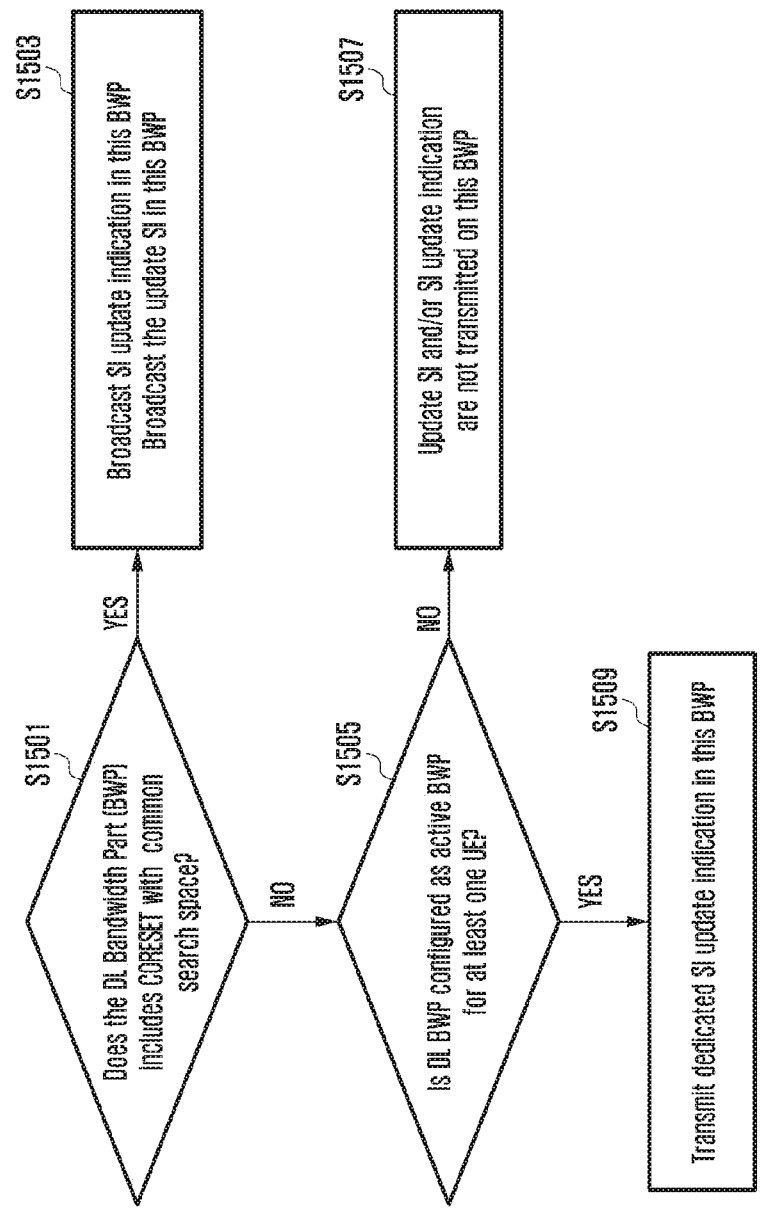
FIG. 15 illustrates the gNB operation for updating SI in a system wherein multiple DL BWPs are configured on a carrier according to an embodiment of the disclosure.

FIG. 15 illustrates the gNB operation for updating SI in a system wherein multiple DL BWPs are configured on a carrier or serving cell according to an embodiment of the disclosure. The gNB performs this operation for each configured DL BWP. See operations S1501 through S1509 shown in FIG. 15.

Figure 16:
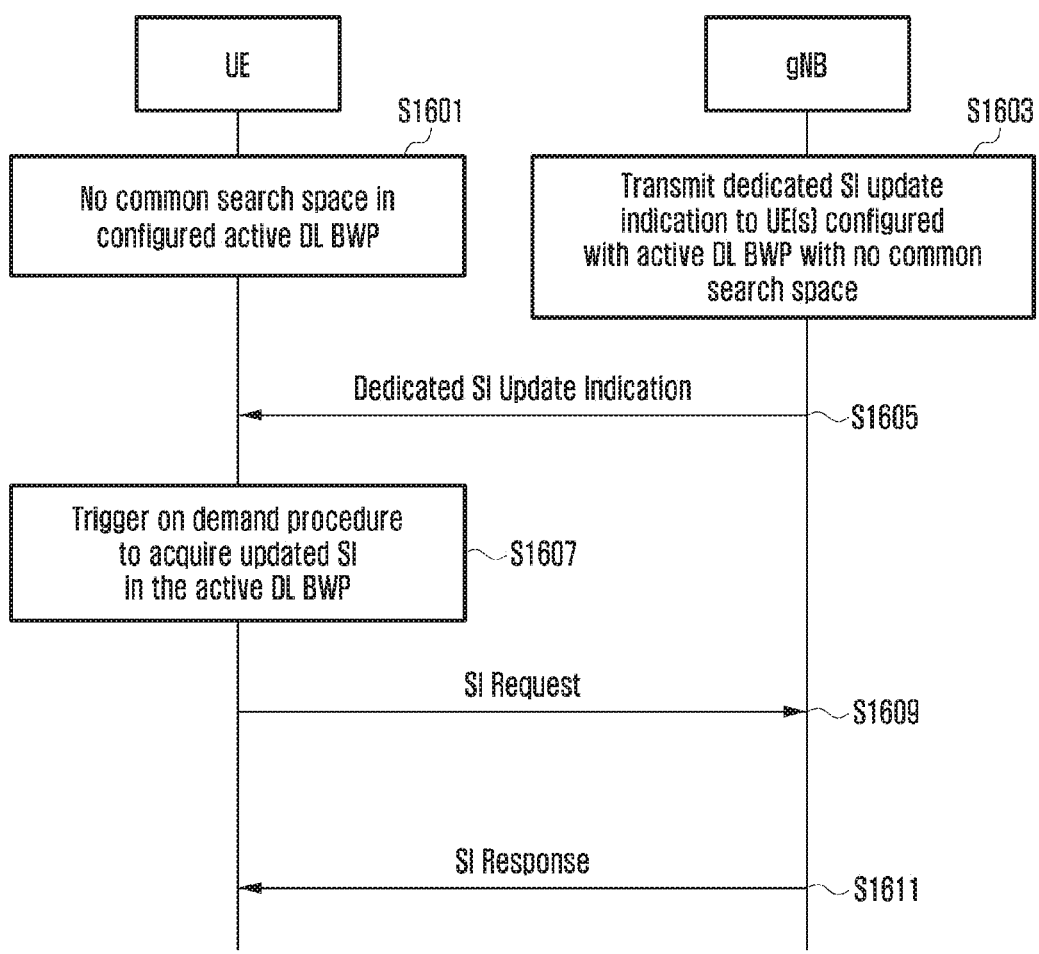
FIG. 16 illustrates an example of the signaling flow between UE and gNB according to an embodiment of the disclosure.
Figure 17:
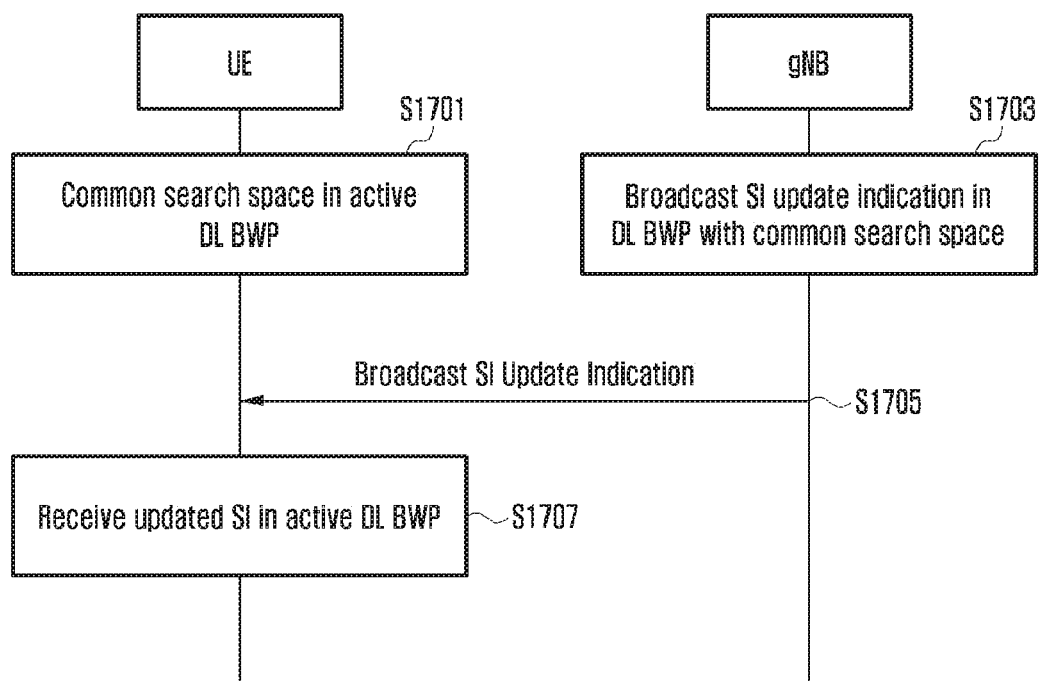
FIG. 17 illustrates another example of the signaling flow between UE and gNB according to an embodiment of the disclosure.

FIGS. 16 and 17 illustrate the signaling flow between UE and gNB in the proposed method according to various embodiments of the disclosure. In this method we propose that for one or more UE(s) in RRC Connected state which are configured with active DL BWP without common search space, gNB provides the updated SI indication in dedicated manner according to various embodiments of the disclosure. The dedicated SI update indication is transmitted by gNB in UE's active DL BWP. A new RRC message can be defined to transmit SI update indication in dedicated manner. Alternately paging message with SI update indication can be transmitted in dedicated manner by transmitting physical downlink common control channel (PDCCH) for TB carrying paging message using UE's cell-radio network temporary identity (C-RNTI). Alternately SI update indication can be transmitted in dedicated manner by transmitting PDCCH carrying DCI for SI update using UE's C-RNTI.

In an embodiment, if the DL BWP is configured with common search space(s) for SI and paging, gNB broadcast SI update indication in this BWP and also broadcast the updated SI in this BWP.

In another embodiment, if the DL BWP is configured as active BWP for at least one UE and it is configured with common search space(s) for SI and paging, gNB broadcast SI update indication in this BWP and also broadcast the updated SI in this BWP. If the DL BWP is configured as active BWP for at least one UE and it is not configured with common search space, gNB provides the SI update indication in dedicated RRC signaling.

In this method, UE is configured with one active DL BWP. If active DL BWP is not configured with common search space for monitoring paging, UE receives the SI update indication in dedicated RRC signaling in active DL BWP. UE then triggers On Demand SI procedure to acquire the update SI in active DL BWP. Otherwise if active DL BWP is configured with common search space(s) for SI and paging, UE receives the SI update indication in broadcast signaling in active DL BWP. UE then receives the updated SI in active DL BWP. See operations S1601 through S1611 shown in FIG. 16.

In an embodiment, after receiving the SI update indication, if the active DL BWP is configured with common search space, UE receives the updated SI in active DL BWP and UE does not sent SI request. Otherwise UE acquire the SI using on demand SI procedure (i.e. UE sends SI request). In another embodiment, after receiving the SI update indication, if the SI updated was received in broadcast signaling, UE receives the updated SI in active DL BWP and UE does not sent SI request. Otherwise UE acquire the SI using on demand SI procedure (i.e. UE sends SI request). In another embodiment, after receiving the SI update indication, if the SI updated was received in dedicated RRC signaling, UE receives the updated SI in active DL BWP and UE does not sent SI request. Otherwise UE acquire the SI using on demand SI procedure (i.e. UE sends SI request). See operations S1701 through S1707 shown in FIG. 17.

Embodiment 5A

In an embodiment of the disclosure, we propose that for one or more UE(s) in RRC Connected state which are configured with active DL BWP wherein the active DL BWP is not the initial DL BWP, gNB broadcasts the SI update notification in active DL BWP. In the initial DL BWP, gNB broadcasts the SI update notification. Initial DL BWP is the BWP where the UE/gNB receives/transmits the remaining minimum system information i.e. RMSI. The initial DL BWP is defined as frequency location and bandwidth of RMSI CORESET and numerology of RMSI. The PDSCH delivering RMSI are confined within the initial DL BWP.

Figure 18:
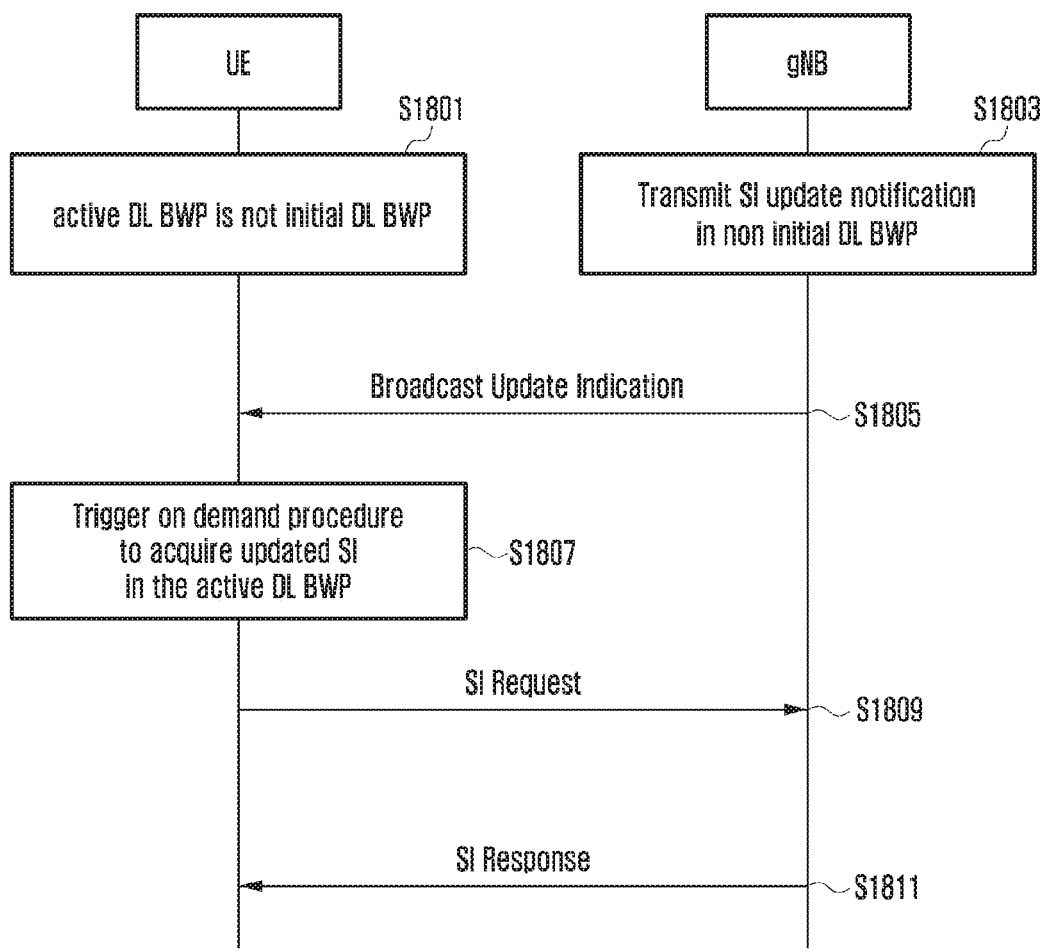
FIG. 18 illustrates an example of the signaling flow between UE and gNB according to an embodiment of the disclosure.

FIG. 18 illustrates an example of the signaling flow between UE and gNB according to an embodiment of the disclosure.

Figure 19:
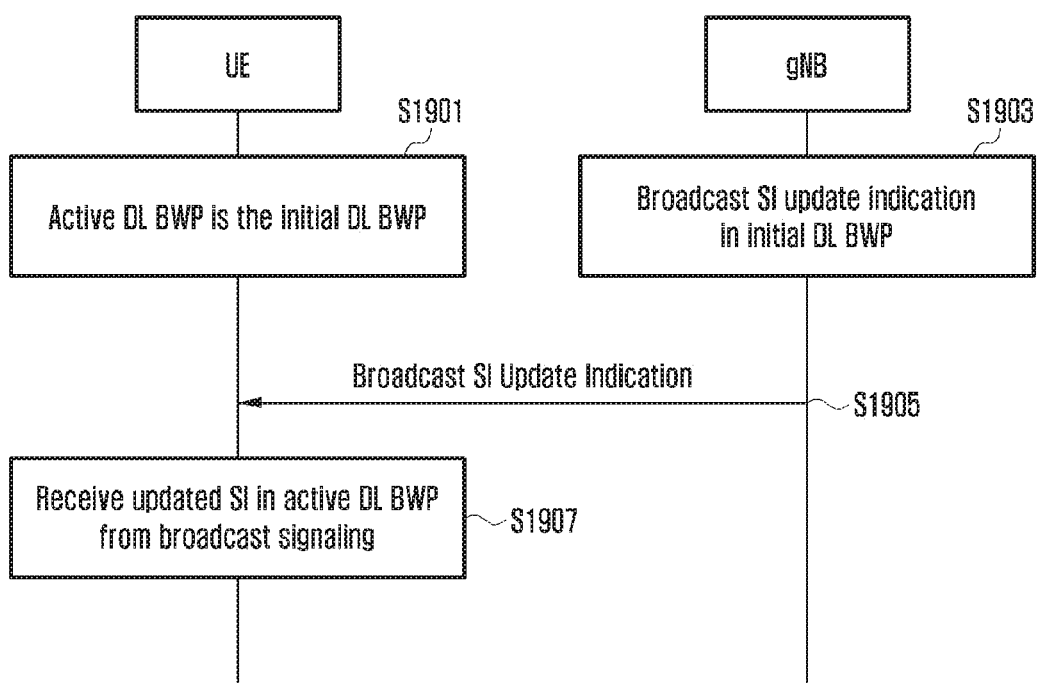
FIG. 19 illustrates another example of the signaling flow between UE and gNB according to an embodiment of the disclosure.

FIG. 19 illustrates another example of the signaling flow between UE and gNB according to an embodiment of the disclosure.

UE receives the SI update notification/indication in its active DL BWP irrespective of whether it is the initial DL BWP or not. If the active DL BWP is not the initial DL BWP, upon receiving the SI update notification/indication, UE can trigger On Demand SI procedure to acquire the updated SI in its active DL BWP as shown in FIG. 18. See operations S1801 through S1811 shown in FIG. 18. Otherwise if active DL BWP is the initial DL BWP, upon receiving the SI update notification/indication UE receives the updated SI in active DL BWP from the broadcast signaling as shown in FIG. 19. See operations S1901 through S1907 shown in FIG. 19.

Embodiment 6

Figure 20:
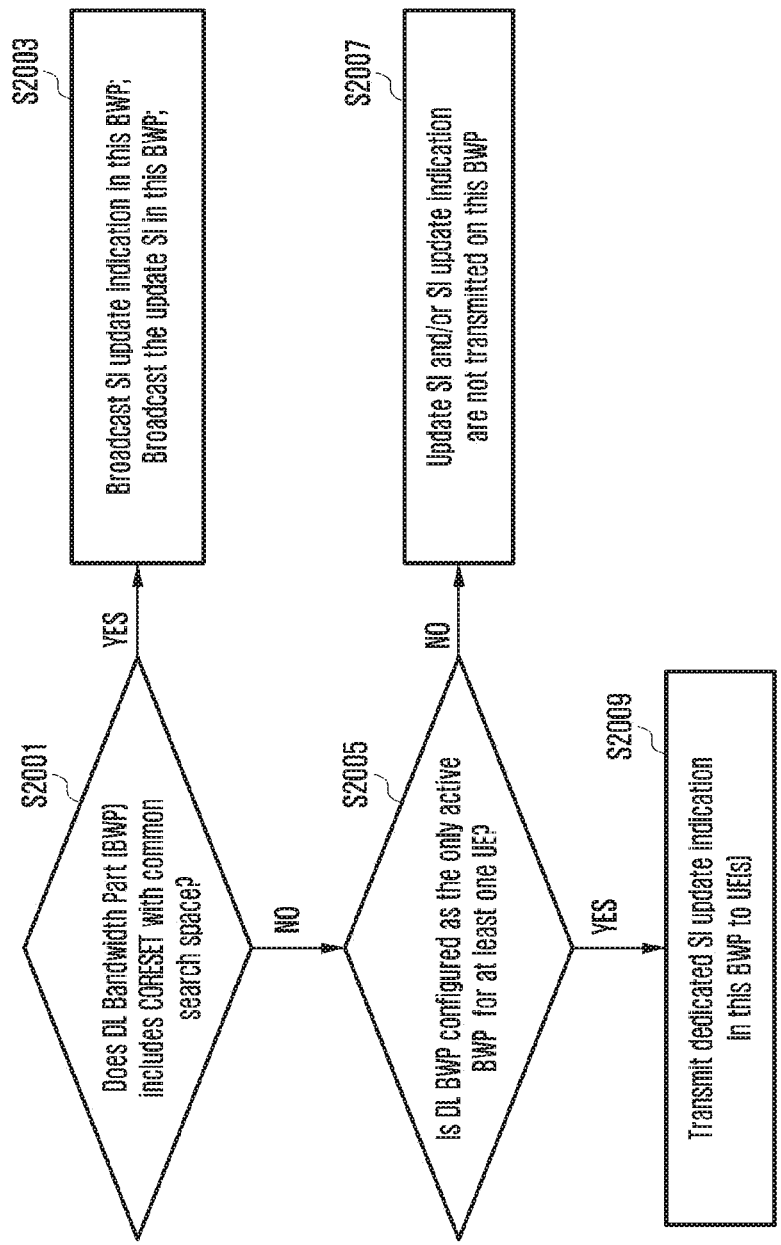
FIG. 20 illustrates the gNB operation for updating SI in a system wherein multiple DL BWPs are configured on a carrier according to an embodiment of the disclosure.

FIG. 20 illustrates the gNB operation for updating SI in a system wherein multiple DL BWPs are configured on a carrier or serving cell according to an embodiment of the disclosure. The gNB performs this operation for each configured DL BWP. See operations S2001 through S2009 shown in FIG. 20.

Figure 21:
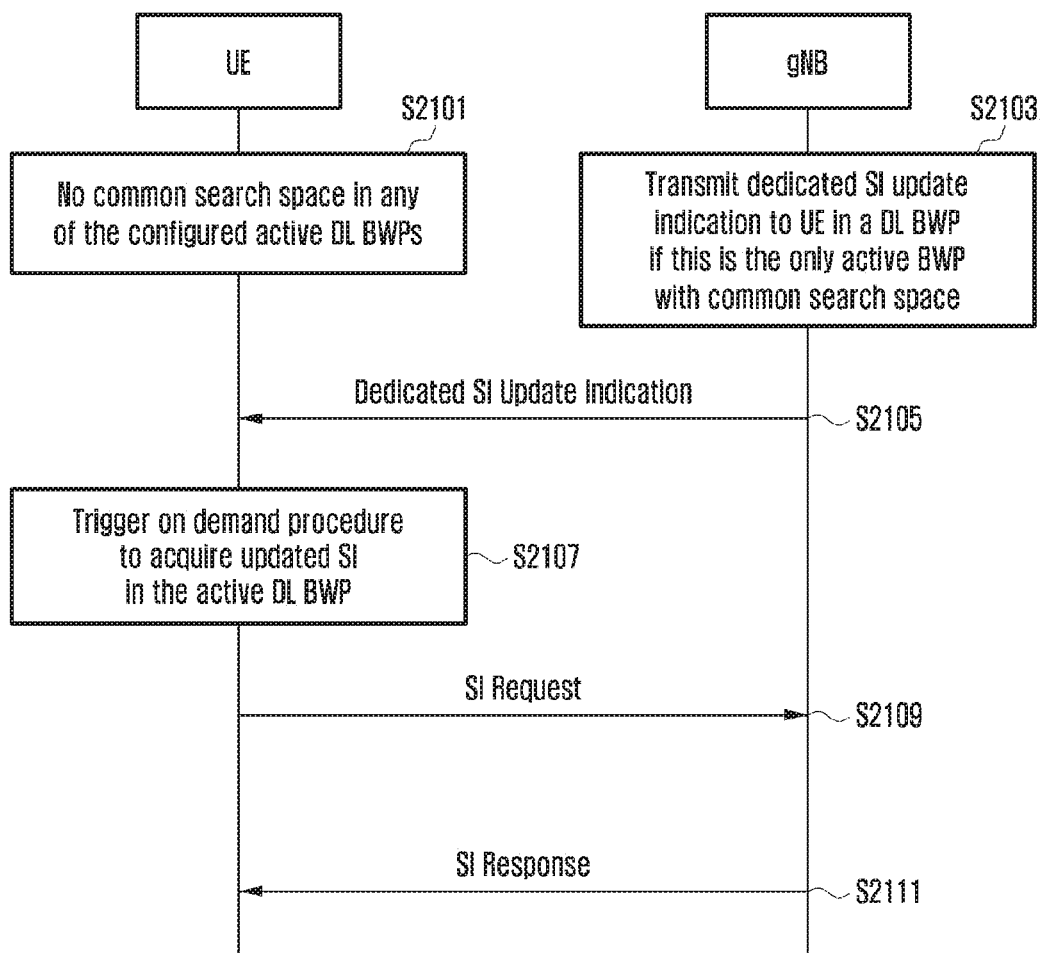
FIG. 21 illustrates an example of the signaling flow between UE and gNB according to an embodiment of the disclosure.
Figure 22:
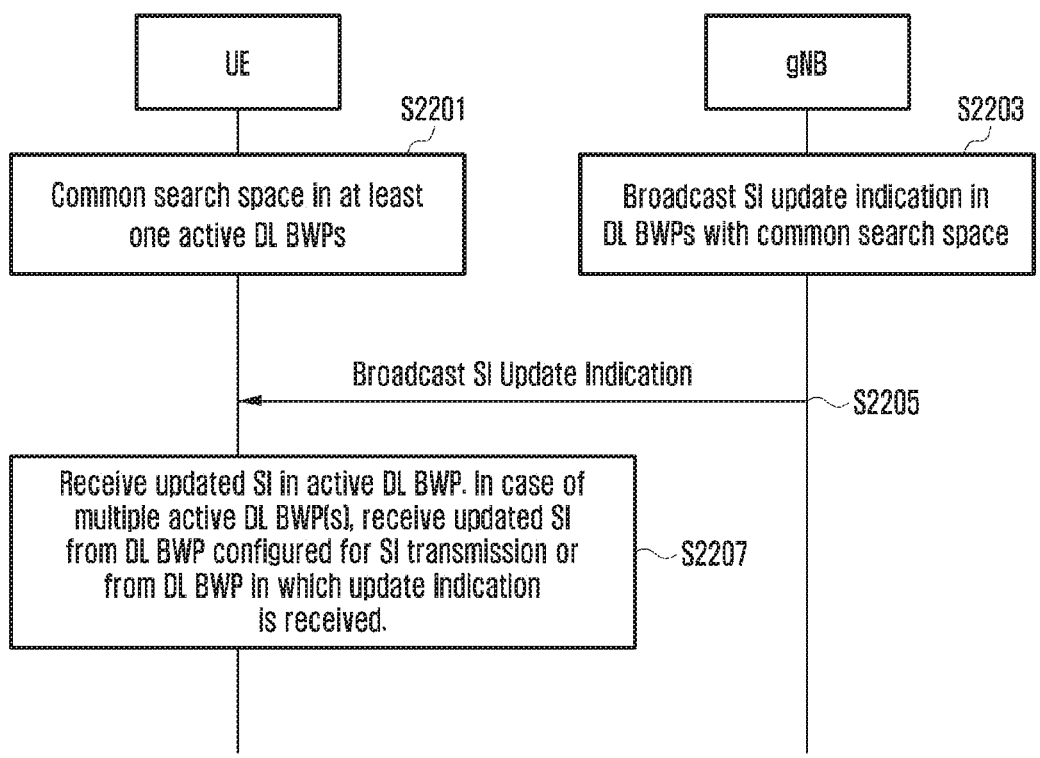
FIG. 22 illustrates another example of the signaling flow between UE and gNB according to an embodiment of the disclosure.

FIGS. 21 and 22 illustrate the signaling flow between UE and gNB in the proposed method according to various embodiments of the disclosure.

In this method we propose that for one or more UE(s) in RRC Connected state which are configured with one or more active DL BWPs and each of the active DL BWPs are configured without common search space, gNB provides the updated SI indication in dedicated manner. The dedicated SI update indication is transmitted by gNB in UE's active DL BWP. A new RRC message can be defined to transmit SI update indication in dedicated manner. Alternately paging message with SI update indication can be transmitted in dedicated manner by transmitting PDCCH for TB carrying paging message using UE's C-RNTI. Alternately SI update indication can be transmitted in dedicated manner by transmitting PDCCH carrying DCI for SI update using UE's C-RNTI.

In an embodiment, if the DL BWP is configured with common search space, gNB broadcast SI update indication in this BWP and also broadcast the updated SI in this BWP.

In another embodiment, if the DL BWP is configured as active BWP for at least one UE and it is configured with common search space, gNB broadcast SI update indication in this BWP and also broadcast the updated SI in this BWP. If the DL BWP is configured as active BWP for at least one UE and it is not configured with common search space, gNB provides the SI update indication in dedicated RRC signaling.

In this method, UE is configured with one or more active DL BWPs. If none of the active DL BWPs is configured with common search space, UE receives the SI update indication in dedicated RRC signaling in active DL BWP. UE then triggers On Demand SI procedure to acquire the update SI in active DL BWP. Otherwise if at least one of the active DL BWPs is configured with common search space, UE receives the SI update indication in broadcast signaling in active DL BWP. UE then receives the updated SI in active DL BWP. In case of multiple active DL BWP(s) with common search space(s) for SI and paging, UE can receive updated SI from DL BWP indicated (e.g. in update indication) by network for SI transmission or UE can receive updated SI from DL BWP in which it has received update indication.

In an embodiment, after receiving the SI update indication, if at least one active DL BWP is configured with common search space, UE receives the updated SI in active DL BWP and UE does not sent SI request. Otherwise UE acquire the SI using on demand SI procedure (i.e. UE sends SI request). In another embodiment, after receiving the SI update indication, if the SI updated was received in broadcast signaling, UE receives the updated SI in active DL BWP and UE does not sent SI request. Otherwise UE acquire the SI using on demand SI procedure (i.e. UE sends SI request). In another embodiment, after receiving the SI update indication, if the SI updated was received in dedicated RRC signaling, UE receives the updated SI in active DL BWP and UE does not sent SI request. Otherwise UE acquire the SI using on demand SI procedure (i.e. UE sends SI request).

Embodiment 6A

In an embodiment of the disclosure, we propose that for one or more UE(s) in RRC Connected state which are configured with active DL BWP wherein the active DL BWP is not the initial DL BWP, gNB broadcasts the SI update notification in active DL BWP. In the initial DL BWP, gNB broadcasts the SI update notification. Initial DL BWP is the BWP where the UE/gNB receives/transmits the remaining minimum system information i.e. RMSI. The initial DL BWP is defined as frequency location and bandwidth of RMSI CORESET and numerology of RMSI. The PDSCH delivering RMSI are confined within the initial DL BWP. UE receives the SI update notification/indication in its active DL BWP irrespective of whether it is the initial DL BWP or not. If none of the active DL BWP(s) is the initial DL BWP, upon receiving the SI update notification/indication, UE can trigger On Demand SI procedure to acquire the updated SI in its active DL BWP (see operations S2101 through S2111 shown in FIG. 21). Otherwise if at least one of the active DL BWP is the initial DL BWP, upon receiving the SI update notification/indication UE receives the updated SI in active DL BWP from the broadcast signaling. See operations S2201 through S2207 shown in FIG. 22.

Embodiment 7

Figure 23:
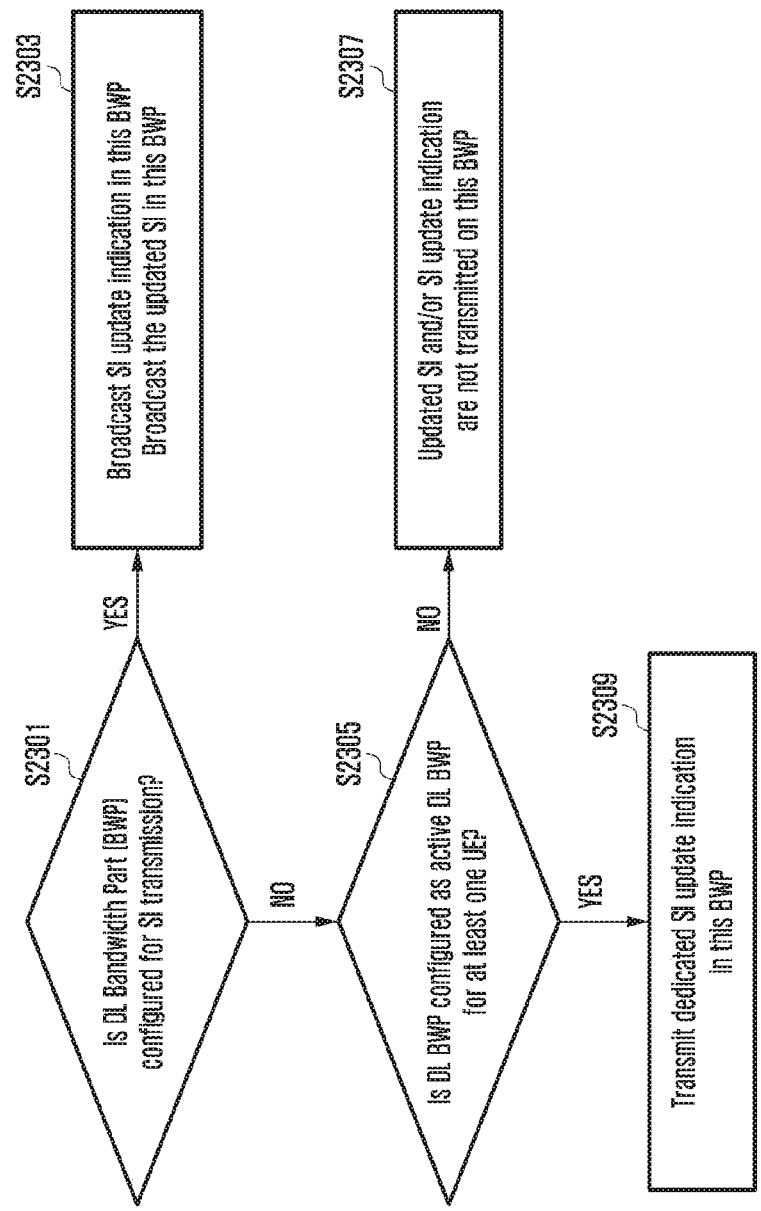
FIG. 23 illustrates the gNB operation for updating SI in a system wherein multiple DL BWPs are configured on a carrier according to an embodiment of the disclosure.

FIG. 23 illustrates the gNB operation for updating SI in a system wherein multiple DL BWPs are configured on a carrier or serving cell according to an embodiment of the disclosure. The gNB performs this operation for each configured DL BWP. See operations S2301 through S2309 shown in FIG. 23.

Figure 24:
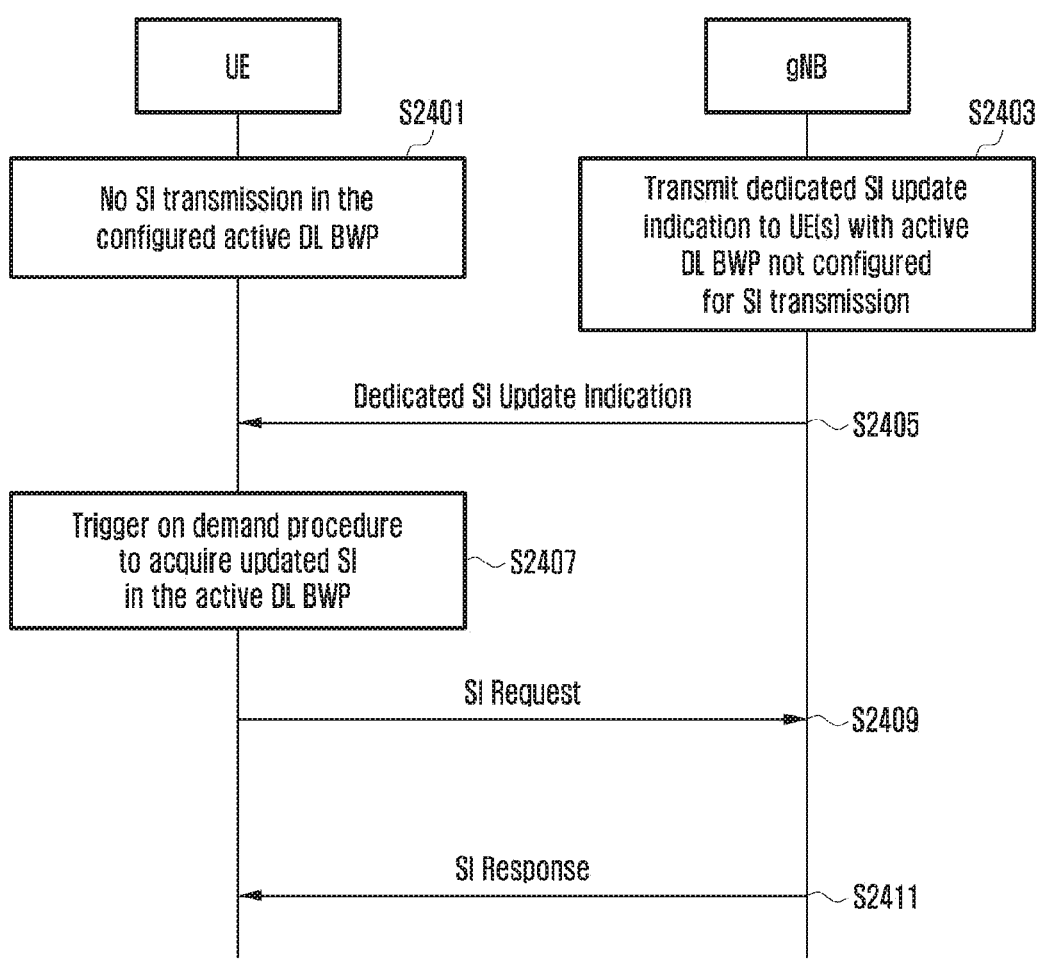
FIG. 24 illustrates an example of the signaling flow between UE and gNB according to an embodiment of the disclosure.
Figure 25:
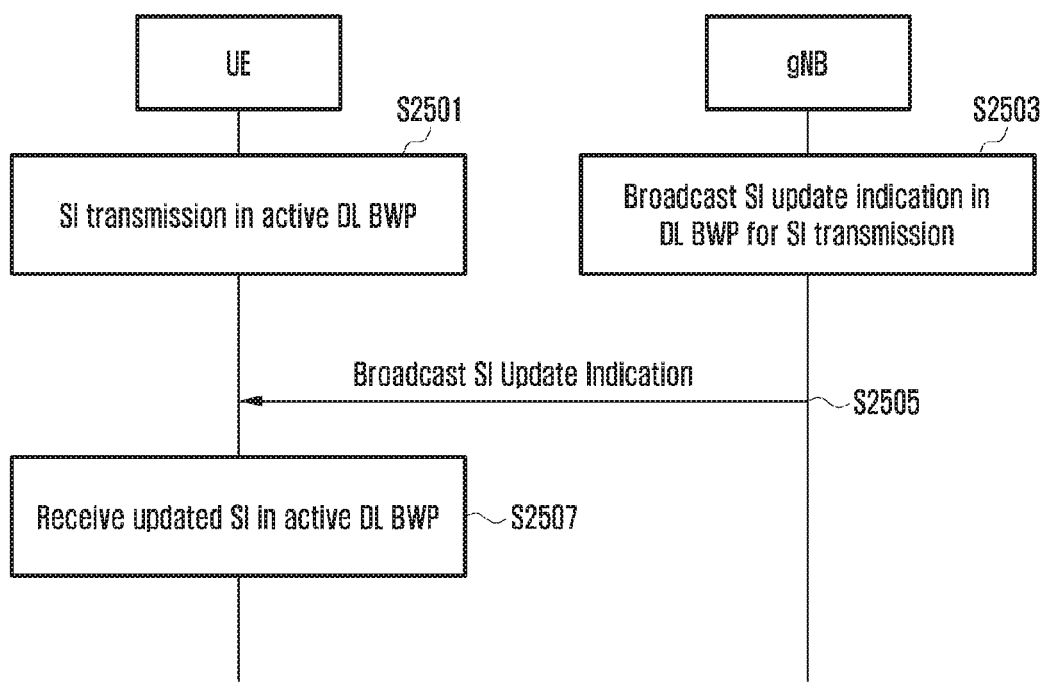
FIG. 25 illustrates another example of the signaling flow between UE and gNB according to an embodiment of the disclosure.

FIGS. 24 and 25 illustrate the signaling flow between UE and gNB in the proposed method according to various embodiments of the disclosure. In this method we propose that for one or more UE(s) which are configured with active DL BWP in which SI is not transmitted (e.g. active DL BWP is not the initial DL BWP), gNB provides the updated SI indication in dedicated manner. The dedicated SI update indication is transmitted by gNB in UE's active DL BWP. A new RRC message can be defined to transmit SI update indication in dedicated manner. Alternately paging message with SI update indication can be transmitted in dedicated manner by transmitting PDCCH for TB carrying paging message using UE's C-RNTI. Alternately SI update indication can be transmitted in dedicated manner by transmitting PDCCH carrying DCI for SI update using UE's C-RNTI.

In this method, UE is configured with one active DL BWP. If active DL BWP is not configured for SI transmission (e.g. active DL BWP is not the initial DL BWP or gNB explicitly indicates that SI and/or paging is not transmitted in this BWP), UE receives the SI update indication in dedicated RRC signaling in active DL BWP. gNB can indicate that SI and/or paging is transmitted in a BWP or not in the BWP configuration signaled to UE using RRC signaling. UE then triggers On Demand SI procedure to acquire the update SI in active DL BWP. Otherwise if active DL BWP is configured for SI transmission (i.e. active DL BWP is the initial DL BWP or gNB explicitly indicates that SI and/or paging is transmitted in this BWP), UE receives the SI update indication in broadcast signaling (e.g. paging message or paging DCI) in active DL BWP. UE then receives the updated SI in active DL BWP.

In an embodiment, after receiving the SI update indication, if the active DL BWP is configured for SI transmission (e.g. active DL BWP is not the initial DL BWP or gNB explicitly indicates that SI and/or paging is not transmitted in this BWP)), UE receives the updated SI in active DL BWP and UE does not sent SI request. Otherwise UE acquire the SI using on demand SI procedure (i.e. UE sends SI request). In another embodiment, after receiving the SI update indication, if the SI updated was received in broadcast signaling, UE receives the updated SI in active DL BWP and UE does not sent SI request. Otherwise UE acquire the SI using on demand SI procedure (i.e. UE sends SI request). In another embodiment, after receiving the SI update indication, if the SI updated was received in dedicated RRC signaling, UE receives the updated SI in active DL BWP and UE does not sent SI request. Otherwise UE acquire the SI using on demand SI procedure (i.e. UE sends SI request).

Embodiment 8

Figure 26:
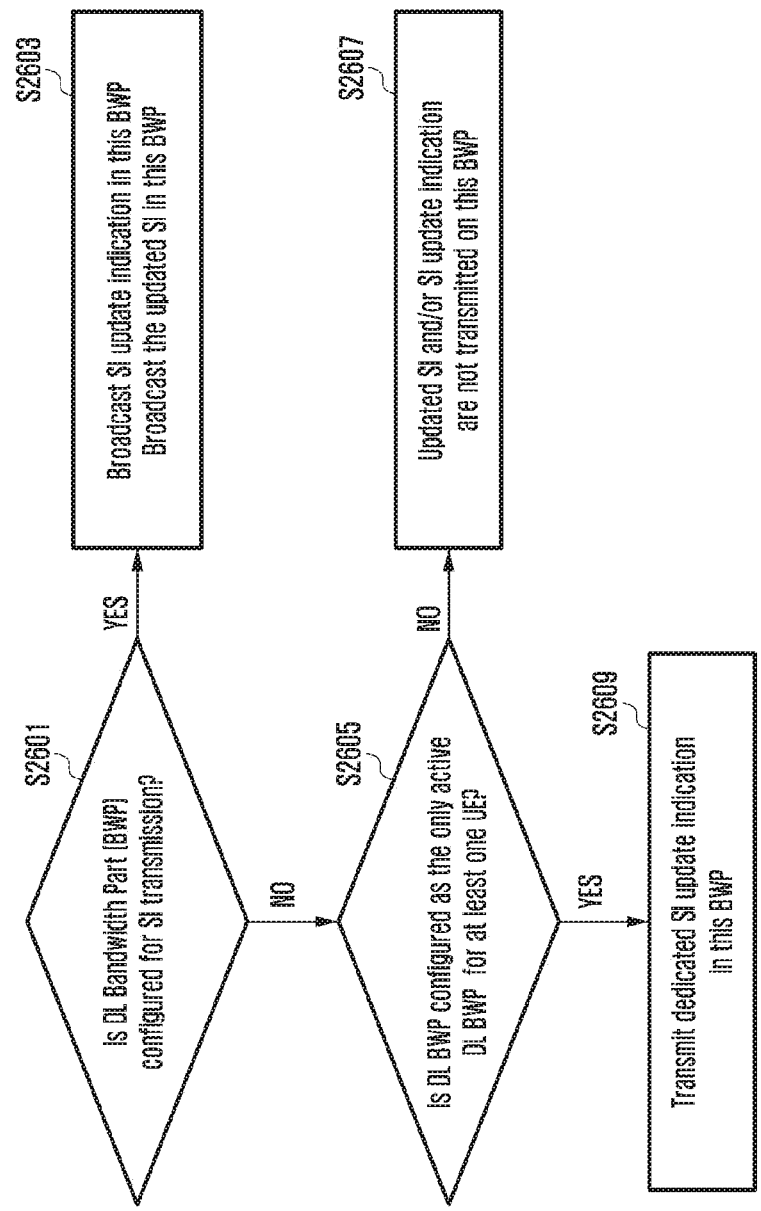
FIG. 26 illustrates the gNB operation for updating SI in a system wherein multiple DL BWPs are configured on a carrier according to an embodiment of the disclosure.

FIG. 26 illustrates the gNB operation for updating SI in a system wherein multiple DL BWPs are configured on a carrier or serving cell according to an embodiment of the disclosure. The gNB performs this operation for each configured DL BWP. See operations S2601 through S2609 shown in FIG. 26.

Figure 27:
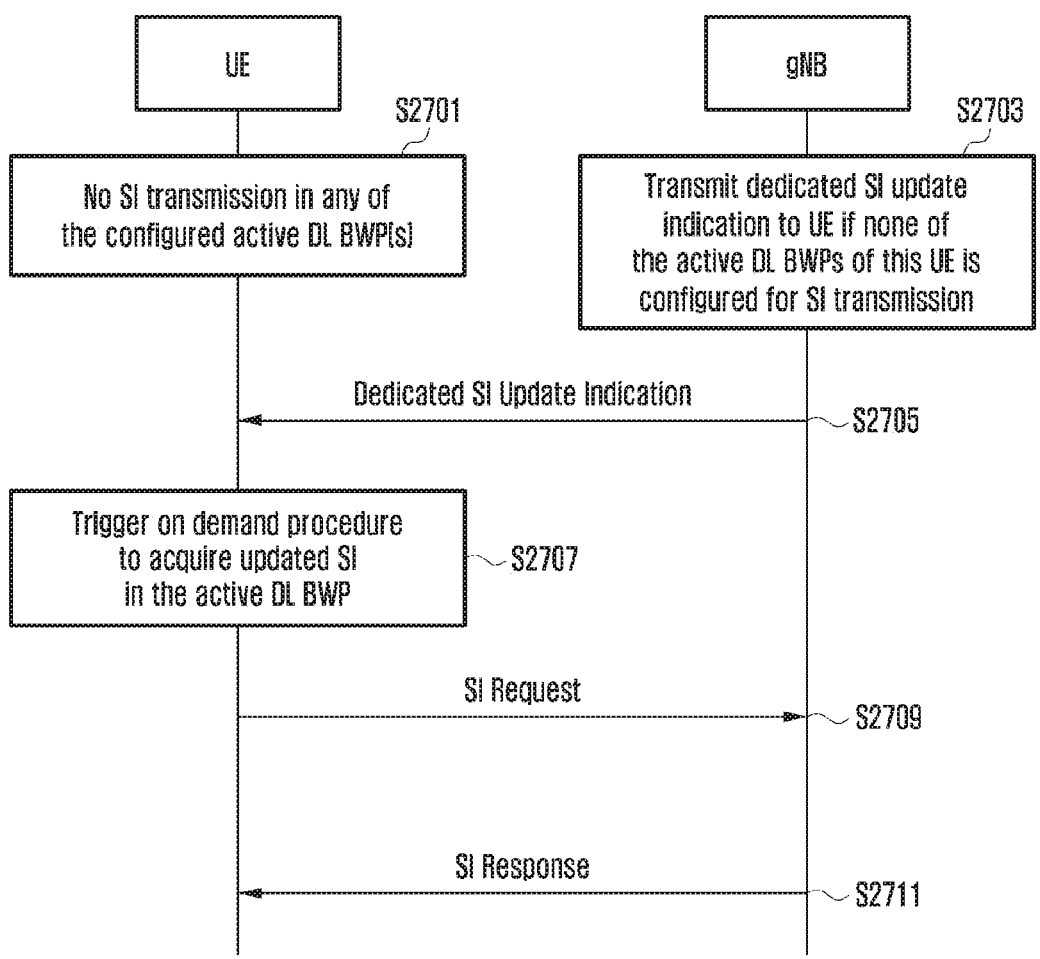
FIG. 27 illustrates an example of the signaling flow between UE and gNB according to an embodiment of the disclosure.
Figure 28:
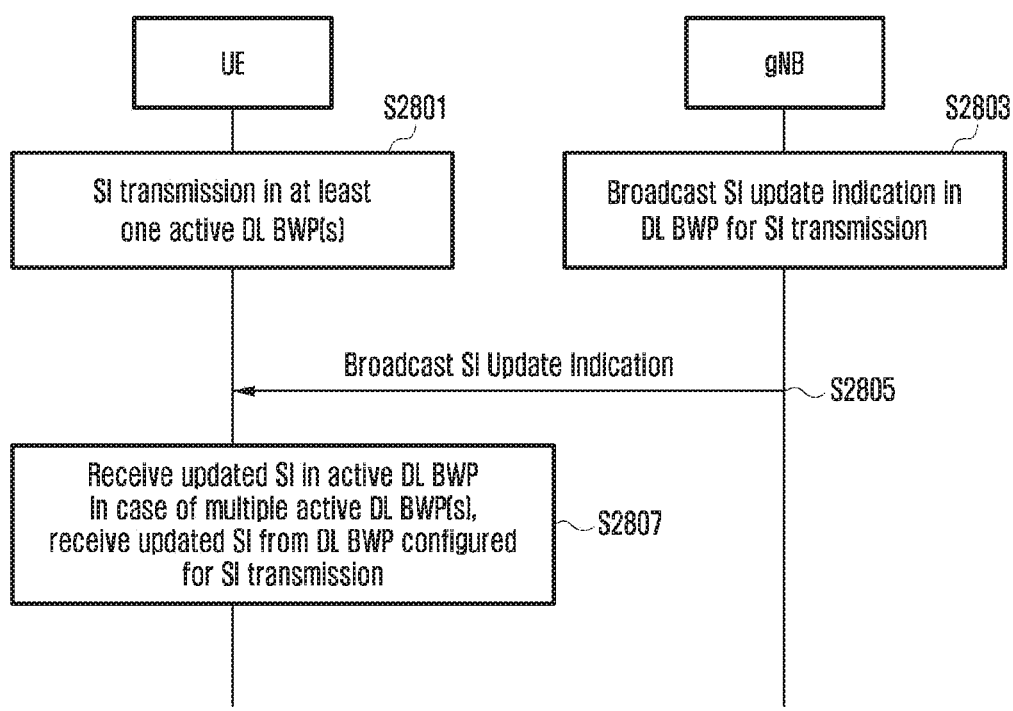
FIG. 28 illustrates another example of the signaling flow between UE and gNB according to an embodiment of the disclosure.

FIGS. 27 and 28 illustrate the signaling flow between UE and gNB in the proposed method according to various embodiments of the disclosure. In this method we propose that for one or more UE(s) in RRC Connected state which are configured with one or more active DL BWPs and each of the active DL BWPs are not configured for SI transmission (e.g. each active DL BWP is not the initial DL BWP), gNB provides the updated SI indication in dedicated manner. The dedicated SI update indication is transmitted by gNB in UE's active DL BWP. A new RRC message can be defined to transmit SI update indication in dedicated manner. Alternately paging message with SI update indication can be transmitted in dedicated manner by transmitting PDCCH for TB carrying paging message using UE's C-RNTI. Alternately SI update indication can be transmitted in dedicated manner by transmitting PDCCH carrying DCI for SI update using UE's C-RNTI.

In this method, UE is configured with one or more active DL BWPs. If none of the active DL BWPs is configured for SI transmission (i.e. each active DL BWP is not the initial DL BWP or gNB explicitly indicates that SI and/or paging is not transmitted in this BWP), UE receives the SI update indication in dedicated RRC signaling in active DL BWP. gNB can indicate that SI and/or paging is transmitted in a BWP or not in the BWP configuration signaled to UE using RRC signaling. UE then triggers On Demand SI procedure to acquire the update SI in active DL BWP (see operations S2701 through S2711 shown in FIG. 27). Otherwise, if at least one of the active DL BWPs is configured for SI transmission (i.e. active DL BWP is the initial DL BWP or gNB explicitly indicates that SI and/or paging is transmitted in this BWP), UE receives the SI update indication in broadcast signaling in active DL BWP and updated SIs in the active DL BWP configured for SI transmission. In case of multiple active DL BWP(s) configured for SI transmission, UE can receive updated SI from DL BWP indicated (e.g. in update indication) by network for SI transmission or UE can receive updated SI from DL BWP in which it has received update indication (see operations S2801 through S2807 shown in FIG. 28).

In an embodiment, after receiving the SI update indication, if at least one active DL BWP is configured for SI transmission (e.g. at least one active DL BWP is the initial DL BWP), UE receives the updated SI in active DL BWP and UE does not sent SI request. Otherwise UE acquire the SI using on demand SI procedure (i.e. UE sends SI request). In another embodiment, after receiving the SI update indication, if the SI updated was received in broadcast signaling, UE receives the updated SI in active DL BWP and UE does not sent SI request. Otherwise UE acquire the SI using on demand SI procedure (i.e. UE sends SI request). In another embodiment, after receiving the SI update indication, if the SI updated was received in dedicated RRC signaling, UE receives the updated SI in active DL BWP and UE does not sent SI request. Otherwise UE acquire the SI using on demand SI procedure (i.e. UE sends SI request).

Method 3: SI Update Indication Followed by BWP Switch Procedure Initiated by UE

Embodiment 9

FIG. 15 illustrates the gNB operation for updating SI in a system wherein multiple DL BWPs are configured on a carrier or serving cell. The gNB performs this operation for each configured DL BWP.

Figure 29:
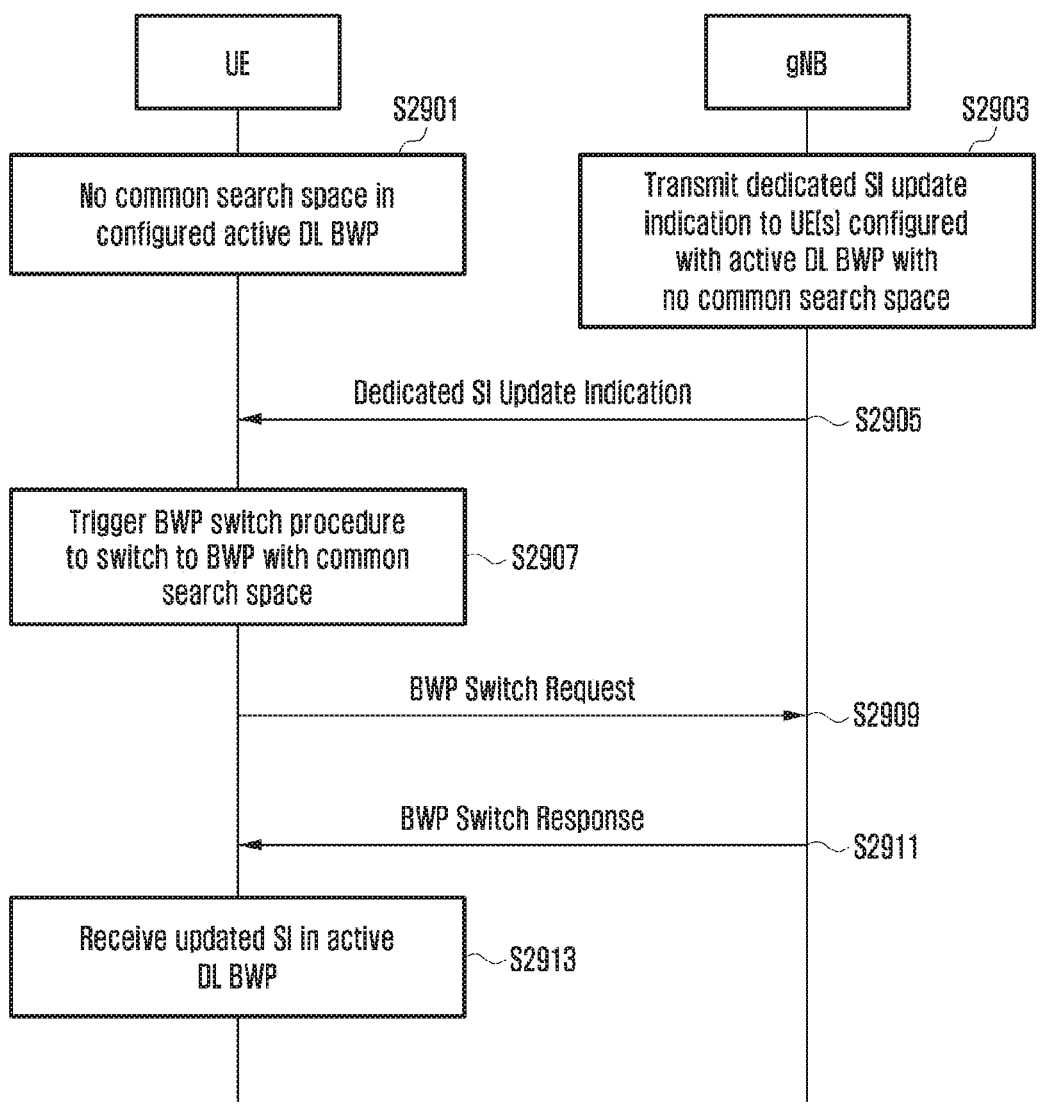
FIG. 29 illustrates an example of the signaling flow between UE and gNB according to an embodiment of the disclosure.
Figure 30:
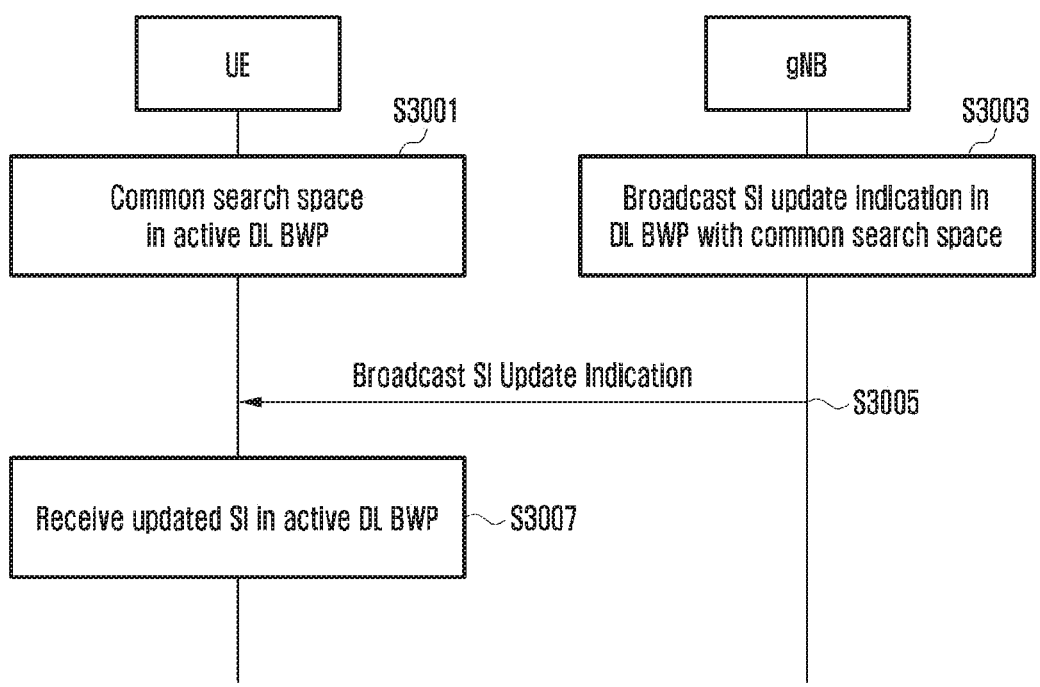
FIG. 30 illustrates another example of the signaling flow between UE and gNB according to an embodiment of the disclosure.

FIGS. 29 and 30 illustrate the signaling flow between UE and gNB in the proposed method according to various embodiments of the disclosure. In this method we propose that for one or more UE(s) in RRC Connected state which are configured with active DL BWP without common search space, gNB provides the updated SI indication in dedicated manner. The dedicated SI update indication is transmitted by gNB in UE's active DL BWP. A new RRC message can be defined to transmit SI update indication in dedicated manner. Alternately paging message with SI update indication can be transmitted in dedicated manner by transmitting PDCCH for TB carrying paging message using UE's C-RNTI. Alternately SI update indication can be transmitted in dedicated manner by transmitting PDCCH carrying DCI for SI update using UE's C-RNTI.

In an embodiment, if the DL BWP is configured with with common search space(s) for SI and paging, gNB broadcast SI update indication in this BWP and also broadcast the updated SI in this BWP.

In another embodiment, if the DL BWP is configured as active BWP for at least one UE and it is configured with common search space (s) for SI and paging, gNB broadcast SI update indication in this BWP and also broadcast the updated SI in this BWP. If the DL BWP is configured as active BWP for at least one UE and it is not configured with common search space, gNB provides the SI update indication in dedicated RRC signaling.

In this method, UE is configured with one active DL BWP. If active DL BWP is not configured with common search space, UE receives the SI update indication in dedicated RRC signaling in active DL BWP. UE then triggers BWP switch procedure to switch to BWP with common search space for SI. UE then receives the updated SI in active DL BWP (see operations S2901 through S2913 shown in FIG. 29). Otherwise if active DL BWP is configured with common search space(s) for SI and paging, UE receives the SI update indication in broadcast signaling (e.g. paging message or paging DCI) in active DL BWP, and the UE then receives the updated SI in active DL BWP (see operations S3001 through S3007 shown in FIG. 30).

In an embodiment, after receiving the SI update indication, if the active DL BWP is configured with common search space for SI, UE receives the updated SI in active DL BWP and UE does not trigger BWP switch procedure. Otherwise UE trigger BWP switch procedure. In another embodiment, after receiving the SI update indication, if the SI updated was received in broadcast signaling (e.g. paging message or paging DCI), UE receives the updated SI in active DL BWP and UE does not trigger BWP switch procedure. Otherwise UE trigger BWP switch procedure. In another embodiment, after receiving the SI update indication, if the SI updated was received in dedicated RRC signaling, UE does not trigger BWP switch procedure. Otherwise UE trigger BWP switch procedure.

Embodiment 9A

In an embodiment of the disclosure, we propose that for one or more UE(s) in RRC Connected state which are configured with active DL BWP wherein the active DL BWP is not the initial DL BWP, gNB broadcasts (or transmit in dedicated signaling) the SI update notification in active DL BWP. In the initial DL BWP, gNB broadcasts (e.g. in paging message or paging DCI) the SI update notification. Initial DL BWP is the BWP where the UE/gNB receives/transmits the remaining minimum system information i.e. RMSI. The initial DL BWP is defined as frequency location and bandwidth of RMSI CORESET and numerology of RMSI. The PDSCH delivering RMSI are confined within the initial DL BWP.

Figure 31:
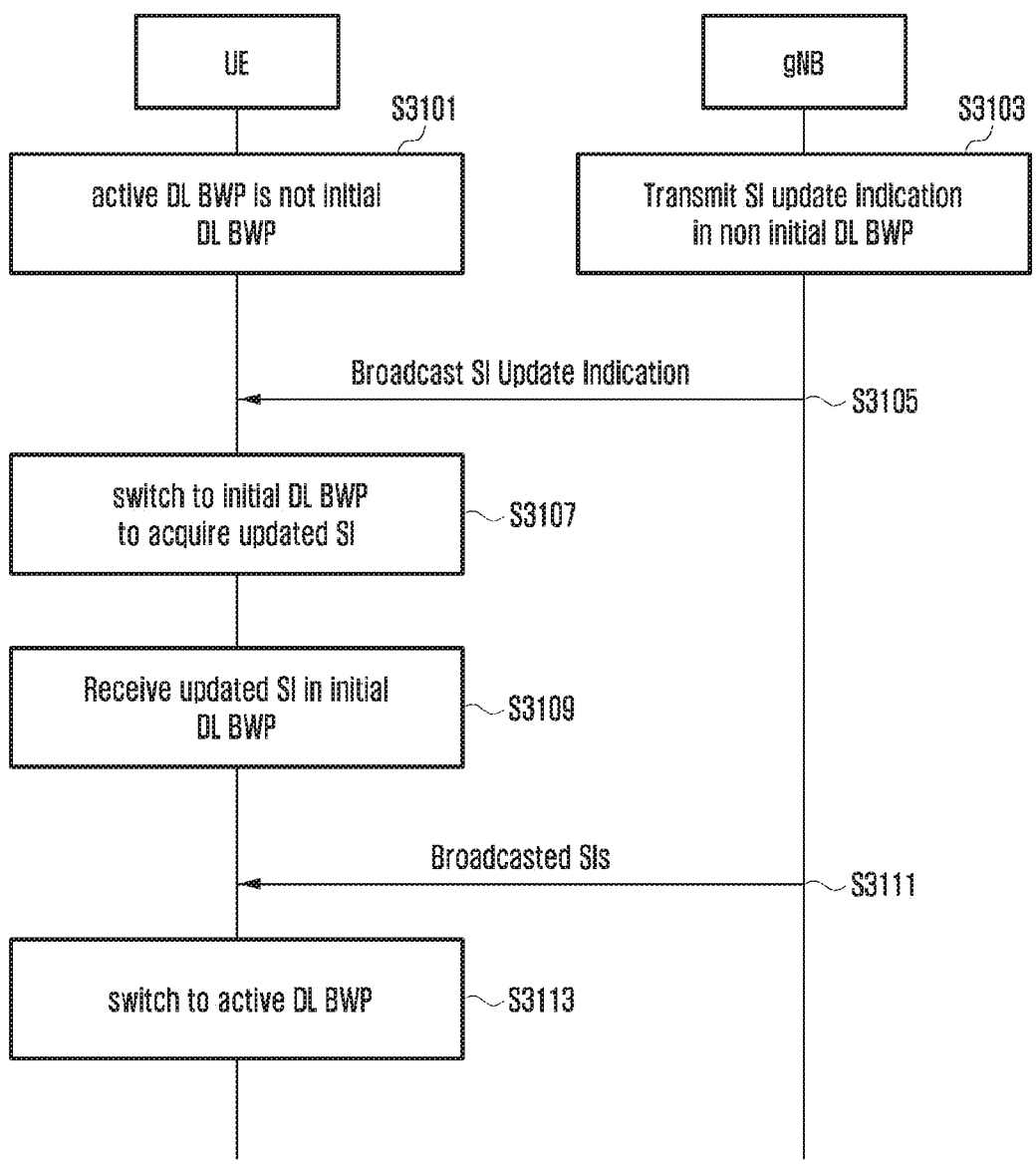
FIG. 31 illustrates another example of the signaling flow between UE and gNB according to an embodiment of the disclosure.

UE receives the SI update notification in its active DL BWP irrespective of whether it is the initial DL BWP or not. If the active DL BWP is not the initial DL BWP, upon receiving the SI update notification, UE autonomously switches to initial DL BWP for acquiring the updated SI as shown in FIG. 31. After acquiring the SI, UE switches back to active DL BWP. Timing of switching to initial DL BWP and then switching back to active DL BWP is needed. For example, UE receives the SI update indication in modification period N, then UE switches to initial DL BWP in modification period N+1 and switches back to active DL BWP at the end of modification period N+1. In an embodiment, UE can remain in initial DL BWP for several modification periods (pre-defined or signaled by gNB) before switching back to active DL BWP. In an embodiment, UE can remain in initial DL BWP for a time duration (pre-defined or signaled by gNB) before switching back to active DL BWP. In another embodiment after switching to initial DL BWP, UE designate initial DL BWP as its current active DL BWP. See operations S3101 through S3113 shown in FIG. 31.

Otherwise if active DL BWP is the initial DL BWP, upon receiving the SI update notification UE receives the updated SI in active DL BWP from the broadcast signaling as shown in FIG. 19.

Embodiment 10

FIG. 20 illustrates the gNB operation for updating SI in a system wherein multiple DL BWPs are configured on a carrier or serving cell. The gNB performs this operation for each configured DL BWP.

Figure 32:
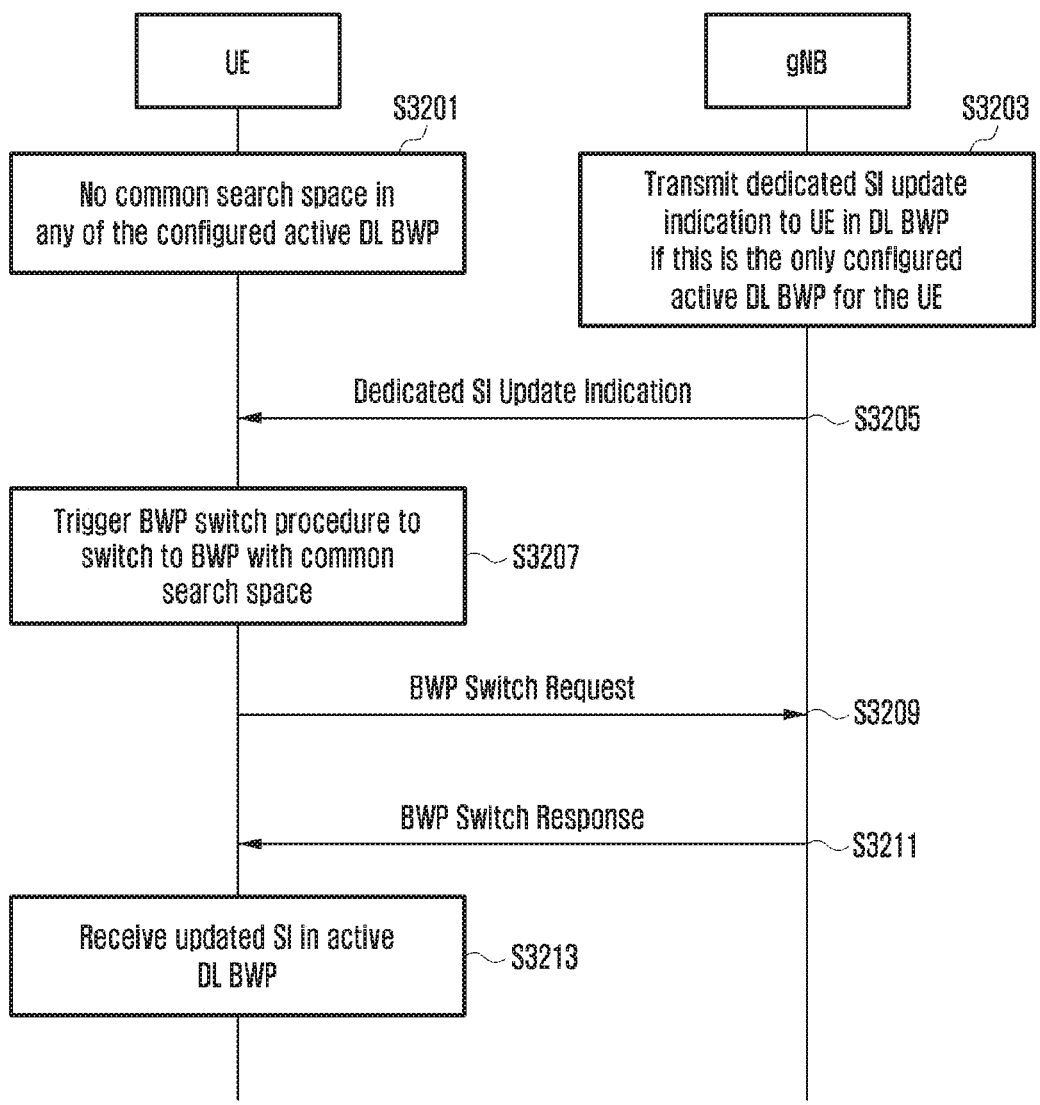
FIG. 32 illustrates an example of the signaling flow between UE and gNB according to an embodiment of the disclosure.
Figure 33:
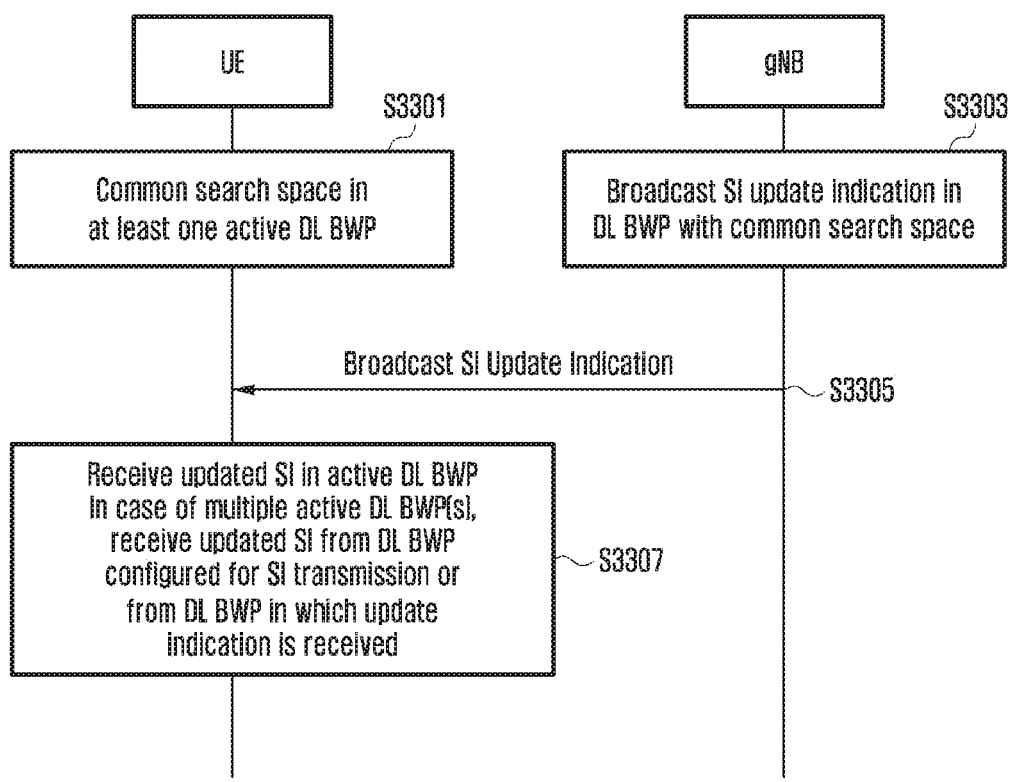
FIG. 33 illustrates another example of the signaling flow between UE and gNB according to an embodiment of the disclosure.

FIGS. 32 and 33 illustrate the signaling flow between UE and gNB in the proposed method according to various embodiments of the disclosure. In this method we propose that for one or more UE(s) in RRC connected state which are configured with one or more active DL BWPs and each of the active DL BWPs are configured without common search space, gNB provides the updated SI indication in dedicated manner. The dedicated SI update indication is transmitted by gNB in UE's active DL BWP. A new RRC message can be defined to transmit SI update indication in dedicated manner. Alternately paging message with SI update indication can be transmitted in dedicated manner by transmitting PDCCH for TB carrying paging message using UE's C-RNTI. Alternately SI update indication can be transmitted in dedicated manner by transmitting PDCCH carrying DCI for SI update using UE's C-RNTI.

In an embodiment, if the DL BWP is configured with common search space(s) for SI and paging, gNB broadcast SI update indication in this BWP and also broadcast the updated SI in this BWP.

In another embodiment, if the DL BWP is configured as active BWP for at least one UE and it is configured with common search space(s) for SI and paging, gNB broadcast SI update indication in this BWP and also broadcast the updated SI in this BWP. If the DL BWP is configured as active BWP for at least one UE and it is not configured with common search space, gNB provides the SI update indication in dedicated RRC signaling.

In this method, UE is configured with one or more active DL BWPs. If none of the active DL BWPs is configured with common search space, UE receives the SI update indication in dedicated RRC signaling in active DL BWP. UE then triggers BWP switch procedure to switch to BWP with common search space. UE then receives the updated SI in active DL BWP (see operations S3201 through S3213 shown in FIG. 32). Otherwise if at least one of the active DL BWPs is configured with common search space, UE receives the SI update indication in broadcast signaling (e.g. paging message or paging DCI) in active DL BWP. UE then receives the updated SI in active DL BWP. In case of multiple active DL BWP(s) with common search space, UE can receive updated SI from DL BWP indicated (e.g. in update indication) by network for SI transmission or UE can receive updated SI from DL BWP in which it has received update indication (see operations S3301 through S3307 shown in FIG. 33).

In an embodiment, after receiving the SI update indication, if at least one active DL BWP is configured with common search space, UE receives the updated SI in active DL BWP and UE does not trigger BWP switch procedure. Otherwise UE trigger BWP switch procedure. In another embodiment, after receiving the SI update indication, if the SI updated was received in broadcast signaling, UE receives the updated SI in active DL BWP and UE does not trigger BWP switch procedure. Otherwise UE trigger BWP switch procedure. In another embodiment, after receiving the SI update indication, if the SI updated was received in dedicated RRC signaling, UE does not trigger BWP switch procedure. Otherwise UE trigger BWP switch procedure.

Embodiment 10A

In an embodiment of the, we propose that for one or more UE(s) in RRC connected state which are configured with active DL BWP(s) wherein the none of the active DL BWP is the initial DL BWP, gNB broadcasts the SI update notification in active DL BWP. In the initial DL BWP, gNB broadcasts the SI update notification. Initial DL BWP is the BWP where the UE/gNB receives/transmits the remaining minimum system information i.e. RMSI. The initial DL BWP is defined as frequency location and bandwidth of RMSI CORESET and numerology of RMSI. The PDSCH delivering RMSI are confined within the initial DL BWP.

UE receives the SI update notification in its active DL BWP irrespective of whether it is the initial DL BWP or not. If the active DL BWP is not the initial DL BWP, upon receiving the SI update notification, UE autonomously switches to initial DL BWP for acquiring the updated SI as shown in FIG. 31. After acquiring the SI, UE switches back to active DL BWP. Timing of switching to initial DL BWP and then switching back to active DL BWP is needed. For example, UE receives the SI update indication in modification period N, then UE switches to initial DL BWP in modification period N+1 and switches back to active DL BWP at the end of modification period N+1. In an embodiment, UE can remain in initial DL BWP for several modification periods (pre-defined or signaled by gNB) before switching back to active DL BWP. In an embodiment, UE can remain in initial DL BWP for a time duration (pre-defined or signaled by gNB) before switching back to active DL BWP. In another embodiment after switching to initial DL BWP, UE designate initial DL BWP as its current active DL BWP.

Otherwise if at least one of the active DL BWP is the initial DL BWP, upon receiving the SI update notification UE receives the updated SI in active DL BWP from the broadcast signaling as shown in FIG. 5.

Embodiment 11

Figure 34:
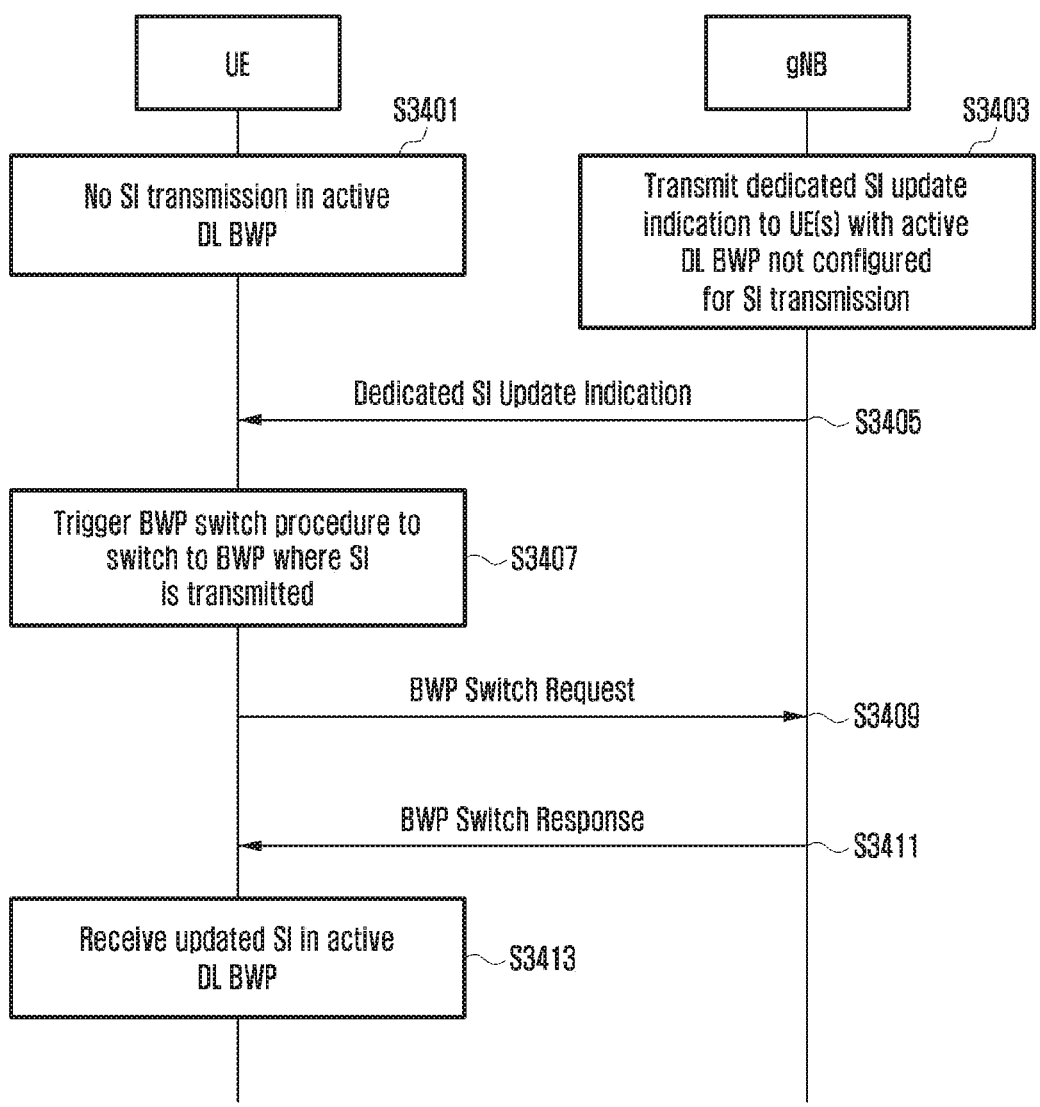
FIG. 34 illustrates an example of the signaling flow between UE and gNB according to an embodiment of the disclosure.
Figure 35:
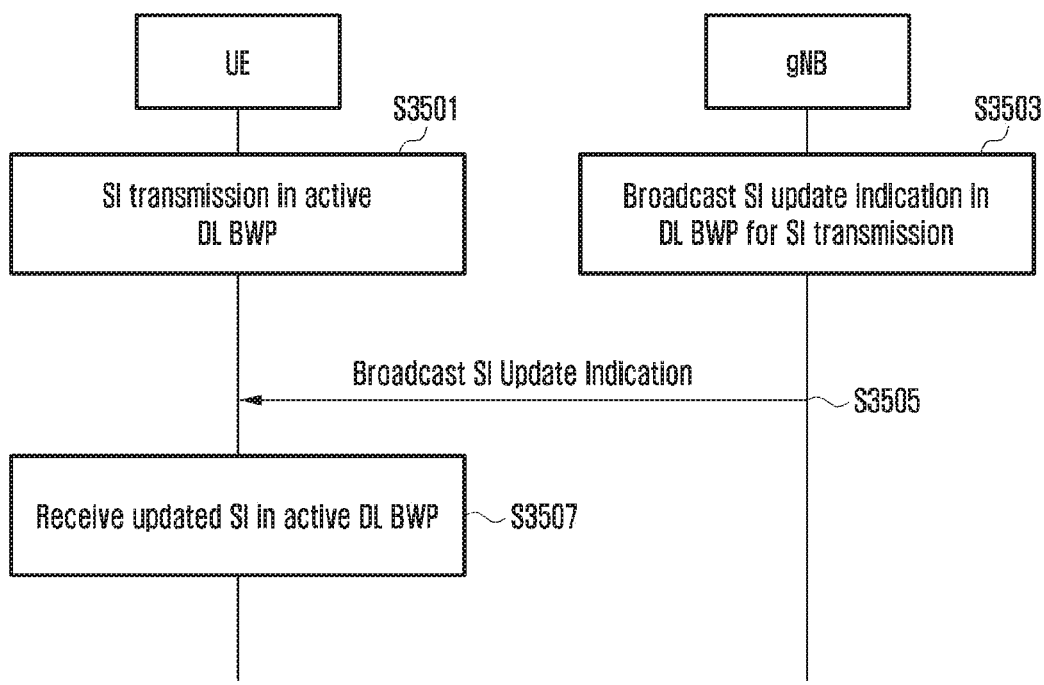
FIG. 35 illustrates another example of the signaling flow between UE and gNB according to an embodiment of the disclosure.

FIG. 23 illustrates the gNB operation for updating SI in a system wherein multiple DL BWPs are configured on a carrier or serving cell. The gNB performs this operation for each configured DL BWP. FIGS. 34 and 35 illustrate the signaling flow between UE and gNB in the proposed method. In this method we propose that for one or more UE(s) in RRC connected state which are configured with active DL BWP in which SI is not transmitted (e.g. active BWP is not the initial DL BWP or gNB explicitly indicates that SI and/or paging is not transmitted in this BWP)), gNB provides the updated SI indication in dedicated manner. The dedicated SI update indication is transmitted by gNB in UE's active DL BWP. A new RRC message can be defined to transmit SI update indication in dedicated manner. Alternately paging message with SI update indication can be transmitted in dedicated manner by transmitting PDCCH for TB carrying paging message using UE's C-RNTI. Alternately SI update indication can be transmitted in dedicated manner by transmitting PDCCH carrying DCI for SI update using UE's C-RNTI.

In this method, UE is configured with one active DL BWP. If active DL BWP is not configured for SI transmission (e.g. active BWP is not the initial DL BWP or gNB explicitly indicates that SI and/or paging is not transmitted in this BWP), UE receives the SI update indication in dedicated RRC signaling in active DL BWP. gNB can indicate that SI and/or paging is transmitted in a BWP or not in the BWP configuration signaled to UE using RRC signaling. UE then triggers BWP switch procedure to switch to BWP with common search space. UE then receives the updated SI in active DL BWP. Otherwise if active DL BWP is configured for SI transmission (e.g. BWP is the initial DL BWP or gNB explicitly indicates that SI and/or paging is transmitted in this BWP), UE receives the SI update indication in broadcast signaling in active DL BWP. UE then receives the updated SI in active DL BWP.

In an embodiment, after receiving the SI update indication, if active DL BWP is configured for SI transmission, UE receives the updated SI in active DL BWP and UE does not trigger BWP switch procedure. Otherwise UE trigger BWP switch procedure. In another embodiment, after receiving the SI update indication, if the SI updated was received in broadcast signaling, UE receives the updated SI in active DL BWP and UE does not trigger BWP switch procedure. Otherwise UE trigger BWP switch procedure. In another embodiment, after receiving the SI update indication, if the SI updated was received in dedicated RRC signaling, UE does not trigger BWP switch procedure. Otherwise UE trigger BWP switch procedure.

Embodiment 12

FIG. 26 illustrates the gNB operation for updating SI in a system wherein multiple DL BWPs are configured on a carrier or serving cell. The gNB performs this operation for each configured DL BWP.

Figure 36:
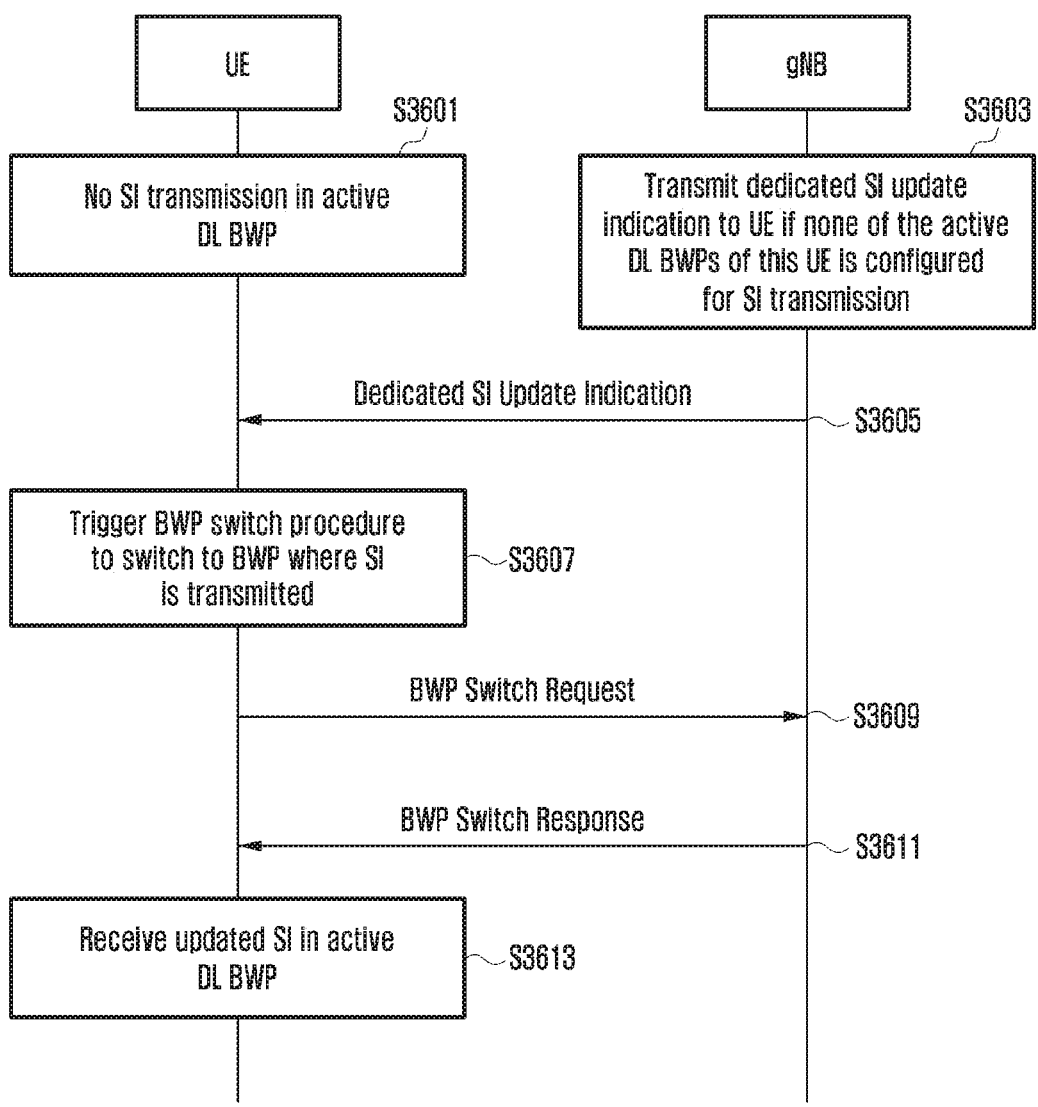
FIG. 36 illustrates an example of the signaling flow between UE and gNB according to an embodiment of the disclosure.
Figure 37:
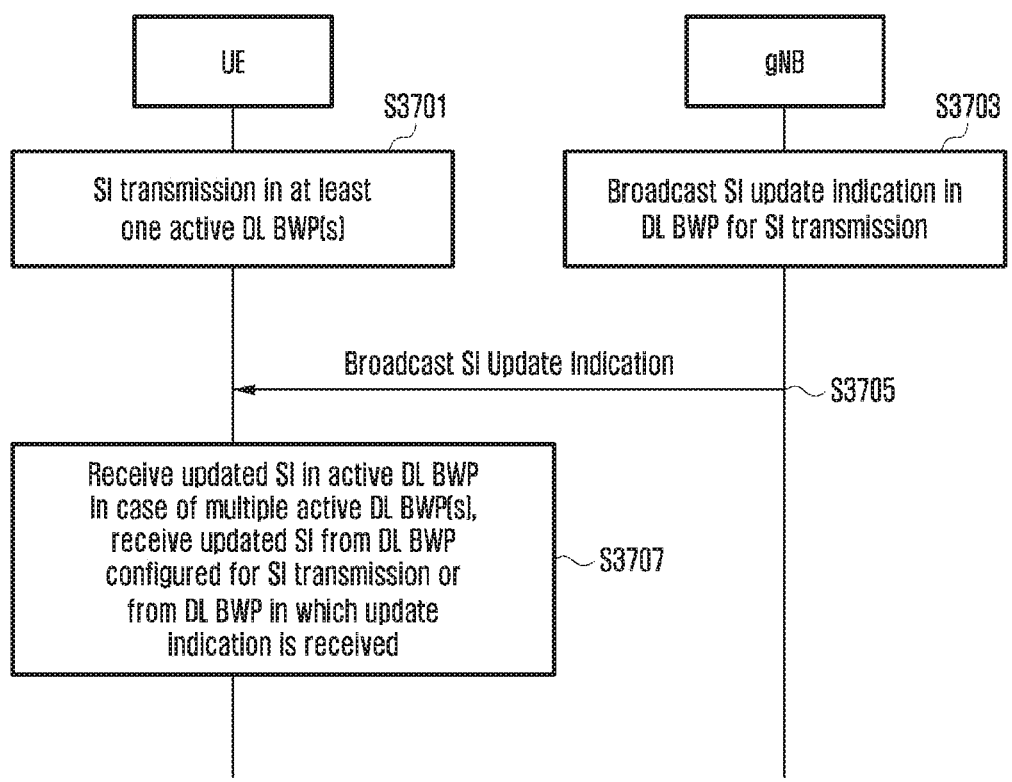
FIG. 37 illustrates another example of the signaling flow between UE and gNB according to an embodiment of the disclosure.

FIGS. 36 and 37 illustrate the signaling flow between UE and gNB in the proposed method according to various embodiments of the disclosure. In this method we propose that for one or more UE(s) in RRC connected state which are configured with one or more active DL BWPs and each of the active DL BWPs are not configured for SI transmission (e.g. each active BWP is not the initial DL BWP or gNB explicitly indicates that SI and/or paging is not transmitted in this BWP), gNB provides the updated SI indication in dedicated manner. The dedicated SI update indication is transmitted by gNB in UE's active DL BWP. A new RRC message can be defined to transmit SI update indication in dedicated manner. Alternately paging message with SI update indication can be transmitted in dedicated manner by transmitting PDCCH for TB carrying paging message using UE's C-RNTI. Alternately SI update indication can be transmitted in dedicated manner by transmitting PDCCH carrying DCI for SI update using UE's C-RNTI.

In this method, UE is configured with one or more active DL BWPs. If none of the active DL BWPs is configured for SI transmission (e.g. each active BWP is not the initial DL BWP or gNB explicitly indicates that SI and/or paging is not transmitted in this BWP), UE receives the SI update indication in dedicated RRC signaling in active DL BWP. UE then triggers BWP switch procedure to switch to BWP with common search space. UE then receives the updated SI in active DL BWP. Otherwise, if at least one of the active DL BWPs is configured for SI transmission (e.g. BWP is the initial DL BWP or gNB explicitly indicates that SI and/or paging is transmitted in this BWP), UE receives the SI update indication in broadcast signaling (e.g. paging message or paging DCI) in active DL BWP and updated SIs in the active DL BWP configured for SI transmission. gNB can indicate that SI and/or paging is transmitted in a BWP or not in the BWP configuration signaled to UE using RRC signaling. In case of multiple active DL BWP(s) configured for SI transmission, UE can receive updated SI from DL BWP indicated (e.g. in update indication) by network for SI transmission or UE can receive updated SI from DL BWP in which it has received update indication. See operations S3701 through S3707 shown in FIG. 37.

In an embodiment, after receiving the SI update indication, if at least one active DL BWP is configured for SI transmission, UE receives the updated SI in active DL BWP and UE does not trigger BWP switch procedure. Otherwise UE trigger BWP switch procedure. In another embodiment, after receiving the SI update indication, if the SI updated was received in broadcast signaling, UE receives the updated SI in active DL BWP and UE does not trigger BWP switch procedure. Otherwise UE trigger BWP switch procedure. In another embodiment, after receiving the SI update indication, if the SI updated was received in dedicated RRC signaling, UE does not trigger BWP switch procedure. Otherwise UE trigger BWP switch procedure.

In an embodiment of method 3 explained above, instead of initiating BWP switching procedure after receiving the SI update indication, UE may autonomously switch to BWP configured for SI transmission for a predefined period (i.e. the period in which UE acquires the updated SI. For e.g. if SI update indication is received in modification period N, updated SI is received in modification period N+1). The predefined period can be indicated in SI update indication. BWP for SI transmission can be indicated in SI update indication or it can be configured to UE in RRC signaling or it can be indicated in minimum system information.

Method 4: BWP Switch Procedure Initiated by NW Followed by Updated SI Delivery

Embodiment 13

Figure 38:
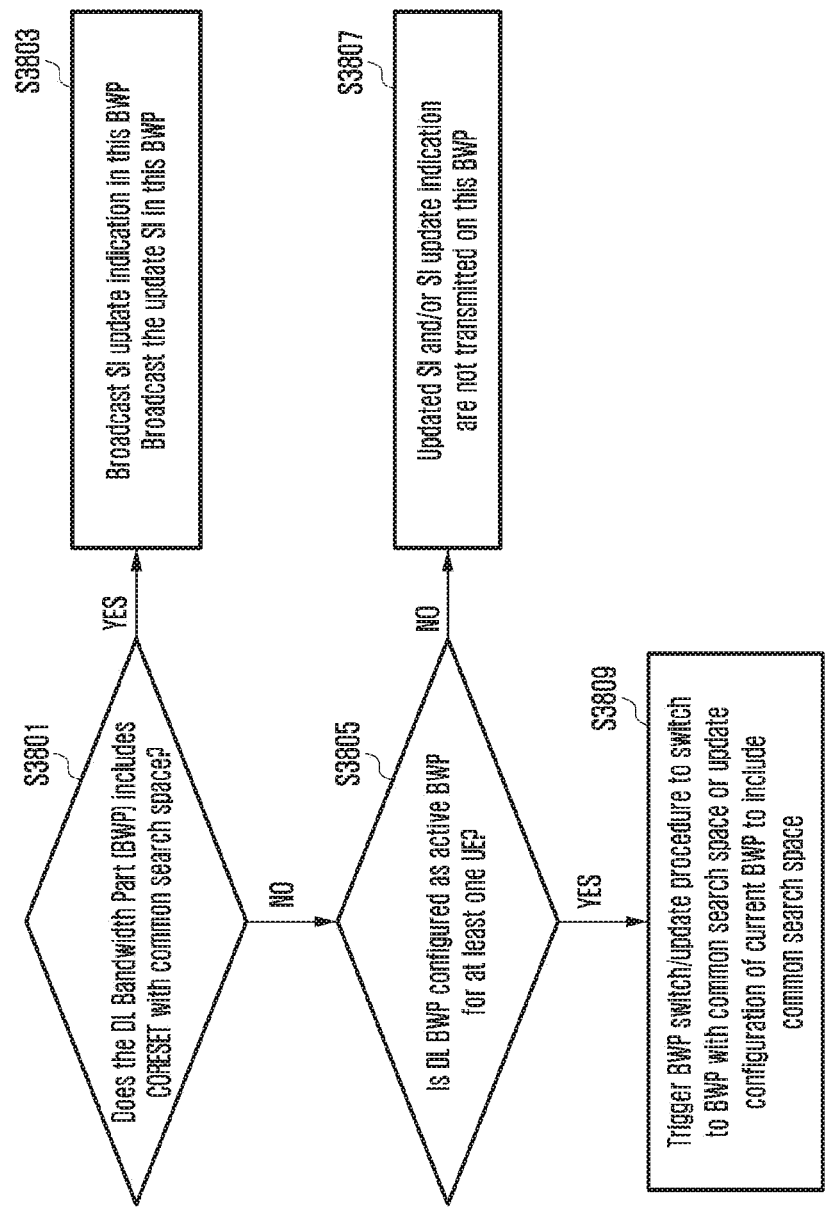
FIG. 38 illustrates the gNB operation for updating SI in a system wherein multiple DL BWPs are configured on a carrier according to an embodiment of the disclosure.

FIG. 38 illustrates the gNB operation for updating SI in a system wherein multiple DL BWPs are configured on a carrier or serving cell according to an embodiment of the disclosure. The gNB performs this operation for each configured DL BWP. See operations S3801 through S3809 shown in FIG. 38.

Figure 39:
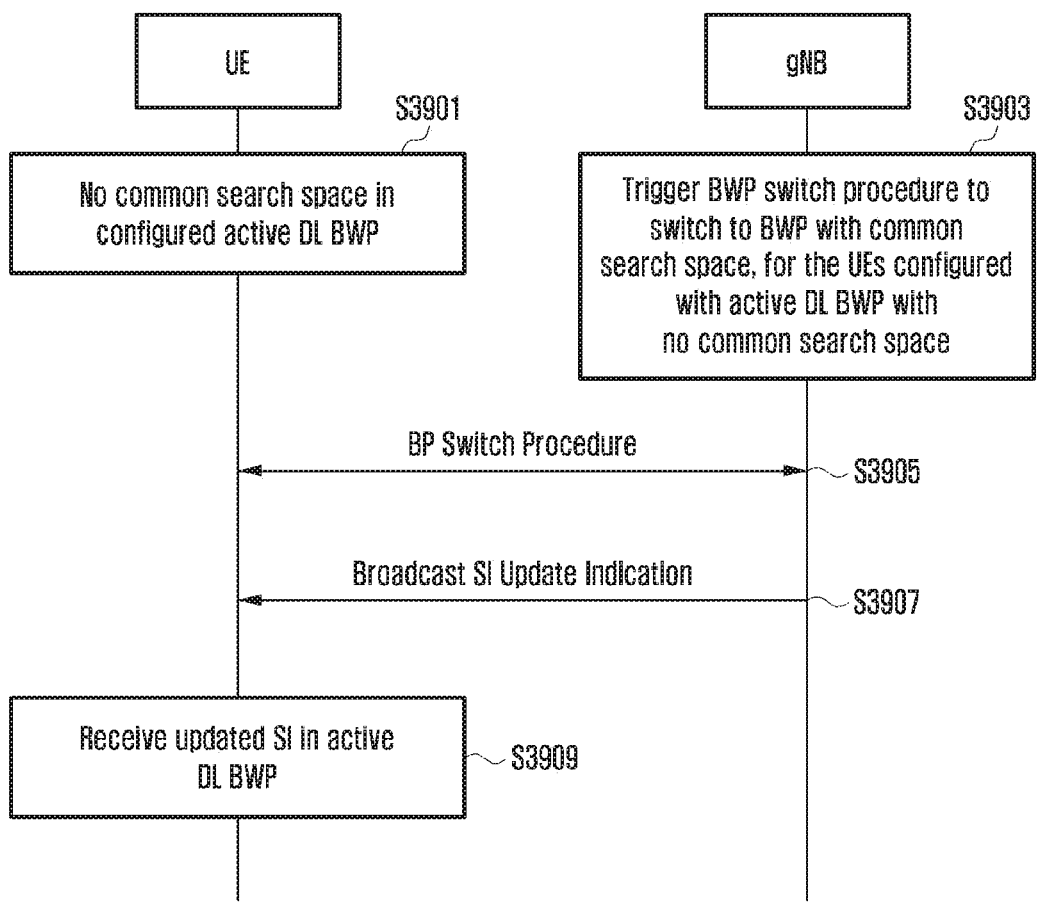
FIG. 39 illustrates an example of the signaling flow between UE and gNB according to an embodiment of the disclosure.
Figure 40:
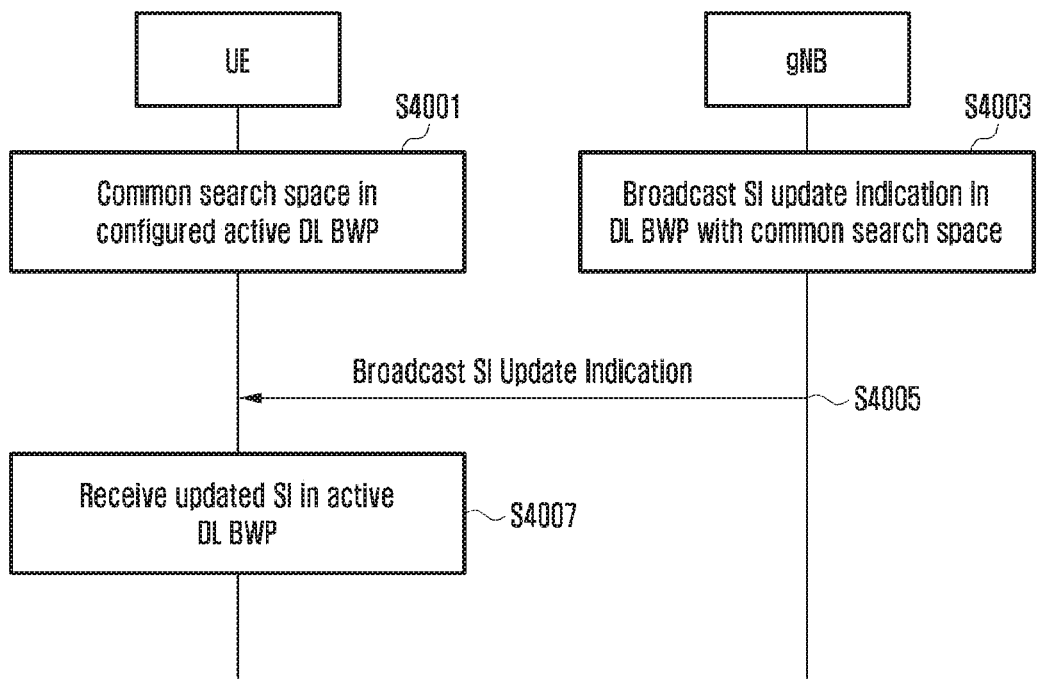
FIG. 40 illustrates another example of the signaling flow between UE and gNB according to an embodiment of the disclosure.

FIGS. 39 and 40 illustrate the signaling flow between UE and gNB in the proposed method according to various embodiments of the disclosure. In this method we propose that for one or more UE(s) in RRC connected state which are configured with active DL BWP without common search space, gNB triggers the BWP switch or update procedure to switch to BWP with common search space or update configuration of current BWP to include common search space. UE then receives the SI update indication in broadcast signaling (e.g. paging message or paging DCI) in active DL BWP. UE then receives the updated SI in active DL BWP. See operations S3901 through S3909 shown in FIG. 39. In an embodiment, SI update indication can be included (e.g. in BWP switch request) in BWP switch procedure. After BWP switching UE receives the updated SI in active DL BWP.

In an embodiment, if the DL BWP is configured with common search space, gNB broadcast SI update indication in this BWP and also broadcast the updated SI in this BWP. See operations S4001 through S4007 shown in FIG. 40.

In another embodiment, if the DL BWP is configured as active BWP for at least one UE and it is configured with common search space(s) for SI and paging, gNB broadcast SI update indication in this BWP and also broadcast the updated SI in this BWP. If the DL BWP is configured as active BWP for at least one UE and it is not configured with common search space, gNB triggers the BWP switch or update procedure to switch to BWP with common search space or update configuration of current BWP to include common search space.

Embodiment 14

Figure 41:
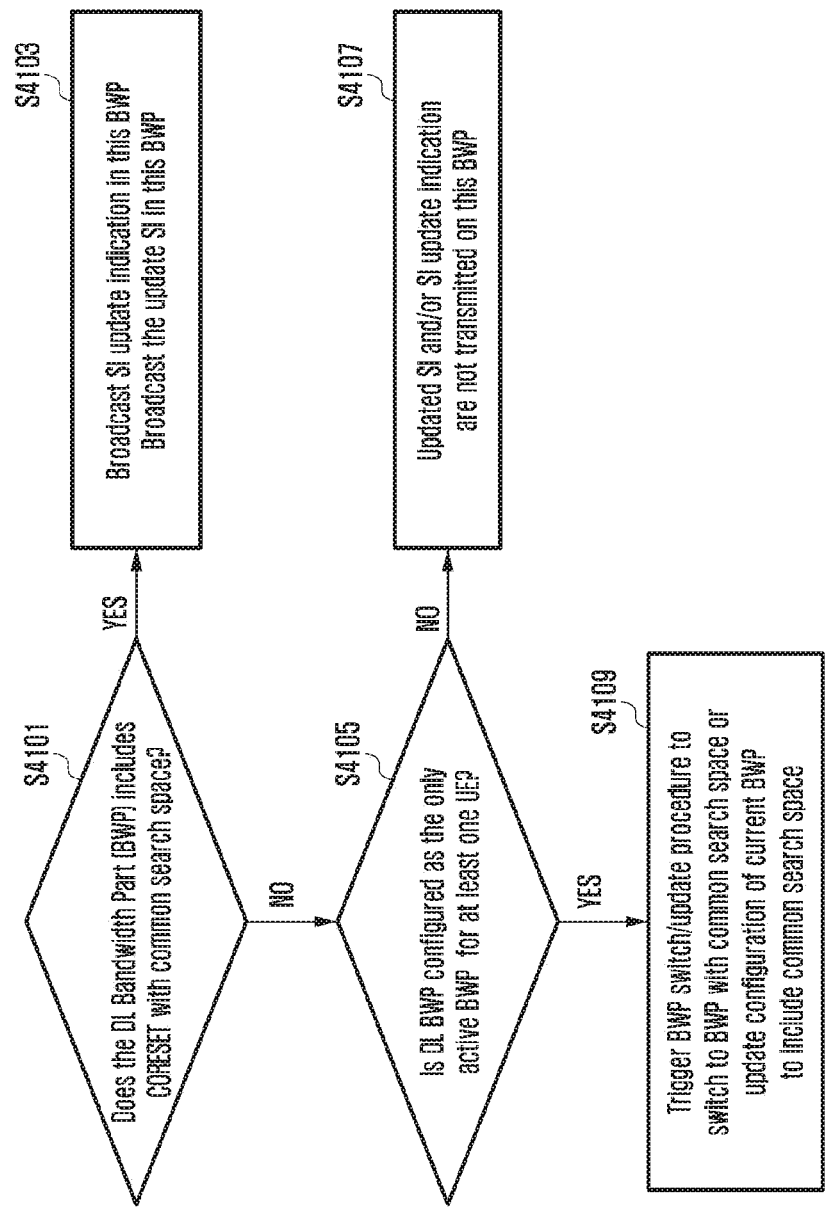
FIG. 41 illustrates the gNB operation for updating SI in a system wherein multiple DL BWPs are configured on a carrier according to an embodiment of the disclosure.

FIG. 41 illustrates the gNB operation for updating SI in a system wherein multiple DL BWPs are configured on a carrier or serving cell according to an embodiment of the disclosure. The gNB performs this operation for each configured DL BWP. See operations S4101 through S4109 shown in FIG. 41.

Figure 42:
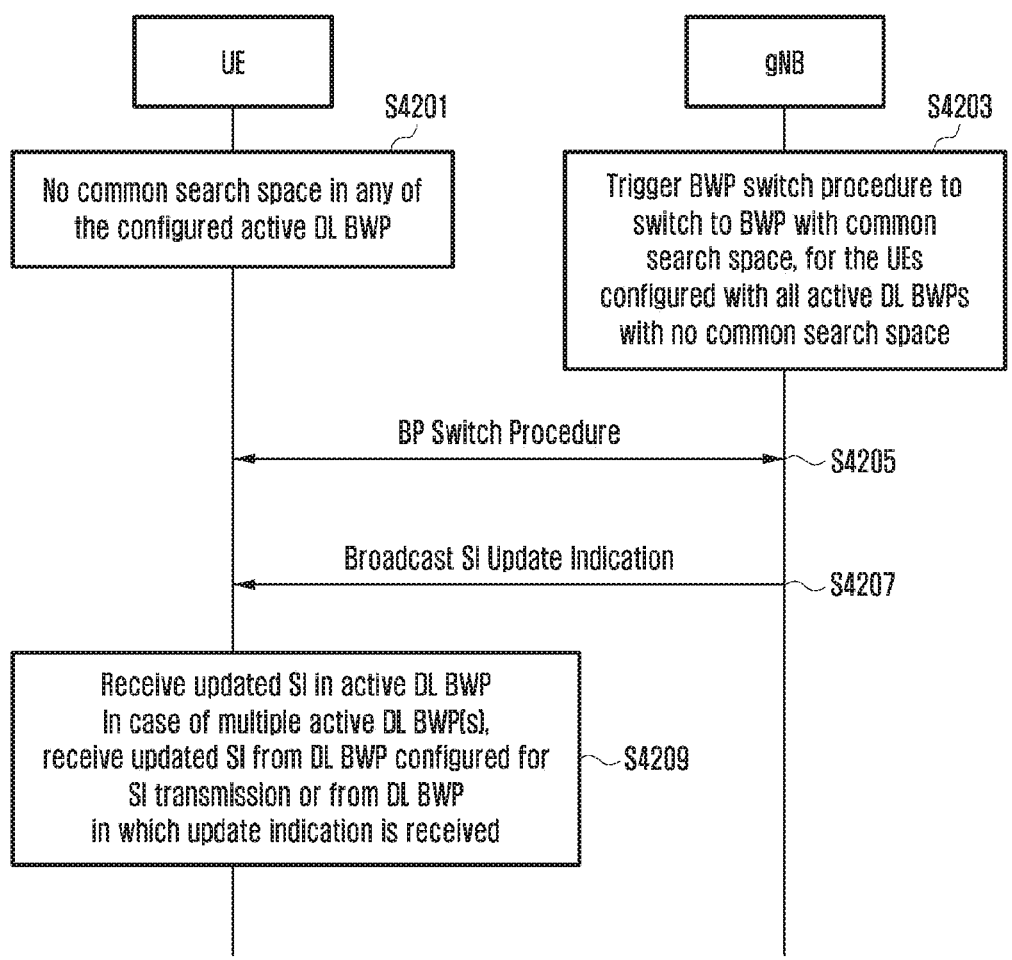
FIG. 42 illustrates an example of the signaling flow between UE and gNB according to an embodiment of the disclosure.
Figure 43:
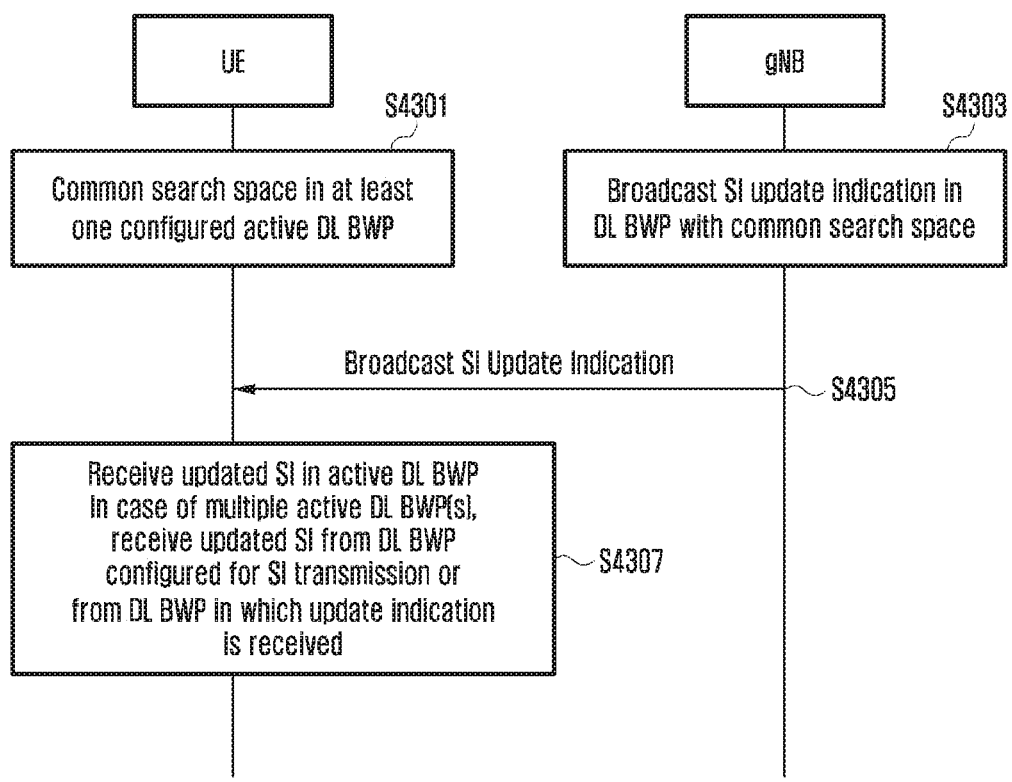
FIG. 43 illustrates another example of the signaling flow between UE and gNB according to an embodiment of the disclosure.

FIGS. 42 and 43 illustrate the signaling flow between UE and gNB in the proposed method according to various embodiments of the disclosure. In this method we propose that for one or more UE(s) in RRC connected state which are configured with one or more active DL BWPs and each of the active DL BWPs are configured without common search space, gNB triggers the BWP switch or update procedure to switch to BWP with common search space or update configuration of current BWP to include common search space. GNB then broadcast SI update indication and updated SI. UE then receives the SI update indication in broadcast signaling in active DL BWP. UE then receives the updated SI in active DL BWP. In case of multiple active DL BWP(s) with common search space, UE can receive updated SI from DL BWP indicated (e.g. in update indication) by network for SI transmission or UE can receive updated SI from DL BWP in which it has received update indication. See operations S4201 through S4209 as shown in FIG. 42.

In an embodiment, SI update indication can be included (e.g. in BWP switch request) in BWP switch procedure. After BWP switching UE receives the updated SI in active DL BWP.

In an embodiment, if the DL BWP is configured with common search space, gNB broadcast SI update indication in this BWP and also broadcast the updated SI in this BWP.

In another embodiment, if the DL BWP is configured as the only active BWP for at least one UE and it is configured with common search space, gNB broadcast SI update indication in this BWP and also broadcast the updated SI in this BWP. If the DL BWP is configured as the only active BWP for at least one UE and it is not configured with common search space, gNB triggers the BWP switch or update procedure to switch to BWP with common search space or update configuration of current BWP to include common search space. See operations S4301 through S4307 as shown in FIG. 43.

Embodiment 15

Figure 44:
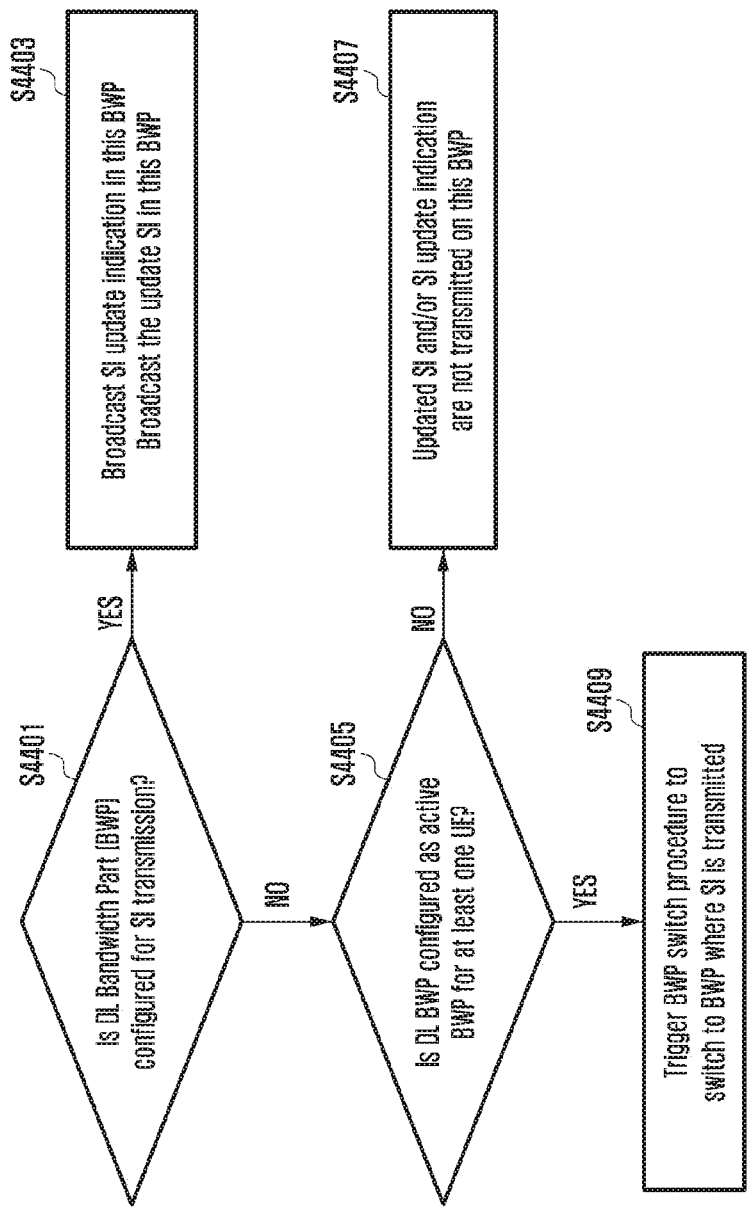
FIG. 44 illustrates the gNB operation for updating SI in a system wherein multiple DL BWPs are configured on a carrier according to an embodiment of the disclosure.

FIG. 44 illustrates the gNB operation for updating SI in a system wherein multiple DL BWPs are configured on a carrier or serving cell according to an embodiment of the disclosure. The gNB performs this operation for each configured DL BWP. See operations S4401 through S4409 shown in FIG. 44.

Figure 45:
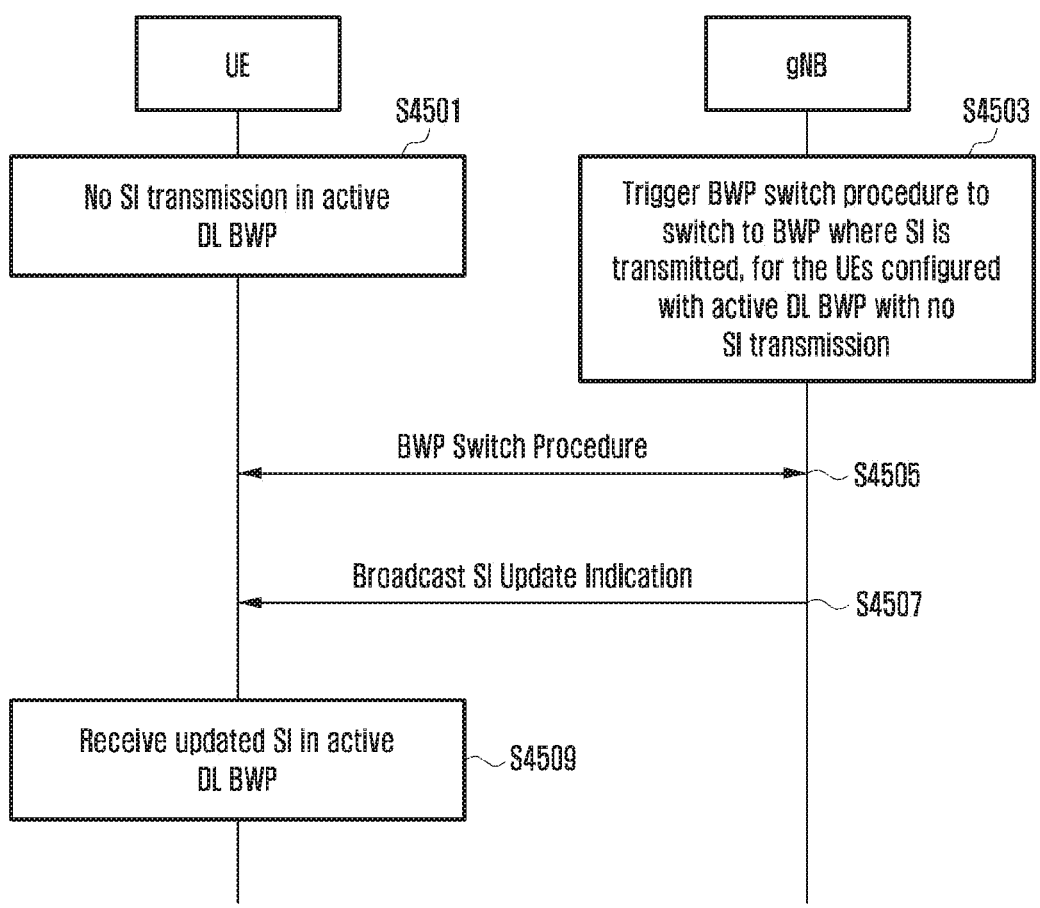
FIG. 45 illustrates an example of the signaling flow between UE and gNB according to an embodiment of the disclosure.
Figure 46:
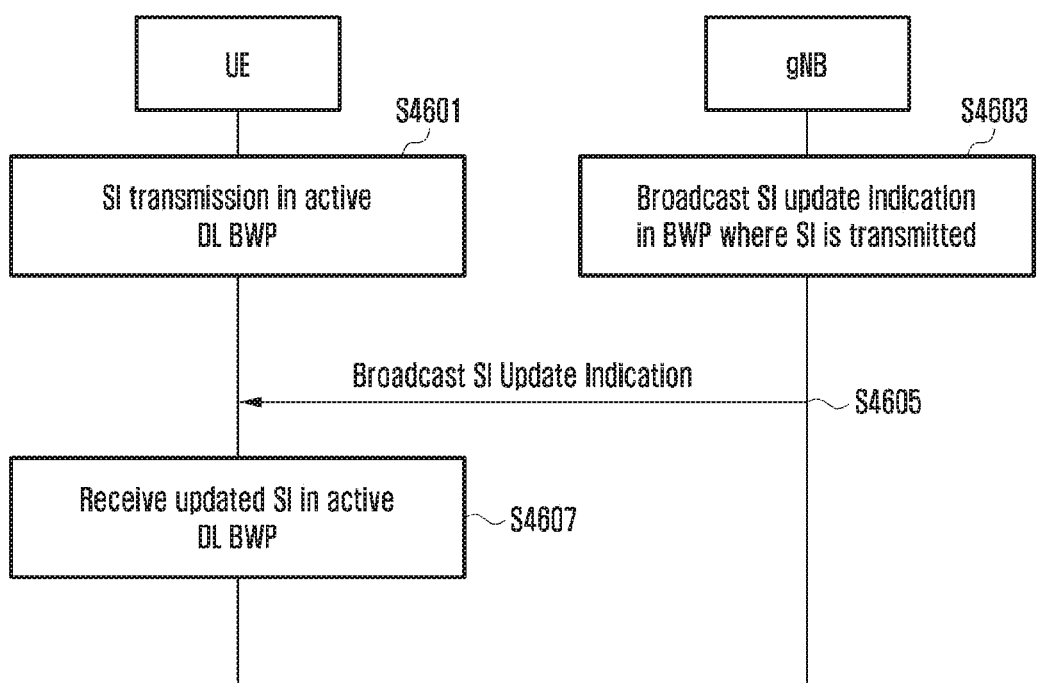
FIG. 46 illustrates another example of the signaling flow between UE and gNB according to an embodiment of the disclosure.

FIGS. 45 and 46 illustrates the signaling flow between UE and gNB in the proposed method according to various embodiments of the disclosure. In this method we propose that for one or more UE(s) in RRC connected state which are configured with active DL BWP in which SI is not transmitted, gNB triggers the BWP switch or update procedure to switch to BWP with common search space or update configuration of current BWP to include common search space. GNB then broadcast SI update indication and updated SI. UE then receives the SI update indication in broadcast signaling in active DL BWP. UE then receives the updated SI in active DL BWP. See operations S4501 through S4509 shown in FIG. 45.

In an embodiment, SI update indication can be included (e.g. in BWP switch request) in BWP switch procedure. After BWP switching UE receives the updated SI in active DL BWP. See operations S4601 through S4607 shown in FIG. 46.

Embodiment 16

Figure 47:
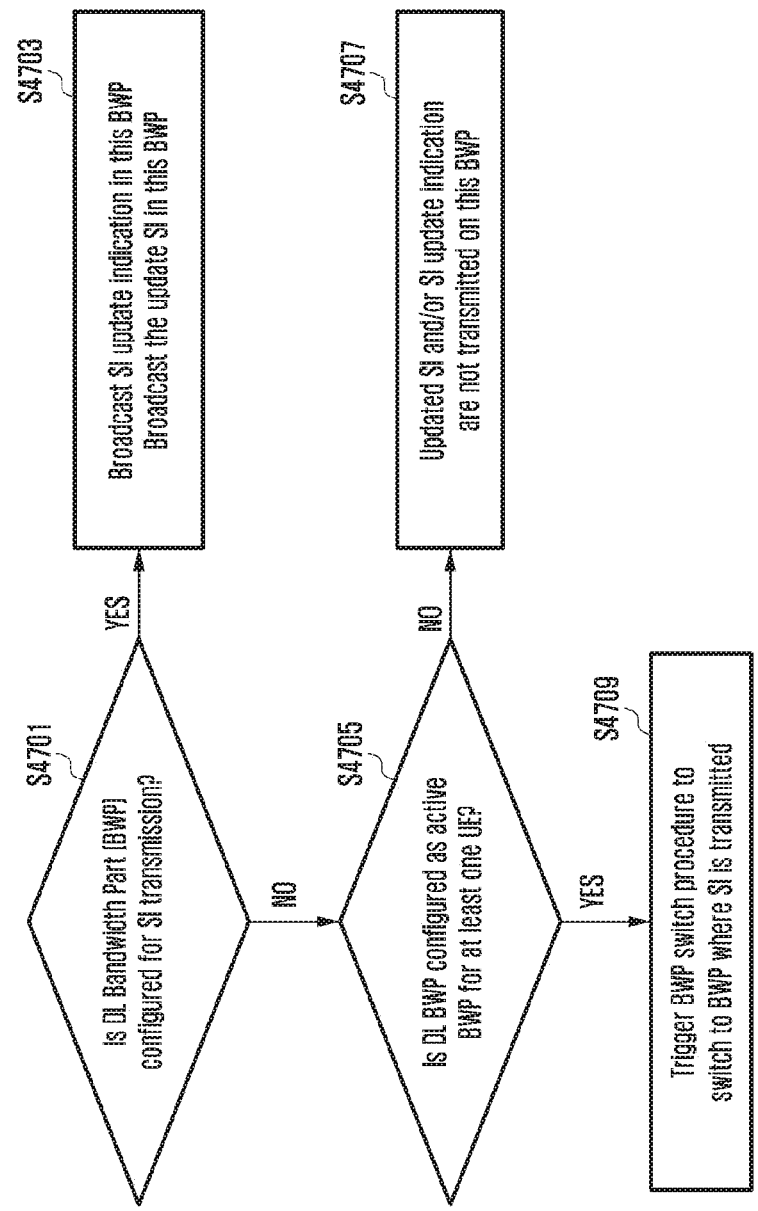
FIG. 47 illustrates the gNB operation for updating SI in a system wherein multiple DL BWPs are configured on a carrier according to an embodiment of the disclosure.

FIG. 47 illustrates the gNB operation for updating SI in a system wherein multiple DL BWPs are configured on a carrier or serving cell according to an embodiment of the disclosure. The gNB performs this operation for each configured DL BWP. See operations S4701 through S4709 as shown in FIG. 47.

Figure 48:
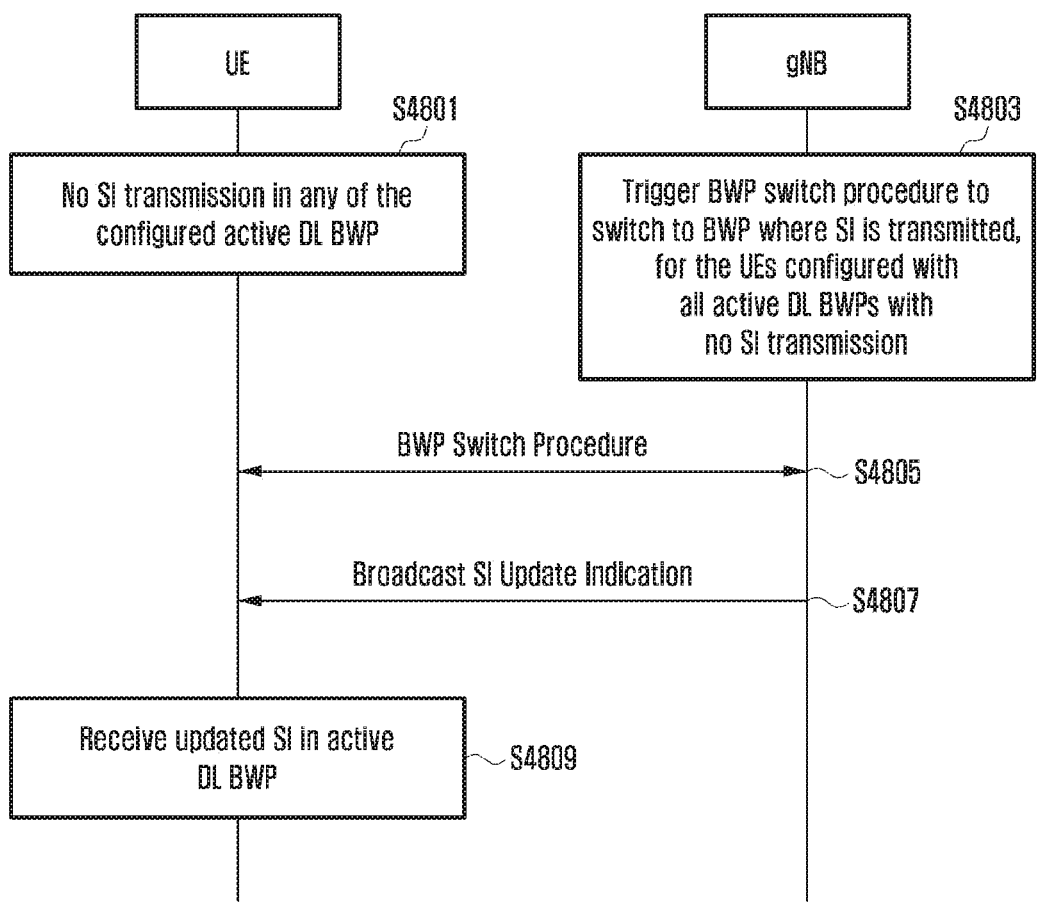
FIG. 48 illustrates an example of the signaling flow between UE and gNB according to an embodiment of the disclosure.
Figure 49:
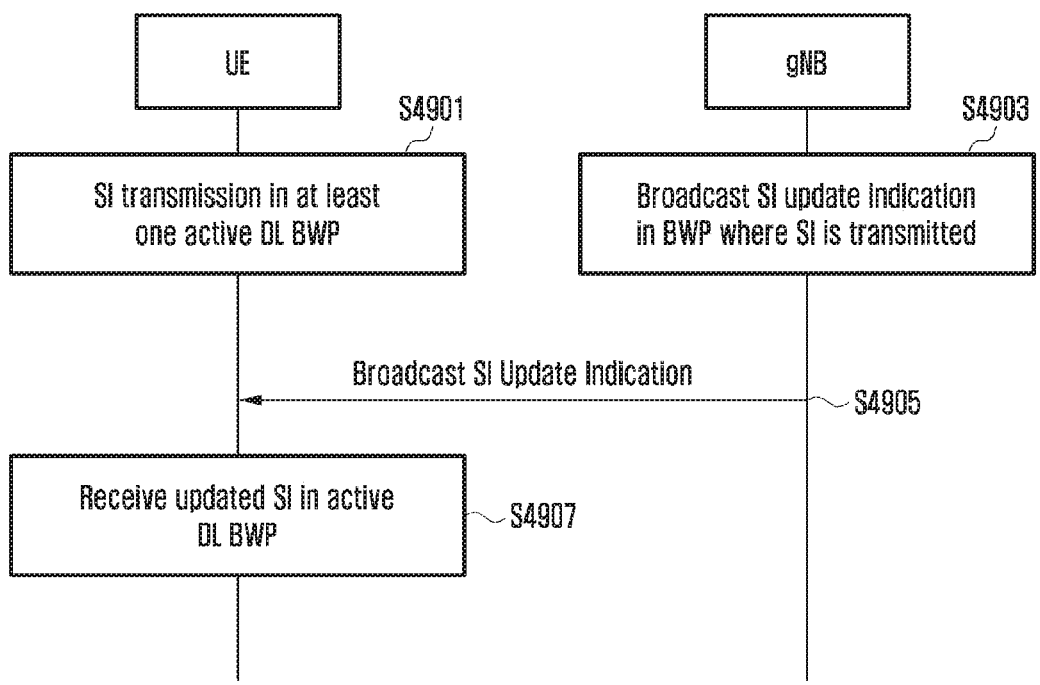
FIG. 49 illustrates another example of the signaling flow between UE and gNB according to an embodiment of the disclosure.

FIGS. 48 and 49 illustrate the signaling flow between UE and gNB in the proposed method according to various embodiments of the disclosure. In this method we propose that for one or more UE(s) in RRC connected state which are configured with one or more active DL BWPs and each of the active DL BWPs are not configured for SI transmission, gNB triggers the BWP switch or update procedure to switch to BWP with common search space or update configuration of current BWP to include common search space. GNB then broadcast SI update indication and updated SI. UE then receives the updated SI in active DL BWP. In case of multiple active DL BWP(s) with common search space, UE can receive updated SI from DL BWP indicated (e.g. in update indication) by network for SI transmission or UE can receive updated SI from DL BWP in which it has received update indication. See operations S4801 through S4809 shown in FIG. 48.

In an embodiment, SI update indication can be included (e.g. in BWP switch request) in BWP switch procedure. After BWP switching UE receives the updated SI in active DL BWP. See operations S4901 through S4907 shown in FIG. 49.

ETWS/CMAS Reception

RRC_CONNECTED UE cannot receive SIBs related to ETWS/CMAS if none of the active DL BWP(s) includes common search space. If none of the active DL BWP(s) includes the common search space then following approaches can be considered in order to enable UE to receive the SIBs related to ETWS/CMAS:

Approach 1:

In active DL BWP, GNB signals the ETWS/CMAS indication to ETWS/CMAS capable UE in RRC_CONNECTED in unicast manner (e.g. paging message can be transmitted on DL-DCCH). ARRC_CONNECTED UE capable of CMAS may inform its capability to gNB in UE capability signaling. A RRC_CONNECTED UE capable of ETWS may inform its capability to GNB in UE capability signaling. UE does not need to switch to DL BWP which includes the common search space to monitor paging occasion for ETWS/CMAS indication. On receiving the ETWS/CMAS indication, if the UE is ETWS/CMAS capable it sends SI request for ETWS/CMAS SIBs. GNB provides the ETWS/CMAS SIBs in SI response in active DL BWP.

Approach 2:

In active DL BWP, GNB signals ETWS/CMAS SIBs to ETWS/CMAS capable UE in RRC_CONNECTED in dedicated RRC signaling. A RRC_CONNECTED UE capable of CMAS may inform its capability to gNB in UE capability signaling. A RRC_CONNECTED UE capable of ETWS may inform its capability to GNB in UE capability signaling. If there are several UEs in RRC_CONNECTED which are ETWS/CMAS capable and configured with active DL BWP which does not include common search space, then this approach may lead to increased signaling overhead.

Approach 3:

In active DL BWP, GNB signals the ETWS/CMAS indication UE in RRC_CONNECTED in unicast manner (e.g. paging message can be transmitted on DL-DCCH). A RRC_CONNECTED UE capable of CMAS may inform its capability to gNB in UE capability signaling. ARRC_CONNECTED UE capable of ETWS may inform its capability to GNB in UE capability signaling. UE does not need to switch to DL BWP which includes the common search space to monitor paging occasion for ETWS/CMAS indication. On receiving the ETWS/CMAS indication, if the UE is ETWS/CMAS capable it switches (for a pre-defined time) to a DL BWP, in which common search space is included in order to receive the ETWS/CMAS SIBs. Note that according to RAN1 agreement at least one of the configured DL BWP includes common search space.

Approach 1 is useful only if network is not aware whether the UE supports ETWS/CMAS or not. ETWS/CMAS indication and SI request is redundant if gNB already knows that ETWS/CMAS is supported by UE. If there are several ETWS/CMAS capable UEs in RRC_CONNECTED, then approach 3 can lead to less signaling overhead compared to approach 2. However, ongoing data communication may be affected as UEs operating on different active DL BWPs are switched to a common DL active BWP in order to receive ETWS/CMAS SIBs. So we prefer to follow approach 2.

Reception of SIBs Other than ETWS/CMAS

Similar to ETWS/CMAS reception, in order to receive SI update indication and updated SIBs, UE in RRC_CONNECTED needs to receive the broadcasted paging message and SI message. RRC_CONNECTED UE cannot receive updated SIBs if none of the active DL BWP(s) includes common search space. If none of the active DL BWP(s) includes common search space then UE can receive the updated SIBs using the same approaches as described for ETWS/CMAS reception.

For an RRC_CONNECTED UE, if none of the active DL BWP(s) includes common search space, GNB signals the SIBs related to ETWS/CMAS notifications and other updated SIBs (relevant for RRC_CONNECTED) in dedicated RRC signaling.

If none of the active DL BWP(s) includes the common search space for monitoring paging, RRC_CONNECTED UE does not monitor paging occasions in DRX cycle for SI update and ETWS/CMAS notifications. ETWS or CMAS capable RRC_CONNECTED UE shall monitor for ETWS/CMAS notifications in any paging occasion if the UE is provided with common search space to monitor paging.

A RRC_CONNECTED UE capable of CMAS may inform its capability to gNB in UE capability signaling. A RRC_CONNECTED UE capable of ETWS may inform its capability to GNB in UE capability signaling.

SI Acquisition Upon Handover: BWP Aspects

UE needs to acquire certain SIs (e.g. MIB, SIB(s)) in RRC Connected state. During mobility, handover commands provides SI parameters needed for performing random access in target cell. After handover completion, UE needs to acquire the essential SIs of target cell. There are several ways in which UE can acquire the essential SIs of target cell.

Option 1: UE receives the SIs in its current active BWP. Network (i.e. gNB) broadcasts SIs in initial DL BWP and in each DL BWP which is active for at least one UE. Network may broadcast the essential SIs needed for RRC connected UE, temporarily in non-initial DL BWP for a time duration after the handover (e.g. starting from HO preparation and until a few modification periods or some pre-defined time duration). The time duration can also be configured by network.

Option 2: Upon handover, UE sends SI request to target cell and target cell signals the requested SI in dedicated signaling in active DL BWP.

Option 3: UE switches to initial DL BWP to receive the essential SI if the current active DL BWP is not the initial BWP. In an embodiment, UE may switch to initial DL BWP for acquiring SI, after access to target cell is complete (i.e. UE receives Msg2 successfully if CF RACH was used to access the target cell or UE receives Msg4 successfully if CB RACH was used to target cell). UE switches back to active DL BWP, after a pre-defined or configured duration. In an embodiment, UE may not switch back to active DL BWP and initial BWP becomes the active DL BWP.

Option 4: During handover, UE performs random access in target cell in initial DL BWP. So UE can receive the essential SIs from initial DL BWP. In this option, UE should be switched to other BWP (if network wants) after UE has finished reading the essential SIs from initial DL BWP.

If switching from initial DL BWP to another BWP is based on DCI based switching, target cell/gNB may send the switching command after UE has finished reading the essential SIs. Target cell/gNB should somehow know when UE has finished reading the essential SIs. This can be based on some indication from UE upon acquiring the essential SIs or pre-defined time for which NW does not send switching command after handover is complete.

If switching from initial DL BWP to another BWP is based on RRC signaling (i.e. one BWP in BWP configuration is indicated as first active and after handover is complete, UE switches to first active BWP), UE should switch to first active DL BWP indicated in RRC signaling after the UE has finished reading the essential SIs or after a pre-defined time to enable UE to read the essential SIBs.

DCI Handling for Bwp-InactivityTimer

If the bwp-InactivityTimer is configured, the medium access control (MAC) entity shall for each activated Serving Cell:

1> if the default-DL-BWP is configured, and the active DL BWP is not the BWP indicated by the default-DL-BWP; or 1> if the default-DL-BWP is not configured, and the active DL BWP is not the initial BWP;

2> if a PDCCH indicating downlink assignment or uplink grant is received on the active BWP; or 2> if a MAC PDU is transmitted in a configured uplink grant or received in a configured downlink assignment:

3> if there is no ongoing random access procedure associated with this Serving Cell; or 3> if the ongoing random access procedure associated with this Serving Cell is successfully completed (i.e. contention resolution is successful for CB RA or RAR is successfully received for CF RA) upon receiving this PDCCH:

4> start or restart the bwp-InactivityTimer associated with the active DL BWP.

Enhancements to SSB and CSI RS selection for Random Access:

Scenario 1: Lets say there are 4 SSBs: SSB1 to SSB 4. Contention-free random access resources associated with SSB 1 and SSB2 are provided by network (e.g. gNB). None of the SSBs (1 to 4) are above a configured threshold. In the current procedure UE selects any SSB from SSBs (1 to 4) and perform contention based RA. In this scenario, we propose that that UE select a SSB from SSBs associated with CF RA resources and perform CF RA i.e. UE select a SSB from SSB1 and SSB2 and perform CF RA.

Scenario 2: There are 4 SSBs: SSB1 to SSB 4. Contention-free random access resources associated with CSI RS 1 and CSI RS2 are provided. None of the CSI RSs are above threshold. None of the SSBs (1 to 4) are above threshold. In the current procedure UE selects any SSB and perform CB RA. In this scenario, we propose that that UE select a CSI RS from CSI RSs associated with CF RA resources and perform CF RA i.e. UE select a CSI RS from CSI RS 1 and CSI RS 2 and perform CF RA.

The proposed procedure is as follows:

1> if the contention-free random access resources associated with SS blocks have been explicitly provided by RRC (Note: contention-free random access resources are assigned to UE by network (e.g. gNB) in dedicated RRC signaling message) and if at least one SS block with SS-RSRP above rsrp-ThresholdSSB amongst the associated SS blocks is available (Note: here associated SS blocks refer to SS blocks associated with contention-free random access resources):

2> select an SS block with SS-RSRP above rsrp-ThresholdSSB amongst the associated SS blocks (Note: here associated SS blocks refer to SS blocks associated with contention-free random access resources)

2> set the PREAMBLE_INDEX to a ra-PreambleIndex corresponding to the selected SS block.

1> else if the contention-free random access resources associated with SS blocks have been explicitly provided by RRC (Note: contention-free random access resources are assigned to UE by network (e.g. gNB) in dedicated RRC signaling message) and if at least one SS block with SS-RSRP above rsrp-ThresholdSSB is not available:
   2> select any SS block amongst the associated SS blocks (Note: here associated SS blocks refer to SS blocks associated with contention-free random access resources);
   2> set the PREAMBLE_INDEX to a ra-PreambleIndex corresponding to the selected SS block.
1> else if the contention-free random access resources associated with CSI-RSs have been explicitly provided by RRC (Note: contention-free random access resources are assigned to UE by network (e.g. gNB) in dedicated RRC signaling message) and if at least one CSI-RS with CSI-RSRP above csirs-Threshold amongst the associated CSI-RSs is available (Note: here associated CSI-RSs refer to CSI-RSs associated with contention-free random access resources):
   2> select a CSI-RS with CSI-RSRP above csirs-Threshold amongst the associated CSI-RSs (Note: here associated CSI-RSs refer to CSI-RSs associated with contention-free random access resources);
   2> set the PREAMBLE_INDEX to a ra-PreambleIndex corresponding to the selected CSI-RS.
1> else if the contention-free random access resources associated with CSI-RSs have been explicitly provided by RRC (Note: contention-free random access resources are assigned to UE by network (e.g. gNB) in dedicated RRC signaling message) and if at least one SS block with SS-RSRP above rsrp-ThresholdSSB is not available:
   2> select any CSI-RS amongst the associated CSI-RSs (Note: here associated CSI-RSs refer to CSI-RSs associated with contention-free random access resources);
   2> set the PREAMBLE_INDEX to a ra-PreambleIndex corresponding to the selected CSI-RS.
1> else:
   2> if rsrp-ThresholdSSB is configured and at least one of the SS blocks with SS-RSRP above rsrp-ThresholdSSB is available:
      3> select an SS block with SS-RSRP above rsrp-ThresholdSSB.
   2> else:
      3> select any SS block.
   2> if Msg3 has not yet been transmitted:
      3> if Random Access Preambles group B exists; and
      3> if the potential Msg3 size (UL data available for transmission plus MAC header and, where required, MAC CEs) is greater than ra-Msg3SizeGroupA and the pathloss is less than PCMAX (of the Serving Cell performing the Random Access Procedure)-preambleReceivedTargetPower-msg3-DeltaPreamble-messagePowerOffsetGroupB:
         4> select the Random Access Preambles group B.
      3> else:
         4> select the Random Access Preambles group A.
   2> else (i.e. Msg3 is being retransmitted):
      3> select the same group of Random Access Preambles as was used for the Random Access Preamble transmission attempt corresponding to the first transmission of Msg3.
   2> if the association between Random Access Preambles and SS blocks is configured:
      3> select a ra-PreambleIndex randomly with equal probability from the Random Access Preambles associated with the selected SS block and the selected group.
   2> else:
      3> select a ra-PreambleIndex randomly with equal probability from the Random Access Preambles within the selected group.
   2> set the PREAMBLE_INDEX to the selected ra-PreambleIndex.
1> if an SS block is selected above and an association between PRACH occasions and SS blocks is configured:
   2> determine the next available PRACH occasion from the PRACH occasions corresponding to the selected SS block (the MAC entity may take into account the possible occurrence of measurement gaps when determining the next available PRACH occasion corresponding to the selected SS block).
1> else if a CSI-RS is selected above and an association between PRACH occasions and CSI-RSs is configured:
   2> determine the next available PRACH occasion from the PRACH occasions corresponding to the selected CSI-RS (the MAC entity may take into account the possible occurrence of measurement gaps when determining the next available PRACH occasion corresponding to the selected CSI-RS).
1> else:
   2> determine the next available PRACH occasion (the MAC entity may take into account the possible occurrence of measurement gaps when determining the next available PRACH occasion).

Figure 50:
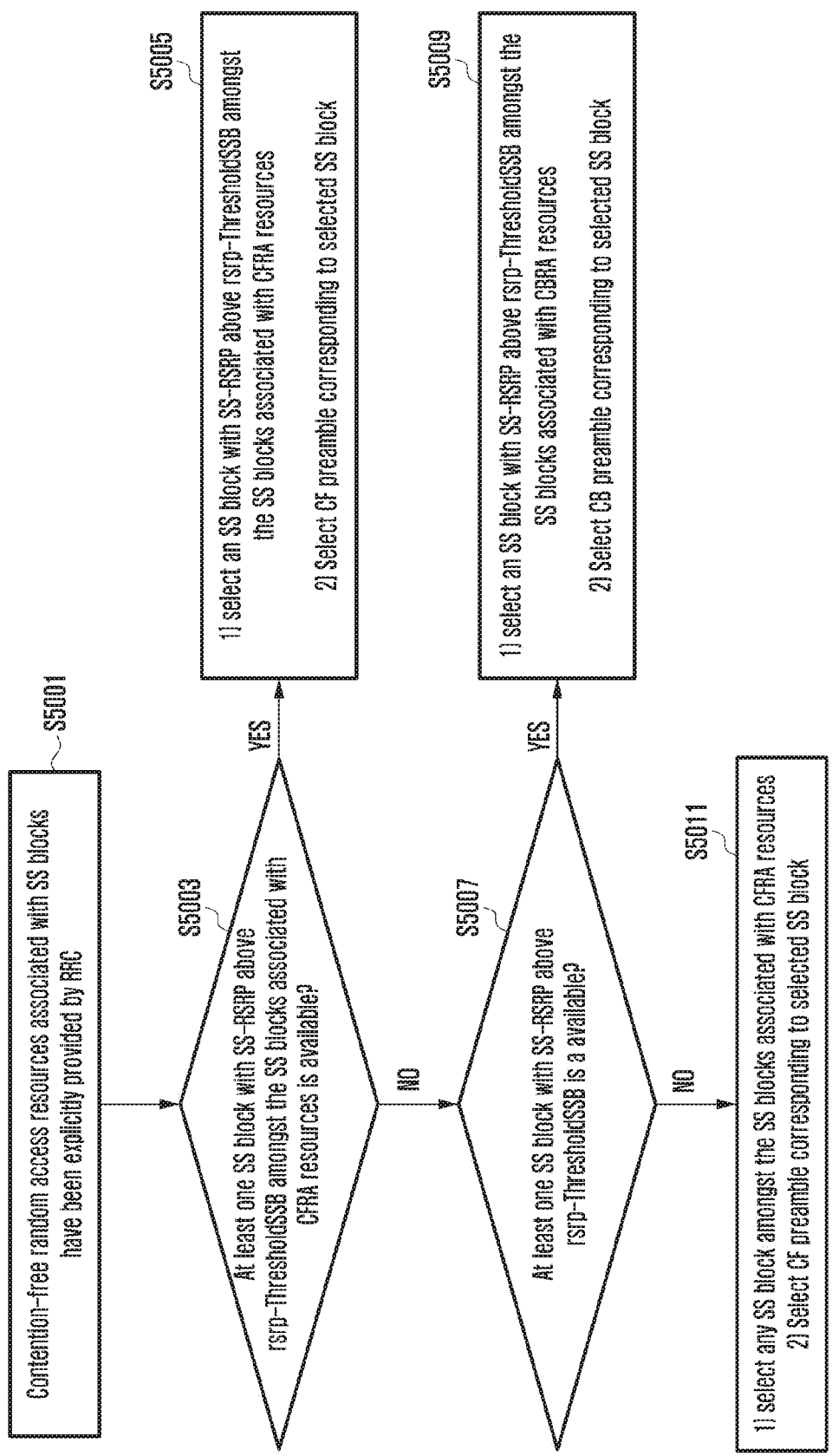
FIG. 50 illustrates a procedure for the case when contention-free random access resources associated with SS blocks have been explicitly provided by radio resource control (RRC) according to an embodiment of the disclosure.

FIG. 50 illustrates a procedure for the case when contention-free random access resources associated with SS blocks have been explicitly provided by RRC according to an embodiment of the disclosure.

Figure 51:
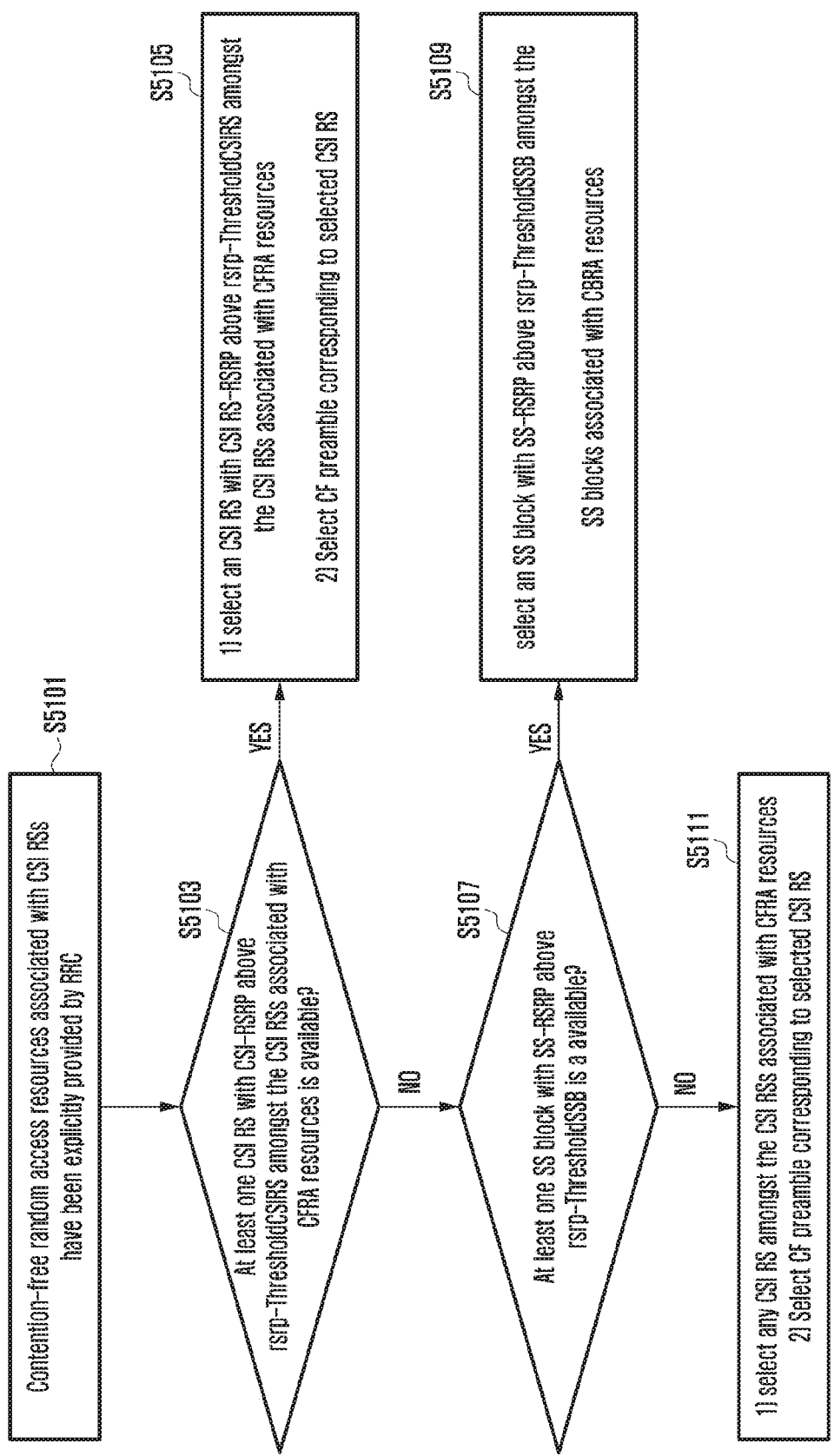
FIG. 51 illustrates a procedure for the case when contention-free random access resources associated with CSI RSs have been explicitly provided by RRC according to an embodiment of the disclosure.

FIG. 51 illustrates a procedure for the case when contention-free random access resources associated with CSI RSs have been explicitly provided by RRC according to an embodiment of the disclosure.

The above procedure for the case when contention-free random access resources associated with SS blocks have been explicitly provided by RRC is shown in FIG. 50. See operations S5001 through S5011 shown in FIG. 50. The above procedure for the case when contention-free random-access resources associated with CSI RSs have been explicitly provided by RRC is shown in FIG. 51. See operations S5101 through S5111 shown in FIG. 51.

Figure 52:
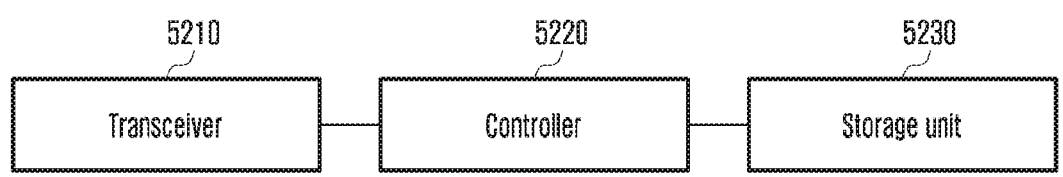
FIG. 52 illustrates a structure of a UE according to an embodiment of the disclosure.

FIG. 52 illustrates a structure of a UE according to an embodiment of the disclosure.

Referring to FIG. 52, the UE may include a transceiver (5210) (e.g., transmission/reception unit), a controller (5220) (e.g., at least one processor), and a storage unit (5230) (e.g., a memory). In the disclosure, the controller (5220) may be defined as a circuit or an application specific integrated circuit or at least one processor.

Transceiver (5210) may transmit and receive signals with network entities. Transceiver (5210) may receive system information from, for example, a base station and may receive a synchronization signal or a reference signal.

Controller (5220) may control the overall operation of the UE according to the embodiments of the disclosure. For example, Controller (5220) may control the signal flow between each block to perform the operation according to the flowcharts described above. In detail, controller (5220) may control operations proposed by the disclosure to receive the updated system information (SI) in a system wherein multiple downlink (DL) bandwidth parts (BWPs) are configured on a carrier.

Controller (5220) is coupled with transceiver (5210) and controller (5220) is configured to identify whether an active DL BWP of the UE is configured with common search space, and receive, from a base station, updated system information in a dedicated signaling when the active DL BWP of the UE is not configured with the common search space. Wherein the updated system information is included in a radio resource control (RRC) signaling message.

According to an embodiment, the UE is not required to acquire system information updates from broadcast when the active DL BWP of the UE is not configured with the common search space.

According to an embodiment, controller (5220) is further configured to receive, from the base station, earthquake and tsunami warning system (ETWS) and commercial mobile alert system (CMAS) notifications in a dedicated signaling when the active DL BWP of the UE is not configured with the common search space. Wherein the UE is not required to monitor the ETWS and CMAS notifications indications when the active DL BWP of the UE is not configured with the common search space.

According to another embodiment, controller (5220) is coupled with transceiver (5210) and is configured to identify whether an active downlink (DL) bandwidth part (BWP) of the UE is configured with common search space, perform a BWP switch procedure to switch to a BWP with the common search space when the active DL BWP of the UE is not configured with the common search space, and receive, from a base station, updated system information in the BWP with the common search space.

Storage unit (5230) may store at least one of information transmitted and received through the transceiver (5210) and information generated through controller (5220).

Figure 53:
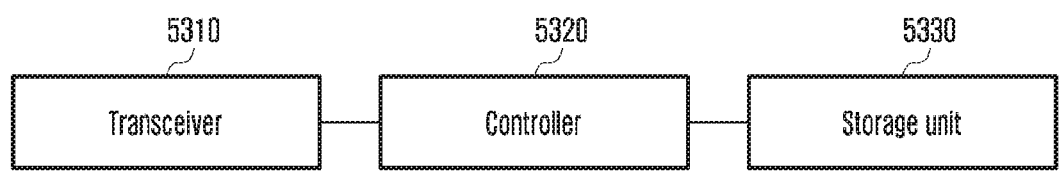
FIG. 53 illustrates a structure of a base station (gNB) according to an embodiment of the disclosure.

FIG. 53 illustrates a structure of a base station (gNB) according to an embodiment of the disclosure.

Referring to FIG. 53, the base station may include a transceiver (transmission/reception unit 5310), a controller (5320), and a storage unit (5330). In the disclosure, controller (5320) may be defined as a circuit or an application specific integrated circuit or at least one processor.

Transceiver (5310) may transmit and receive signals with other network entities. Transceiver (5310) may transmit system information to the UE, for example, and may transmit a synchronization signal or a reference signal.

Controller (5320) may control the overall operation of the base station according to the embodiment of the disclosure. For example, controller (5320) may control the signal flow between each block to perform the operation according to the flowcharts described above. In particular, controller (5320) may control operations proposed by the disclosure to update system information (SI) in a system wherein multiple downlink (DL) bandwidth parts (BWPs) are configured on a carrier.

According to an embodiment, controller (5320) is coupled with transceiver (5310) and is configured to identify whether an active downlink (DL) bandwidth part (BWP) of a user equipment (UE) is configured with common search space, and transmit, to the UE, updated system information in a dedicated signaling when the active DL BWP of the UE is not configured with the common search space. Wherein the updated system information is included in a radio resource control (RRC) signaling message.

According to an embodiment, the UE is not required to acquire system information updates from broadcast when the active DL BWP of the UE is not configured with the common search space.

According to an embodiment, controller (5320) is further configured to transmit, to the UE, earthquake and tsunami warning system (ETWS) and commercial mobile alert system (CMAS) notifications in a dedicated signaling when the active DL BWP of the UE is not configured with the common search space. Wherein the UE is not required to monitor the ETWS and CMAS notifications indications when the active DL BWP of the UE is not configured with the common search space.

According to another embodiment, controller (5320) is coupled with transceiver (5310) and is configured to identify whether an active downlink (DL) bandwidth part (BWP) of a user equipment (UE) is configured with common search space, perform a BWP switch procedure to switch to a BWP with the common search space when the active DL BWP of the UE is not configured with the common search space, and transmit, to the UE, updated system information in the BWP with the common search space.

The storage unit (5330) may store at least one of information transmitted/received through transceiver (5310) and information generated through the controller (5320).

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a base station in a wireless communication system, the method comprising:
   communicating, with a terminal, on a serving cell;
   identifying whether an active downlink (DL) bandwidth part (BWP) of the serving cell is configured with a common search space (CSS) for monitoring system information for the serving cell, the active DL BWP being a subset of a total bandwidth of the serving cell;
   transmitting, to the terminal, a radio resource control (RRC) message including the system information for the serving cell, in case that the active DL BWP is not configured with the CSS; and
   transmitting, in a paging occasion to the terminal, system information change indication associated with the system information for the serving cell, in case that the active DL BWP is configured with the CSS.

2. The method of claim 1, further comprising:
   transmitting, to the terminal, information on at least one of an earthquake and tsunami warning system (ETWS) notification or a commercial mobile alert system (CMAS) notification in the paging occasion, in case that the active DL BWP is configured with the CSS.

3. The method of claim 1, wherein, the system information includes at least one of a system information block 1 (SIB1), an SIB associated with an ETWS notification, or an SIB associated with a CMAS notification.

4. A method performed by a terminal in a wireless communication system, the method comprising:
   communicating, with a base station, on a serving cell;
   identifying whether an active downlink (DL) bandwidth part (BWP) of the serving cell is configured with a common search space (CSS) for monitoring system information for the serving cell, the active DL BWP being a subset of a total bandwidth of the serving cell;
   receiving, from a base station, a radio resource control (RRC) message including the system information for the serving cell, in case that the active DL BWP is not configured with the CSS; and
   receiving, in a paging occasion from the base station, system information change indication associated with the system information for the serving cell by monitoring the paging occasion, in case that the active DL BWP is configured with the CSS to monitor paging.

5. The method of claim 4, further comprising:
receiving, from the base station, information on at least one of an earthquake and tsunami warning system (ETWS) notification or a commercial mobile alert system (CMAS) notification in the paging occasion by monitoring the paging occasion, in case that the active DL BWP is configured with the CSS.

6. The method of claim 4,
wherein, the system information includes at least one of a system information block 1 (SIB1), an SIB associated with an ETWS notification, or an SIB associated with a CMAS notification.

7. A base station in a wireless communication system, the base station comprising:
a transceiver configured to transmit and receive a signal; and
a controller coupled with the transceiver and configured to:
communicate, with a terminal, on a serving cell,
identify whether an active downlink (DL) bandwidth part (BWP) of the serving cell is configured with a common search space (CSS) for monitoring system information for the serving cell, the active DL BWP being a subset of a total bandwidth of the serving cell,
transmit, to the terminal, a radio resource control (RRC) message including the system information for the serving cell, in case that the active DL BWP is not configured with the CSS, and
transmit, in a paging occasion to the terminal, system information change indication associated with the system information for the serving cell, in case that the active DL BWP is configured with the CSS.

8. The base station of claim 7, wherein the controller is further configured to:
transmit, to the terminal, information on an earthquake and tsunami warning system (ETWS) notification or a commercial mobile alert system (CMAS) notification in the paging occasion, in case that the active DL BWP is configured with the CSS.

9. The base station of claim 7, wherein, the system information includes at least one of a system information block 1 (SIB1), an SIB associated with an ETWS notification, or an SIB associated with a CMAS notification.

10. A terminal in a wireless communication system, the terminal comprising:
a transceiver configured to transmit and receive a signal; and
a controller coupled with the transceiver and configured to:
communicate, with a base station, on a serving cell,
identify whether an active downlink (DL) bandwidth part (BWP) of the serving cell is configured with a common search space (CSS) for monitoring system information for the serving cell, the active DL BWP being a subset of a total bandwidth of the serving cell,
receive, from a base station, a radio resource control (RRC) message including the system information for the serving cell, in case that the active DL BWP is not configured with the CSS, and
receive, in a paging occasion from the base station, system information change indication associated with the system information for the serving cell by monitoring the paging occasion, in case that the active DL BWP is configured with the CSS to monitor paging.

11. The terminal of claim 10, wherein the controller is further configured to:
receive, from the base station, information on at least one of an earthquake and tsunami warning system (ETWS) notification and a commercial mobile alert system (CMAS) notification in the paging occasion by monitoring the paging occasion, in case that the active DL BWP is configured with the CSS.

12. The terminal of claim 10, wherein, the system information includes at least one of a system information block 1 (SIB1), an SIB associated with an ETWS notification, or an SIB associated with a CMAS notification.

* * * * *